US011899879B2

(12) United States Patent
Luo et al.

(10) Patent No.: US 11,899,879 B2
(45) Date of Patent: Feb. 13, 2024

(54) STYLUS DETECTION METHOD, SYSTEM, AND RELATED APPARATUS FOR SWITCHING FREQUENCIES FOR DETECTING INPUT SIGNALS

(71) Applicant: Huawei Technologies Co., Ltd., Shenzhen (CN)

(72) Inventors: Honglei Luo, Shanghai (CN); Junyong Zhang, Dongguan (CN); Weihuan Li, Shanghai (CN); Yejian Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 330 days.

(21) Appl. No.: 17/281,187

(22) PCT Filed: Sep. 30, 2018

(86) PCT No.: PCT/CN2018/109226
§ 371 (c)(1),
(2) Date: Mar. 29, 2021

(87) PCT Pub. No.: WO2020/062310
PCT Pub. Date: Apr. 2, 2020

(65) Prior Publication Data
US 2021/0397342 A1 Dec. 23, 2021

(51) Int. Cl.
*G06F 3/041* (2006.01)
*G06F 3/044* (2006.01)
(Continued)

(52) U.S. Cl.
CPC ...... *G06F 3/041662* (2019.05); *G06F 1/3262* (2013.01); *G06F 3/03545* (2013.01);
(Continued)

(58) Field of Classification Search
None
See application file for complete search history.

(56) References Cited

U.S. PATENT DOCUMENTS

2008/0036742 A1\* 2/2008 Garmon ............... G06F 3/0418
345/173
2010/0253639 A1 10/2010 Huang et al.
(Continued)

FOREIGN PATENT DOCUMENTS

CN 101943939 A 1/2011
CN 101702106 B \* 11/2011
(Continued)

OTHER PUBLICATIONS

ITU-T H.264, "Series H: Audiovisual and Multimedia Systems, Infrastructure of audiovisual services—Coding of moving video, Advanced video coding for generic audiovisual services," Apr. 2017, 812 pages.
(Continued)

*Primary Examiner* — Kirk W Hermann
(74) *Attorney, Agent, or Firm* — Conley Rose, P.C.

(57) ABSTRACT

A stylus detection method includes detecting, by a terminal, an input signal of a stylus at a first frequency, receiving a first input of the stylus through a touchscreen, detecting, in response to the first input, the input signal of the stylus at a second frequency, detecting the input signal of the stylus at a third frequency when detecting the input signal of the stylus at the second frequency and when a duration in which the terminal does not detect the input signal of the stylus is greater than a first time period. The second frequency is greater than the third frequency and the third frequency is greater than the first frequency.

20 Claims, 57 Drawing Sheets

(51) Int. Cl.
*G06F 1/3234* (2019.01)
*G06F 3/0354* (2013.01)
*G06F 3/0488* (2022.01)

(52) U.S. Cl.
CPC .......... *G06F 3/0442* (2019.05); *G06F 3/0488* (2013.01); *G06F 2203/04106* (2013.01)

(56) References Cited

U.S. PATENT DOCUMENTS

| | | | |
|---|---|---|---|
| 2013/0162550 A1* | 6/2013 | Chen | G06F 1/3262 |
| | | | 345/173 |
| 2013/0285934 A1* | 10/2013 | Ting | G06F 1/3243 |
| | | | 345/173 |
| 2014/0043283 A1 | 2/2014 | Kim | |
| 2014/0176495 A1 | 6/2014 | Vlasov | |
| 2014/0212043 A1 | 7/2014 | Hosokawa | |
| 2014/0285447 A1 | 9/2014 | Chang et al. | |
| 2015/0035768 A1 | 2/2015 | Shahparnia et al. | |
| 2015/0309599 A1 | 10/2015 | Michihata et al. | |
| 2015/0378499 A1 | 12/2015 | Choi et al. | |
| 2016/0077655 A1 | 3/2016 | Oda | |
| 2016/0162011 A1 | 6/2016 | Verma et al. | |
| 2016/0188142 A1* | 6/2016 | Oh | G06F 1/3265 |
| | | | 345/87 |
| 2016/0188514 A1 | 6/2016 | Forghani-Zadeh et al. | |
| 2016/0224180 A1 | 8/2016 | Kim | |
| 2016/0370844 A1 | 12/2016 | Kumar | |
| 2017/0003824 A1* | 1/2017 | Yun | G06F 3/041661 |
| 2017/0185213 A1 | 6/2017 | Wang et al. | |
| 2017/0205944 A1 | 7/2017 | Kim et al. | |
| 2017/0242502 A1 | 8/2017 | Gray et al. | |
| 2017/0242534 A1* | 8/2017 | Gray | G06F 3/041662 |
| 2018/0095521 A1* | 4/2018 | Tadinada | G06F 3/04166 |

FOREIGN PATENT DOCUMENTS

| | | |
|---|---|---|
| CN | 102866792 A | 1/2013 |
| CN | 103176638 A | 6/2013 |
| CN | 103235664 A | 8/2013 |
| CN | 103970473 A | 8/2014 |
| CN | 104063083 A | 9/2014 |
| CN | 104317495 A | 1/2015 |
| CN | 104571732 A | 4/2015 |
| CN | 104991682 A | 10/2015 |
| CN | 105045414 A | 11/2015 |
| CN | 105278729 A | 1/2016 |
| CN | 105453002 A | 3/2016 |
| CN | 105739757 A | 7/2016 |
| CN | 105938357 A | 9/2016 |
| CN | 106325635 A | 1/2017 |
| CN | 205899507 U | 1/2017 |
| CN | 106716314 A | 5/2017 |
| CN | 106997255 A | 8/2017 |
| CN | 107003781 A | 8/2017 |
| CN | 107111389 A | 8/2017 |
| JP | 2010244518 A | 10/2010 |
| JP | 2011065252 A | 3/2011 |
| JP | 2013250828 A | 12/2013 |
| JP | 2014149379 A | 8/2014 |
| JP | 2016062205 A | 4/2016 |
| JP | 2017004482 A | 1/2017 |
| JP | 2018510436 A | 4/2018 |
| WO | 2014029243 A1 | 2/2014 |
| WO | WO-2014161296 A1 * | 10/2014 ........... G06F 1/3265 |
| WO | 2017183743 A1 | 10/2017 |

OTHER PUBLICATIONS

Hou Tao et al., Low Power Design of Handwriting System in Electronic Paper Reader, Chinese Journal of Liquid Crystals and Displays, Aug. 2008, with an English abstract total 4 pages.

Sheng Guiyong, Research on spatial handwriting pen handwriting detection system, Computer literacy and technology, Sep. 2016, with an English abstract, 3 pages.

Ki-Uk Kyung et al., Ubi-Pen: Development of a Compact Tactile Display Module and Its Application to a Haptic Stylus, IEEE, Mar. 22-24, 2007, 6 pages.

\* cited by examiner

CONT. FROM FIG. 6a

CONT. FROM FIG. 6a

Idle-5 Hz

Screen-off operation

CONT. FROM FIG. 7a
CONT. FROM FIG. 7a
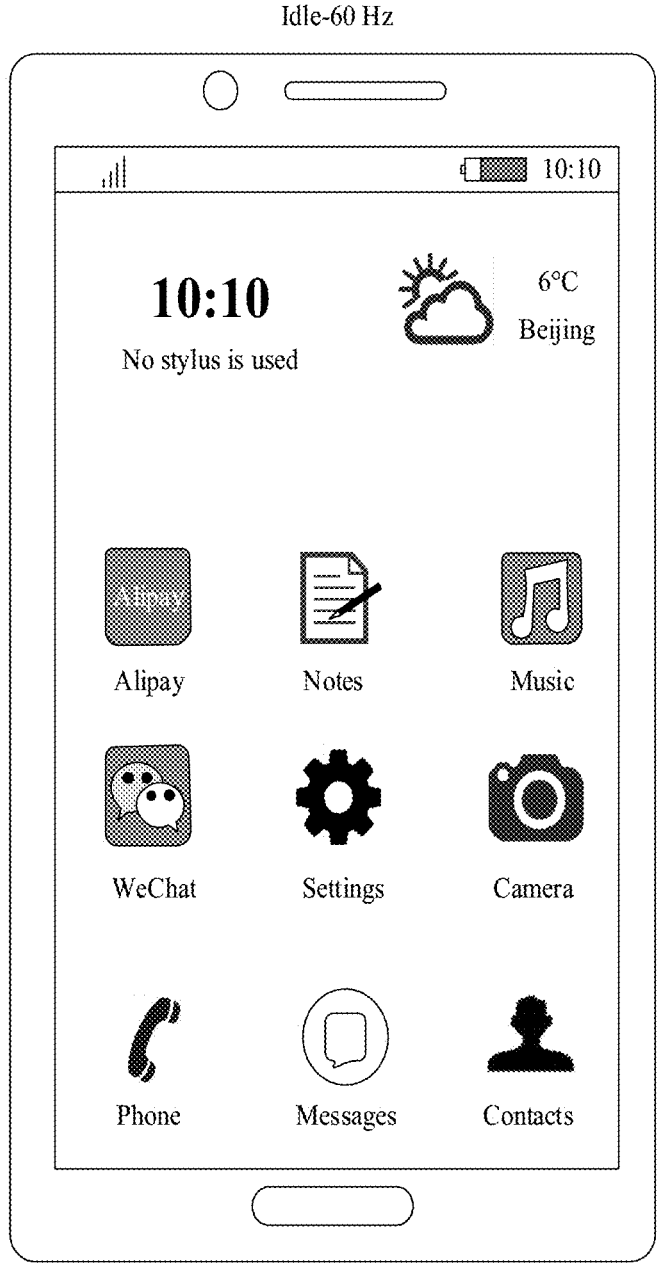
Idle-60 Hz
FIG. 7b
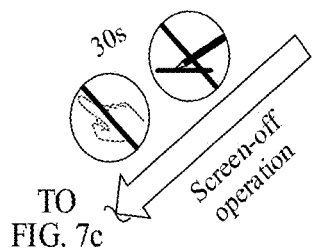
TO FIG. 7c

~
TO

~
TO

~
TO

~
TO

STYLUS DETECTION METHOD, SYSTEM, AND RELATED APPARATUS FOR SWITCHING FREQUENCIES FOR DETECTING INPUT SIGNALS

CROSS-REFERENCE TO RELATED APPLICATIONS

This application is a U.S. National Stage of International Patent Application No. PCT/CN2018/109226 filed on Sep. 30, 2018, which is hereby incorporated by reference in its entirety.

TECHNICAL FIELD

This application relates to the field of mobile communications technologies, and in particular, to a stylus detection method, a system, and a related apparatus.

BACKGROUND

With popularization of mobile devices such as a mobile phone and a tablet, research on device input modes is more detailed. A finger operation is particularly limited on a mobile device. Because a finger is relatively thick, it is difficult to precisely and quickly write on a relatively small screen. Consequently, various styluses emerge and are applied to touchscreens. A proactive capacitive stylus is a high-precision and low-cost stylus based on hardware of an existing capacitive touchscreen system.

Compared with a conventional keyboard and finger input mode, emergence of the styluses greatly improves use efficiency of a mobile terminal, and enriches application scenarios for people. However, how to reduce system power consumption of a terminal and improve a battery life of the terminal is a main direction of improvement in the industry.

SUMMARY

This application provides a stylus detection method, a system, and a related apparatus, to reduce power consumption of a terminal when a stylus function is quickly implemented.

According to a first aspect, this application provides a stylus detection method, including: A terminal first detects an input signal of a stylus at a first frequency. Then, the terminal receives a first input of the stylus through a touchscreen. The terminal detects the input signal of the stylus at a second frequency in response to the first input. Next, if the terminal detects the input signal of the stylus at the second frequency, and duration in which the terminal does not detect the input signal of the stylus is greater than a first time period, the terminal detects the input signal of the stylus at a third frequency. The second frequency is greater than the third frequency and the third frequency is greater than the first frequency.

In this solution, the terminal may detect the input signal of the stylus at a low frequency (the first frequency). When the input signal of the stylus is detected, the terminal may quickly switch to a high frequency (the second frequency) to detect the input signal of the stylus, to achieve user experience of quickly using the stylus. When the terminal detects the input signal of the stylus at the high frequency (the second frequency), if the terminal does not detect the input signal of the stylus within a period of time (for example, 30 s to 60 s), the terminal may reduce a detection frequency to a medium frequency (the third frequency), and wait for, in a power-saving manner, the input signal of the stylus to arrive again. In this way, when the input signal of the stylus arrives again, the terminal may quickly return to a high-frequency (second-frequency) state to make a response, and quickly perform an action corresponding to the input signal of the stylus that arrives again. This improves user experience.

In a possible case, when the terminal detects the input signal of the stylus at the third frequency, if the duration in which the terminal does not detect the input signal of the stylus is greater than a second time period, the terminal detects the input signal of the stylus at the first frequency. In other words, when no input signal of the stylus arrives for a long time, the terminal may reduce the detection frequency for the input signal of the stylus, to reduce power consumption.

In a possible case, when the terminal detects the input signal of the stylus at the third frequency, if the terminal receives a second input of the stylus, the terminal detects the input signal of the stylus at the second frequency in response to the second input of the stylus. In other words, when the input signal of the stylus arrives again, the terminal may increase the detection frequency for the input signal of the stylus, so that the terminal can quickly execute a corresponding response action on the input signal of the stylus.

In a possible case, the terminal receives a third input of a user when the terminal detects the input signal of the stylus at the second frequency. In response to the third input, the terminal turns off the touchscreen and detects the input signal of the stylus at the first frequency. In other words, when the terminal detects the input signal of the stylus at the high frequency (the second frequency), if the terminal is screen-off, the terminal may detect the input signal of the stylus at the low frequency to reduce power consumption, and can further execute a corresponding action in response to the input signal of the stylus when the user turns off the screen, to improve user experience of using the stylus.

In a possible case, the terminal receives a fourth input of the user when the terminal detects the input signal of the stylus at the third frequency. In response to the fourth input, the terminal turns off the touchscreen and detects the input signal of the stylus at the first frequency. In other words, when the terminal detects the input signal of the stylus at the medium frequency (the second frequency), if the terminal is screen-off, the terminal may detect the input signal of the stylus at the low frequency to reduce power consumption, and can further execute a corresponding action in response to the input signal of the stylus when the user turns off the screen, to improve user experience of using the stylus.

In a possible case, when the terminal detects the input signal of the stylus at the second frequency, the terminal detects a touch input of the user in a first detection state through the touchscreen. In the first detection state, the terminal detects the touch input of the user in a mutual capacitance detection manner at a fourth frequency and a self-capacitance detection manner at a fifth frequency. In other words, when the terminal detects the input signal of the stylus at the high frequency (the second frequency), the terminal may further detect a finger touch input at the same time, to improve user experience of operating the terminal through the stylus and a finger.

In a possible case, when the terminal detects the input signal of the stylus at the third frequency, the terminal detects the touch input of the user in a second detection state through the touchscreen. In the second detection state, the terminal detects the touch input of the user in a mutual capacitance detection manner at a sixth frequency and a self-capacitance detection manner at a seventh frequency. In other words, when the terminal detects the input signal of the stylus at the medium frequency (the second frequency), the terminal may further detect the finger touch input at the same time, to reduce power consumption of the terminal when the user does not operate the terminal, or make a response in a timely manner when the input signal of the stylus or the touch input arrives at the same time.

In a possible case, when the terminal turns off the touchscreen, the method further includes: The terminal stops detection of the touch input of the user. In other words, when the screen is off, the terminal may not detect the touch input of the user, to reduce the power consumption.

In a possible case, the terminal receives a fifth input of the stylus when the terminal turns off the touchscreen and detects the input signal of the stylus at the first frequency. In response to the fifth input, the terminal detects the input signal of the stylus at the second frequency, and saves written content of the fifth input. The written content includes handwriting of the stylus or text information recognized by the terminal from the handwriting of the stylus. In other words, when the screen is off, the terminal may receive an input of the stylus and record written content of the stylus, so that the user can quickly record the written content with the stylus.

In a possible case, the terminal receives a sixth input of the user. In response to the sixth input, the terminal stops the detection of the input signal of the stylus, or the terminal detects the input signal of the stylus at the first frequency. In other words, the terminal may disable detection of the stylus or detect the stylus at the low frequency based on a requirement of the user, to reduce the power consumption when the user does not use the stylus.

In a possible case, the terminal receives a seventh input of the user when the terminal stops the detection of the input signal of the stylus. In response to the seventh input, the terminal determines whether the terminal receives the input signal of the stylus before receiving the seventh input. If yes, the terminal detects the input signal of the stylus at the second frequency. If no, the terminal detects the input signal of the stylus at the first frequency. In other words, when receiving an operation of the user to enable a stylus function, the terminal may determine whether the user used the stylus before, to determine a detection frequency for the stylus. This may reduce the power consumption.

In a possible case, the terminal receives an eighth input of the user. In response to the eighth input, the terminal restores factory settings and detects the input signal of the stylus at the first frequency. In other words, after restoring the factory settings, the terminal detects the input signal of the stylus at the low frequency (the first frequency).

In a possible case, the terminal receives a ninth input of the user. In response to the ninth input, the terminal restarts. A frequency of detecting the input signal of the stylus by the terminal before a restart is the same as a frequency of detecting the input signal of the stylus after the restart.

According to a second aspect, this application provides a terminal, including one or more processors and one or more memories. The one or more memories are coupled to the one or more processors. The one or more memories are configured to store computer program code, and the computer program code includes a computer instruction. When the one or more processors execute the computer instruction, a communications apparatus is enabled to perform the stylus detection method according to any possible implementation of any one of the foregoing aspects.

According to a third aspect, an embodiment of this application provides a computer storage medium, including a computer instruction. When the computer instruction is run on an electronic device, a communications apparatus is enabled to perform the stylus detection method according to any possible implementation of any one of the foregoing aspects.

According to a fourth aspect, an embodiment of this application provides a computer program product. When the computer program product is run on a computer, the computer is enabled to perform the stylus detection method according to any possible implementation of any one of the foregoing aspects.

BRIEF DESCRIPTION OF DRAWINGS

To describe the technical solutions in the embodiments of this application or in the prior art more clearly, the following briefly describes the accompanying drawings for describing the embodiments or the prior art.

FIG. 7a to FIG. 7c are a schematic diagram of another group of screens according to an embodiment of this application;

DESCRIPTION OF EMBODIMENTS

The following clearly describes the technical solutions in the embodiments of this application in detail with reference to the accompanying drawings. In description of the embodiments of this application, "I" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of the embodiments of this application, "a plurality of means two or more than two."

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the description of the embodiment of this application, unless otherwise stated, "a plurality of means two or more than two."

Figure 1:
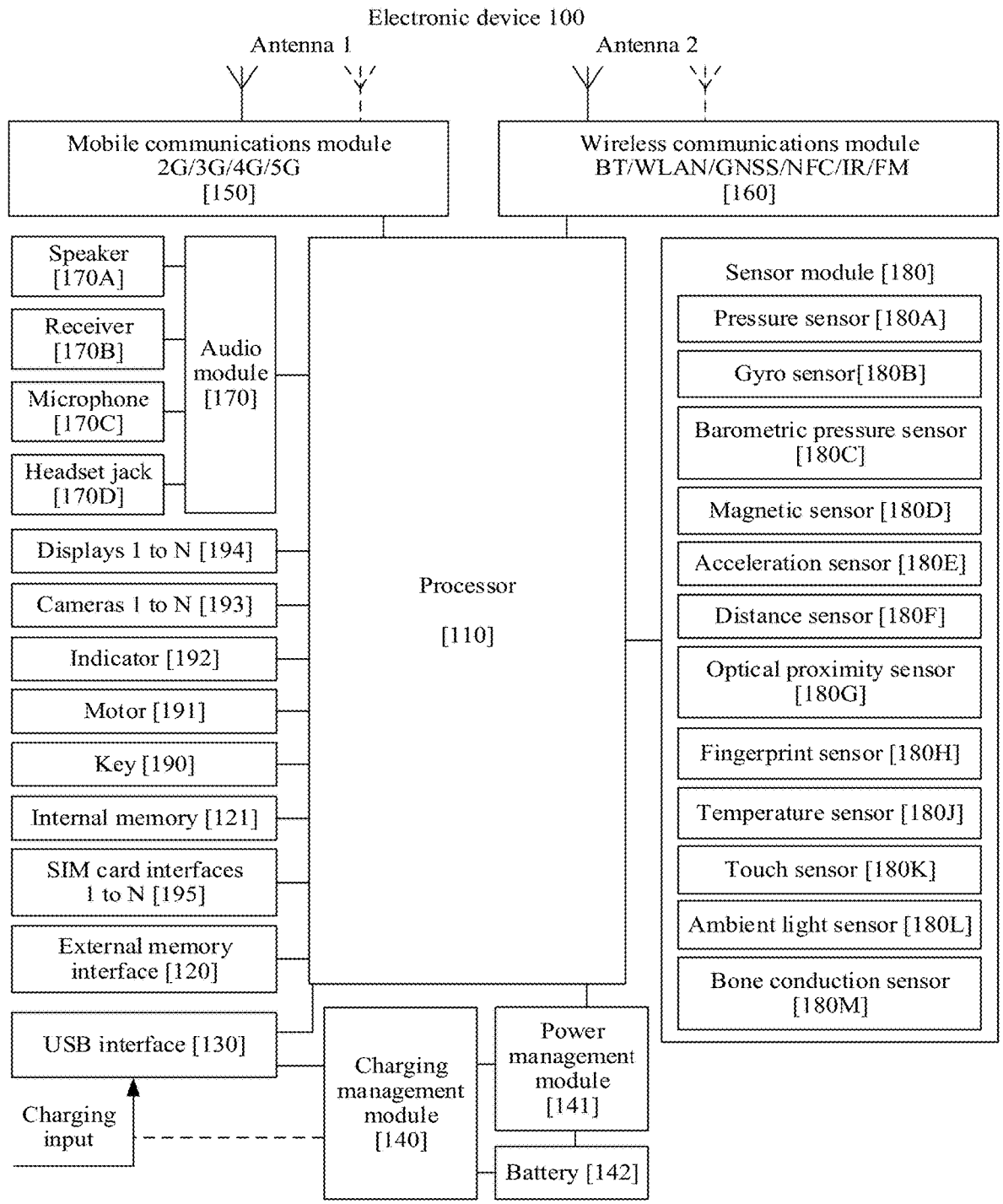
FIG. 1 is a schematic diagram of a structure of an electronic device according to an embodiment of this application.

FIG. 1 is a schematic diagram of a structure of an electronic device 100.

As shown in FIG. 1, a terminal 01 in this embodiment of this application may be the electronic device 100. The following uses the electronic device 100 as an example to specifically describe this embodiment. It should be understood that the electronic device 100 shown in FIG. 1 is merely an example of the terminal 01, and the electronic device 100 may have more or fewer components than those shown in the figure, or may combine two or more components, or may have different component configurations. Various components shown in FIG. 1 may be implemented in hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

The memory may further be disposed in the processor 110, and is configured to store an instruction and data. In some embodiments, the memory in the processor 110 is a cache memory. The memory may store an instruction or data that has been used or cyclically used by the processor 110. If the processor 110 needs to use the instruction or the data again, the processor 110 may directly invoke the instruction or the data from the memory, to avoid repeated access and reduce a waiting time period of the processor 110. This improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may also be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger to charge the electronic device 100, or may be configured to perform data transmission between the electronic device 100 and a peripheral device, or may be configured to connect to a headset to play audio through the headset. The interface may further be configured to connect to another electronic device such as an AR device.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, a modem processor, a baseband processor, and the like.

The antenna 1 and the antenna 2 are configured to transmit and receive an electromagnetic wave signal. Each antenna in the electronic device 100 may be configured to cover one or more communications frequency bands. Different antennas may further be multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 and at least some modules in the processor 110 may be disposed in a same component.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and is then transferred to an application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same component as the mobile communications module 150 or another function module.

The wireless communications module 160 may provide a wireless communication solution that includes a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device through a wireless communications technology. The wireless communications technology may include a global system for mobile communications (global system for mobile communications, GSM), a general packet radio service (general packet radio service, CPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements the display function through a GPU, the display 194, the application processor, and the like. The GPU is a microprocessor for image processing, and is connected to the display 194 and the application processor. The GPU is configured to perform mathematical and geometric calculation, and is configured to render an image. The processor 110 may include one or more CPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro-OLED, a quantum dot light emitting diode (quantum dot light emitting diodes, QLED), or the like. In some embodiments, the electronic device 100 may include one or N displays 194. N is a positive integer greater than 1.

The electronic device 100 may implement the photographing function through the ISP, the camera 193, the video codec, the GPU, the display 194, the application processor, and the like.

The ISP is configured to process data fed back by the camera 193. For example, during photographing, a shutter is pressed, a ray of light is transmitted to a light-sensitive element of a camera through a lens, and an optical signal is converted into an electrical signal. The light-sensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to a light-sensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to a DSP for processing. The DSP converts the digital image signal into an image signal of a standard format such as RGB or YUV. In some embodiments, the electronic device 100 may include one or N cameras 193. N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy, or the like.

The video codec is configured to compress or decompress a digital video. The electronic device 100 may support one or more video codecs. In this way, the electronic device 100 can play or record videos of a plurality of coding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, music and videos are stored in the external storage card.

The internal memory 121 may be configured to store computer-executable program code, and the executable program code includes an instruction. The processor 110 runs the instruction stored in the internal memory 121 to perform various function applications of the electronic device 100 and process data. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to: code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may listen to music or answer a hands-free call through the speaker 170A.

The receiver 170B, also referred to as an "earpiece", is configured to convert an audio electrical signal into a sound signal. When the electronic device 100 answers a call or receives voice information, the receiver 170B may be placed close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, reduce noise, and further identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to a first pressure threshold is performed on an SMS message application icon, an instruction for creating a new SMS message is executed.

The gyro sensor 180B may be configured to determine a motion posture of the electronic device 100. In some embodiments, an angular velocity of the electronic device 100 around three axes (namely, x, y, and z axes) may be determined through the gyro sensor 180B. The gyro sensor 180B may be configured to perform image stabilization during photographing. For example, when the shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement the image stabilization. The gyro sensor 180B may also be used in a navigation scenario and a somatic game scenario.

The barometric pressure sensor 180C is configured to measure atmospheric pressure. In some embodiments, the electronic device 100 calculates an altitude based on a value of the atmospheric pressure measured by the barometric pressure sensor 180C, to assist positioning and navigation.

The magnetic sensor 180D includes a Hall sensor. The electronic device 100 may detect opening/closing of a flip leather case through the magnetic sensor 180D. In some embodiments, when the electronic device 100 is a clamshell phone, the electronic device 100 may detect opening/closing of a flip cover based on the magnetic sensor 180D. Further, a feature such as automatic unlocking of the flip cover is set based on a detected opening/closing state of the leather case or a detected opening/closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 380E may further be configured to identify a posture of the electronic device, and is applied to an application such as switching between landscape orientation and portrait orientation or a pedometer.

The distance sensor 180F is configured to measure a distance. The electronic device 100 may measure the distance in an infrared or a laser manner. In some embodiments, in a photographing scenario, the electronic device 100 may measure the distance through the distance sensor 180F to implement quick focusing.

For example, the optical proximity sensor 180G may include a light-emitting diode (LED) and an optical detector, for example, a photodiode. The light emitting diode may be an infrared light emitting diode. The electronic device 100 emits infrared light through the light-emitting diode. The electronic device 100 detects infrared reflected light from a nearby object through the photodiode. When detecting sufficient reflected light, the electronic device 100 may determine that there is an object near the electronic device 101. When detecting insufficient reflected light, the electronic device 100 may determine that there is no object near the electronic device 100. The electronic device 100 may detect, through the optical proximity sensor 180G, that the user holds the electronic device 100 close to an ear to make a call, to automatically perform screen-off for power saving. The optical proximity sensor 180G may also be used in a flip cover mode or a pocket mode to automatically unlock or lock the screen.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally because of a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194. The touch sensor 180K and the display 194 form a touchscreen, which is also referred to as a "touchscreen". The touch sensor 180K is configured to detect a touch operation performed on or near the touch sensor 180K. The touch sensor may transfer a detected touch operation to the application processor, to determine a type of the touch event. Visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch key. The electronic device 100 may receive a key input, and generate a key signal input related to a user setting and function control of the electronic device 100.

The motor 191 may generate a vibration prompt. The motor 191 may be used for an incoming call vibration prompt, or may be used for a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect can also be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces. N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may also be compatible with different types of SIM cards. The SIM card interface 195 may also be compatible with an external memory card. The electronic device 100 interacts with a network through the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In this embodiment of the present invention, an Android system with the layered architecture is used as an example to illustrate a software structure of the electronic device 100.

Figure 2:
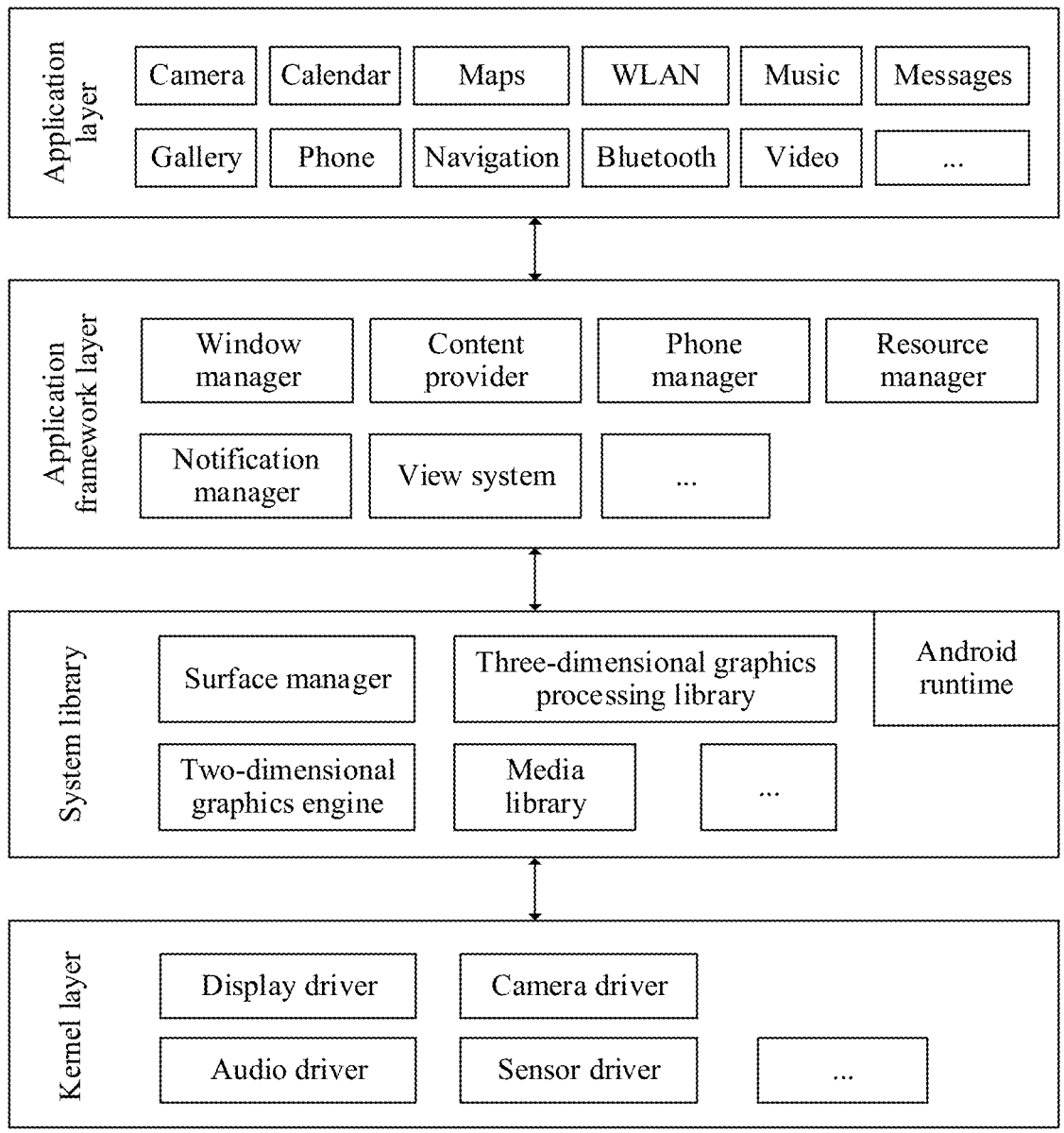
FIG. 2 is a schematic diagram of a software architecture according to an embodiment of this application.

FIG. 2 is a block diagram of a software structure of the electronic device 100 according to an embodiment of the present invention.

In the layered architecture, software is divided into several layers, and each layer has a clear role and task. The layers communicate with each other through software interfaces. In some embodiments, the Android system is divided into four layers, namely, an application layer, an application framework layer, an Android runtime (Android runtime) and system library, and a kernel layer from top to bottom.

The application layer may include a series of application packages.

As shown in FIG. 2, the application package may include applications such as "camera", "gallery", "calendar", "calls", "maps", "navigation", "WLAN", "Bluetooth", "music", "videos", and "messages".

The application framework layer provides an application programming interface (application programming interface, API) and a programming framework for an application at the application layer. The application framework layer includes some predefined functions.

Figure 3:
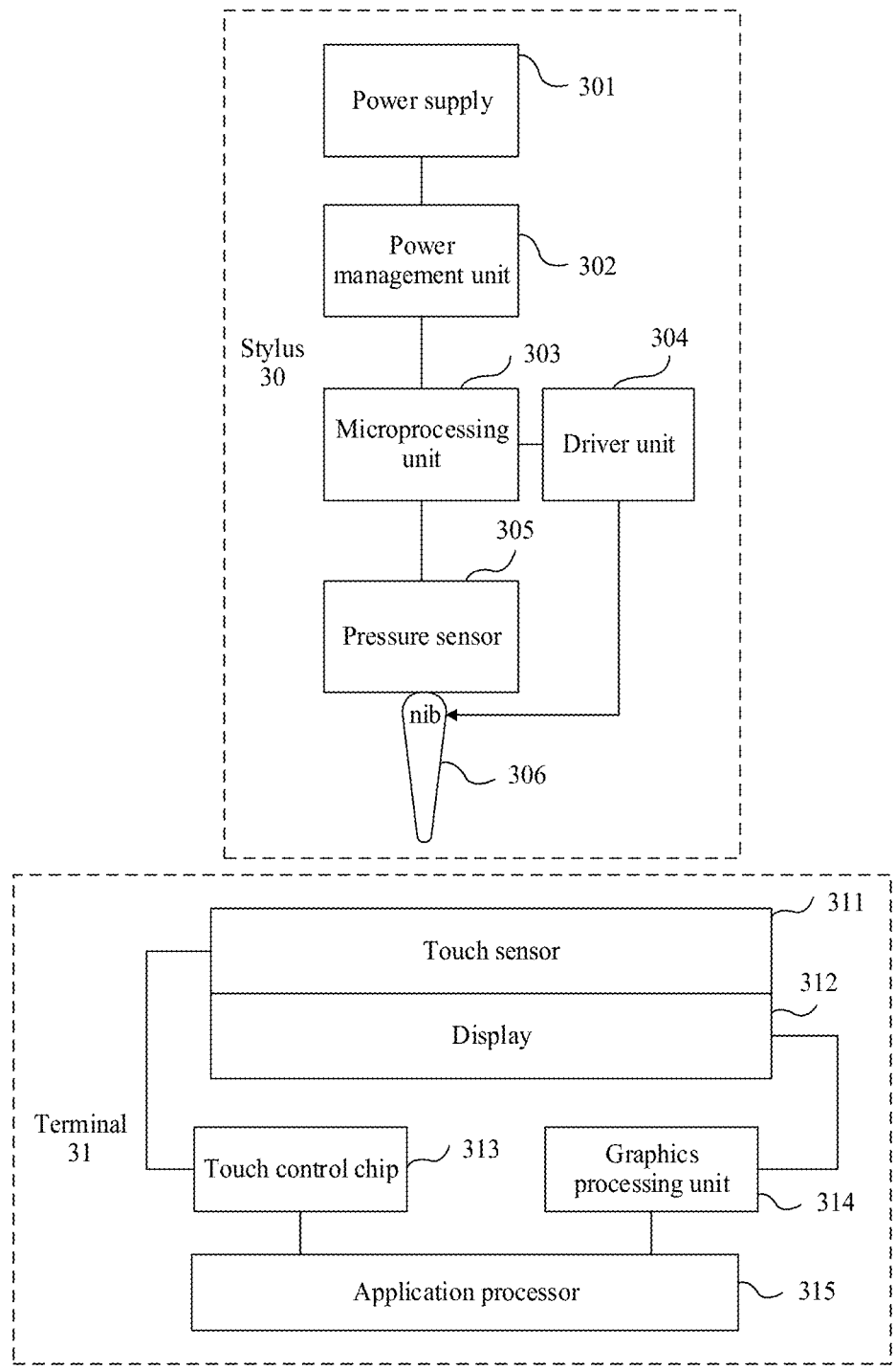
FIG. 3 is a schematic diagram of an architecture of a stylus system according to an embodiment of this application.

As shown in FIG. 3, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and received, a browsing history and bookmarks, an address book, and the like.

The view system includes visual controls such as a control for displaying a text and a control for displaying an image. The view system can be used to construct an application. A display interface may include one or more views. For example, a display interface including an SMS message notification icon may include a text display view and an image display view.

The phone manager is configured to provide a communication function of the electronic device 100, for example, management of a call status (including answering or declining).

The resource manager provides various resources for an application, such as a localized string, an icon, an image, a layout file, and a video file.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a text form of a graph or a scroll bar text, for example, a notification of an application running on the background or a notification that appears on a screen in a form of a dialog window. For example, text information is prompted in the status bar, an alert sound is produced, the electronic device vibrates, or the indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer may run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D image layers for a plurality of applications.

The media library supports playback and recording of a plurality of commonly used audio and video formats, static image files, and the like. The media library may support a plurality of audio and video coding formats such as MPEG4, H.264, MP3, AAC, AMR, JPG, and PNG.

The three-dimensional graphics processing library Open-GraphicsLib is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch tap operation, and a control corresponding to the tap operation is a control of a camera application icon. The camera application invokes an interface at the application framework layer to enable the camera application, then enables the camera driver by invoking the kernel layer, and captures a static image or a video through the camera 193.

The following describes an architecture of a stylus system according to an embodiment of this application. FIG. 3 is an architectural diagram of a stylus system according to this application. As shown in FIG. 3, in the architectural diagram of the stylus system according to this application, a stylus system 30 includes a stylus 30 and a terminal 31. The terminal 31 may be the electronic device 100 in FIG. 1.

The stylus is a proactive capacitive stylus. The proactive capacitive stylus may include a power supply 301, a power management unit (power management unit, PMU) 302, a microcontroller unit (microcontroller unit, MCU) 303, a driver unit 304, a pressure sensor 305, and a nib 306. The power supply 301 may be a rechargeable lithium battery, a standard replaceable battery, or the like. The power management unit 302 may include an adaptive USB-compatible (USB-compatible) pulse width modulation (pulse width modulation, PMW) charging circuit, a multi-channel DC-DC converter (Buck DC-DC converter), an LCD backlight-driver circuit, and the like. The power management unit 302 may supply power required by the microcontroller unit 303, the driver unit 304, the pressure sensor 305, and the like of the stylus 30. The microcontroller unit 303 may be configured to generate a capacitive stylus excitation signal, receive and analyze pressure data reported by the pressure sensor 305, detect a status of a functional key, manage power mode switching, and the like. The pressure sensor 305 may be configured to detect pressure data on the nib of the stylus, and report the detected pressure data on the nib of the stylus 30 to the microcontroller unit 303. The driver unit 304 may be configured to provide a voltage drive signal to the nib of the stylus. After receiving the voltage drive signal, the nib of the stylus may output a signal that can be detected by the terminal, for example, an electrical signal. When the nib approaches the terminal, the terminal may detect the electrical signal output by the nib. In other words, the terminal detects an input signal of the stylus. After the terminal detects the input signal of the stylus, the terminal may determine a specific location of the nib 306 of the stylus 30 on a touch sensor 311 of the terminal 31 through a touch control chip. The nib of the stylus may continuously send a signal, for example, the electrical signal. The nib of the stylus may continuously send a low-frequency signal (for example, a signal between 30 KHz and 70 KHz). The signal sent by the nib of the stylus may include information such as pressure felt by the nib, a key status and an ID serial number of the stylus. In an optional case, the stylus may be connected to the terminal through Bluetooth, wifi, zigbee or the like. After detecting that the nib is in contact with a touchscreen, the stylus may indicate, through the Bluetooth, the terminal to adjust a detection frequency for the stylus and open Notepad.

The terminal 31 may include the touch sensor 311, a display 312, a touch control chip 313, a graphics processing unit (graphics processing unit, GPU) 314, and an application processor (application processor, AP) 315. The touch control chip 312 may determine a capacitance signal detected by the touch sensor 311 and a location of the detected capacitance signal, and report the capacitance signal and the location to the application processor 315. The display 312 may be the display 194 in FIG. 1. Details are not described herein again.

The touch sensor 311 may be configured to detect a capacitance signal generated by a proximity operation of the stylus 30 or a capacitance signal generated by a touch operation of a finger, and upload a capacitance signal generated when the stylus 30 approaches the touchscreen or the capacitance signal generated by the touch operation of the finger to the stylus touch control chip 313.

Figure 4:
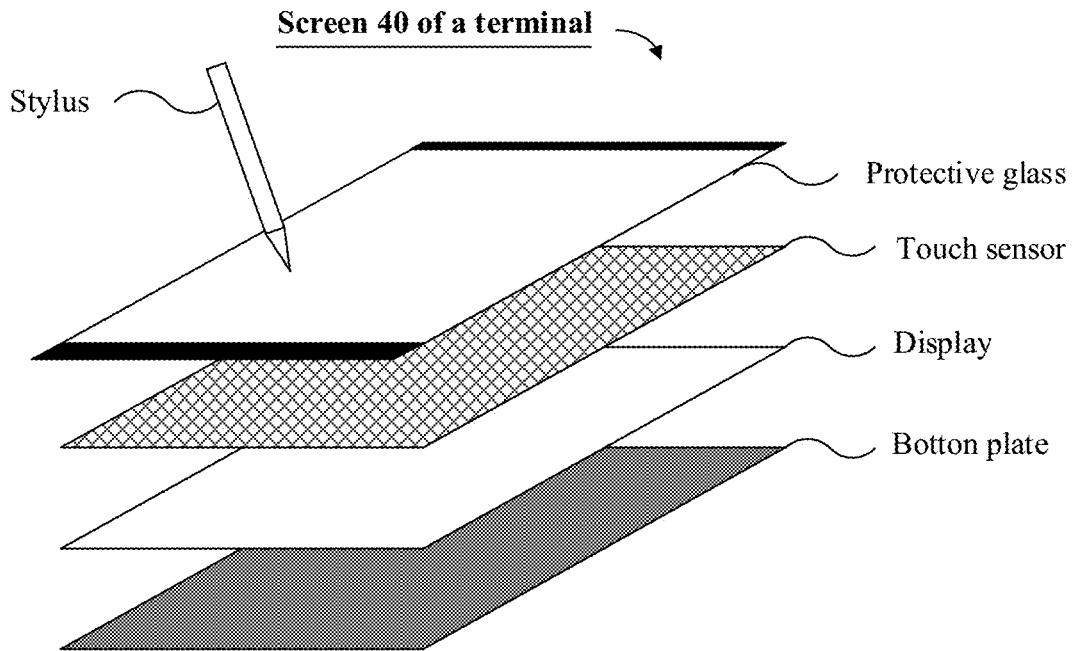
FIG. 4 is a schematic diagram of a structure of a terminal screen according to an embodiment of this application.

Refer to FIG. 4. FIG. 4 shows a screen 40 of a terminal according to this application. The screen 40 of the terminal may include protective glass, a touch sensor, a display, and a baseplate. The touch sensor and the display may form a touchscreen. For specific content, refer to the apparatus embodiment shown in FIG. 1. Details are not described herein.

Figure 5:
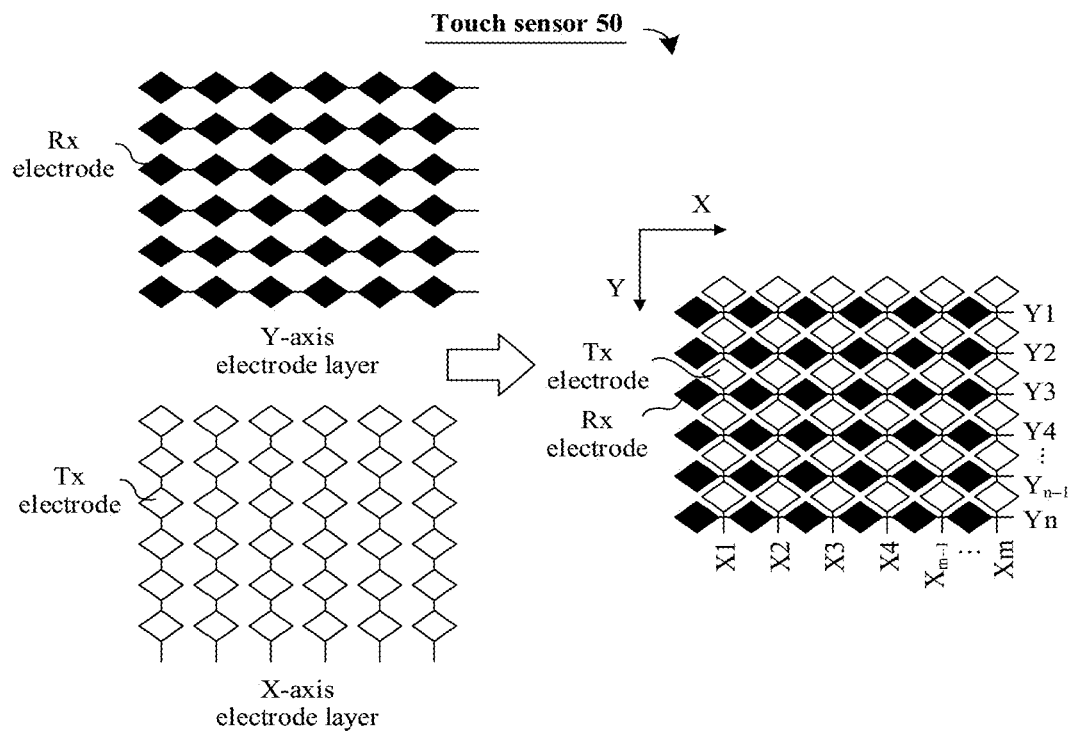
FIG. 5 is a schematic diagram of a touch sensor according to an embodiment of this application.

Refer to FIG. 5. FIG. 5 shows a touch sensor 50 according to this application. The touch sensor 50 may include an X-axis electrode layer and a Y-axis electrode layer. The X-axis electrode layer may include a plurality of transmit (transmit, Tx) electrodes distributed in a matrix manner. The Y-axis electrode layer may include a plurality of receive (receive, Rx) electrodes distributed in a matrix manner. A terminal may detect a touch operation of a finger through self-capacitance detection and mutual capacitance detection of a touchscreen. The terminal may detect an input operation of a stylus through the mutual capacitance detection of the touchscreen.

Based on the touch sensor 50 shown in FIG. 5, the following describes mutual capacitance detection and self-capacitance detection in this application.

1. The mutual capacitance detection: The transmit (transmit, Tx) electrodes and receive (receive, Rx) electrodes on the touch sensor 50 of the terminal form a network in which the transmit electrodes intersect with the receive electrodes. A mutual capacitance (namely, a capacitance formed by the Tx electrode and an adjacent Rx electrode) is formed at a crosspoint (namely, a coordinate point) between the Tx electrode and the Rx electrode. When the terminal scans and detects magnitude of a mutual capacitance of each coordinate point on the touchscreen, a touch control chip that is connected to the touchscreen and that is on the terminal sequentially sends an excitation signal on each Tx electrode. Then, the touch control chip scans a signal received by each Rx electrode. The touch control chip converts a measured voltage value into a digital signal in an analog-to-digital manner, and calculates a capacitance value. When the finger touches the touchscreen, the finger absorbs part of an excitation signal from the Tx electrode. Therefore, a signal received by the Rx electrode is weakened, so that touch location information of the finger can be calculated based on a capacitance change of each coordinate point on the touch sensor.

A manner in which the terminal detects the stylus is a mutual capacitance detection manner. When the stylus (proactive capacitive stylus) approaches the touchscreen and a nib of the stylus sends a signal, the nib of the stylus may replace the Tx electrode on the touchscreen. In this case, the Tx electrode and the original Rx electrode on the touchscreen sense a transmit signal of the stylus in turn in directions of a horizontal axis (the X axis) and a vertical axis (the Y axis) on the touchscreen. In this case, a mutual capacitance value of a contact point of the stylus received by the terminal is a coupling capacitance between the nib of the stylus and the Tx electrode or the Rx electrode on the touchscreen. In this way, the terminal may locate a capacitance peak crosspoint on the X axis and the Y axis to obtain location information of the nib of the stylus on the touchscreen.

A mutual capacitance detection frequency may be a frequency at which the touchscreen collects a capacitance value (namely, a mutual capacitance value) between a Tx electrode and an Rx electrode of each touch point on the touchscreen, and reports the mutual capacitance value on the touchscreen to the touch control chip. For example, 120 Hz frequency mutual capacitance detection may mean that the touchscreen collects a mutual capacitance value between a transmit (transmit, Tx) electrode and a receive (receive, Rx) electrode of each electrode crosspoint on the touchscreen, and reports the mutual capacitance value of each electrode crosspoint to the touch control chip at a frequency of 120 Hz.

The mutual capacitance detection frequency may also refer to a processing frequency at which the touch control chip calculates a coordinate location of the touch point based on the mutual capacitance value of each electrode crosspoint. The 120 Hz frequency mutual capacitance detection may also mean that after the touchscreen reports the mutual capacitance value between the Tx electrode and the Rx electrode of each electrode crosspoint on the touchscreen to the touch control chip, the touch control chip calculates the coordinate location of the touch point at a processing frequency of 120 Hz based on the mutual capacitance value between the Tx electrode and the Rx electrode of each electrode crosspoint.

2. The self-capacitance detection: When the terminal detects a touch operation of a user on the touchscreen in a self-capacitive manner, the Tx electrodes and the Rx electrodes on the touchscreen separately form capacitances (namely, self-capacitances) with the ground. The Tx electrodes and the Rx electrodes form a network in which the Tx electrodes intersect with the Rx electrodes. When the finger touches a capacitive touchscreen, a capacitance of the finger is superimposed on a screen capacitance (a self-capacitance formed by the Tx electrode and the ground, or a self-capacitance formed by the Rx electrode and the ground) of the touchscreen, to change an amount of the screen capacitance. When the terminal scans and detects magnitude of self-capacitances of electrodes at each coordinate point on the touchscreen, the terminal sequentially detects a Tx electrode array and an Rx electrode array, and may separately determine a horizontal (Tx electrode arrangement direction) coordinate and a vertical (Rx electrode arrangement direction) coordinate based on a change of the capacitances before and after a touch, to form touch coordinates on a two-dimensional plane.

A self-capacitance detection frequency may be a frequency at which the touchscreen collects self-capacitance values of electrodes at each touch point on the touchscreen, and reports the mutual capacitance values on the touchscreen to the touch control chip. For example, 120 Hz frequency self-capacitance detection may mean that the touchscreen collects a self-capacitance value of each electrode on the touchscreen, and reports the self-capacitance value of each electrode to the touch control chip at the frequency of 120 Hz.

The self-capacitance detection frequency may also refer to a processing frequency at which the touch control chip calculates the coordinate location of the touch point based on the self-capacitance value of each electrode. The 120 Hz frequency mutual capacitance detection may also mean that after the touchscreen reports the self-capacitance value of each electrode on the touchscreen to the touch control chip, the touch control chip calculates the coordinate location of the touch point based on the self-capacitance value of each electrode at the processing frequency of 120 Hz.

The following describes three detection states of the terminal for a finger touch input operation of the user on the touchscreen in this embodiment of this application: an active (Active) state, an idle (Idle) state, and a sleep (Sleep) state.

Active state: In the active state, the terminal detects a touch input operation of the user on the touchscreen in a touch detection state of the 120 Hz frequency mutual capacitance detection and the 120 Hz frequency self-capacitance detection.

Idle state: In the Idle state, the terminal detects the touch input operation of the user on the touchscreen in a touch detection state of 1 Hz frequency mutual capacitance detection and the 120 Hz frequency self-capacitance detection.

Sleep state: In the Sleep state, the terminal does not detect the touch input operation of the user on the touchscreen.

In a possible case, the terminal may detect the input signal of the stylus and an input signal of a finger touch in a detection manner of time division multiplexing. For example, a detection period in which the terminal detects a capacitance signal on the touch sensor is 33.34 ms. The period may be divided into two signal detection time intervals. To be specific, specific time periods of the two signal detection time intervals in the period may be a signal detection time interval A: 0 to 16.67 ms, and a pulse signal time interval B: 16.68 ms to 33.34 ms. The terminal may detect the input signal of the stylus at the signal detection time interval A, and detect a touch input of the user at the signal detection time interval B. The foregoing examples are merely used to explain this application, and shall not constitute a limitation. In a possible case, alternatively, the terminal may separately detect the input signal of the stylus and the input signal of the finger touch through two separate touch control chips.

The following describes in detail a stylus detection method according to an embodiment of this application with reference to the accompanying drawings and application scenarios.

Figure 6A:
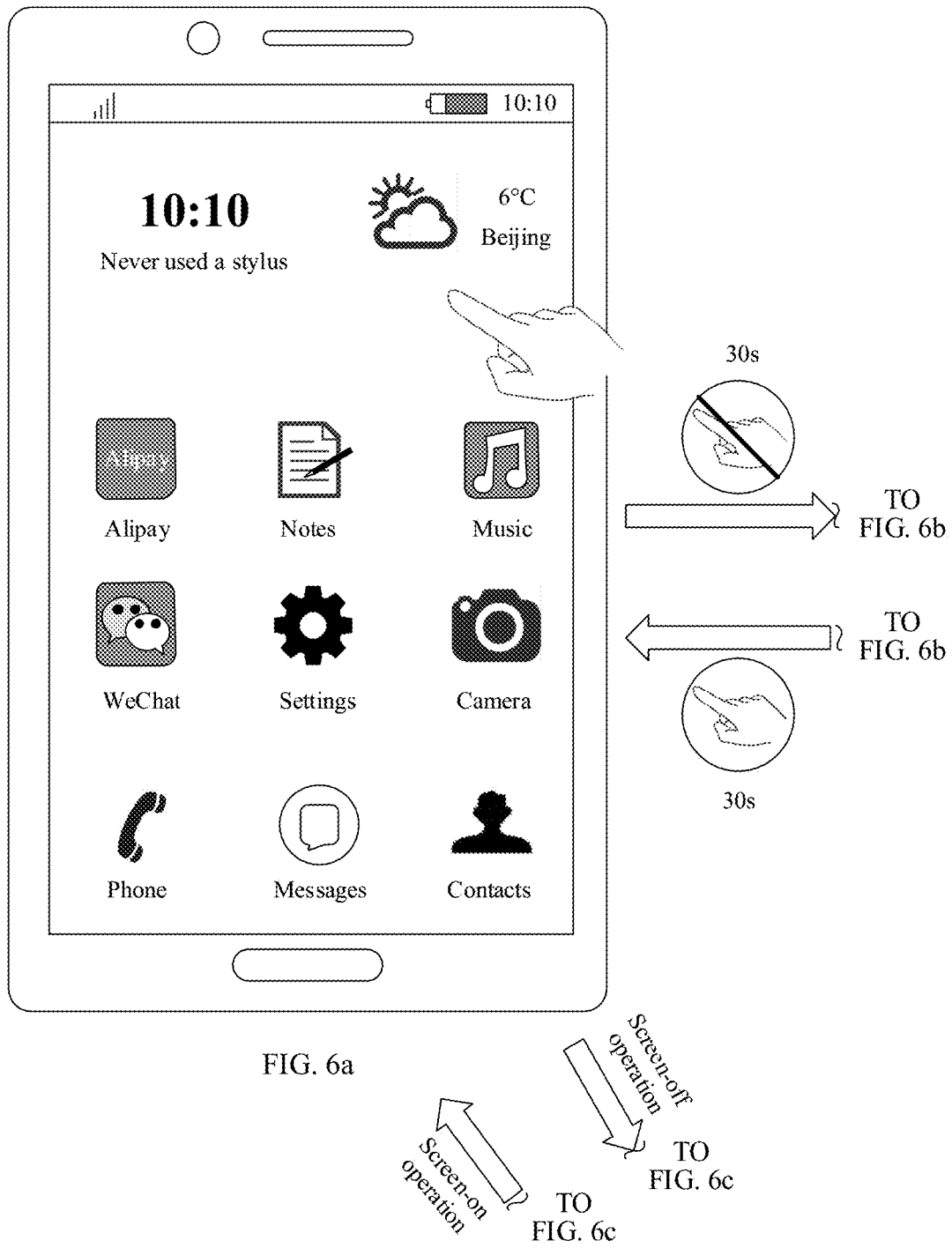
FIG. 6a to FIG. 6c are a schematic diagram of a group of screens according to an embodiment of this application.
Figure 6B:
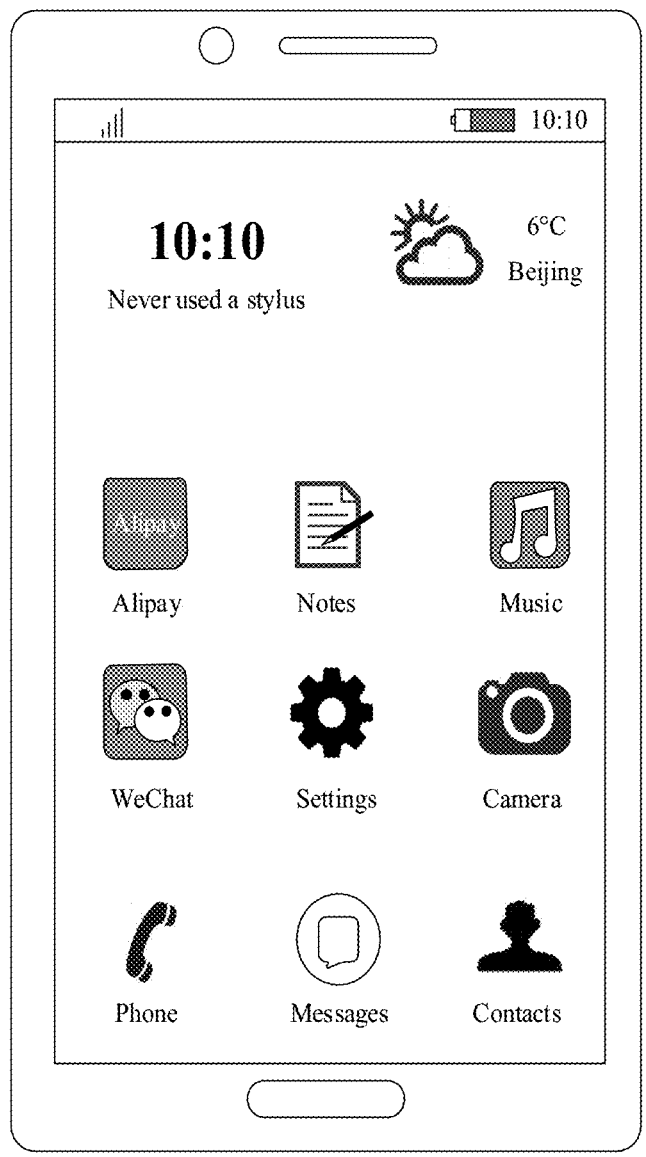
Figure 6B:
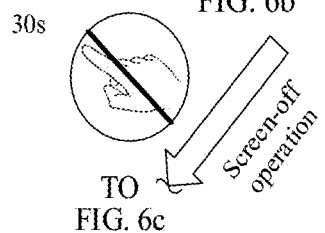
Figure 6C:
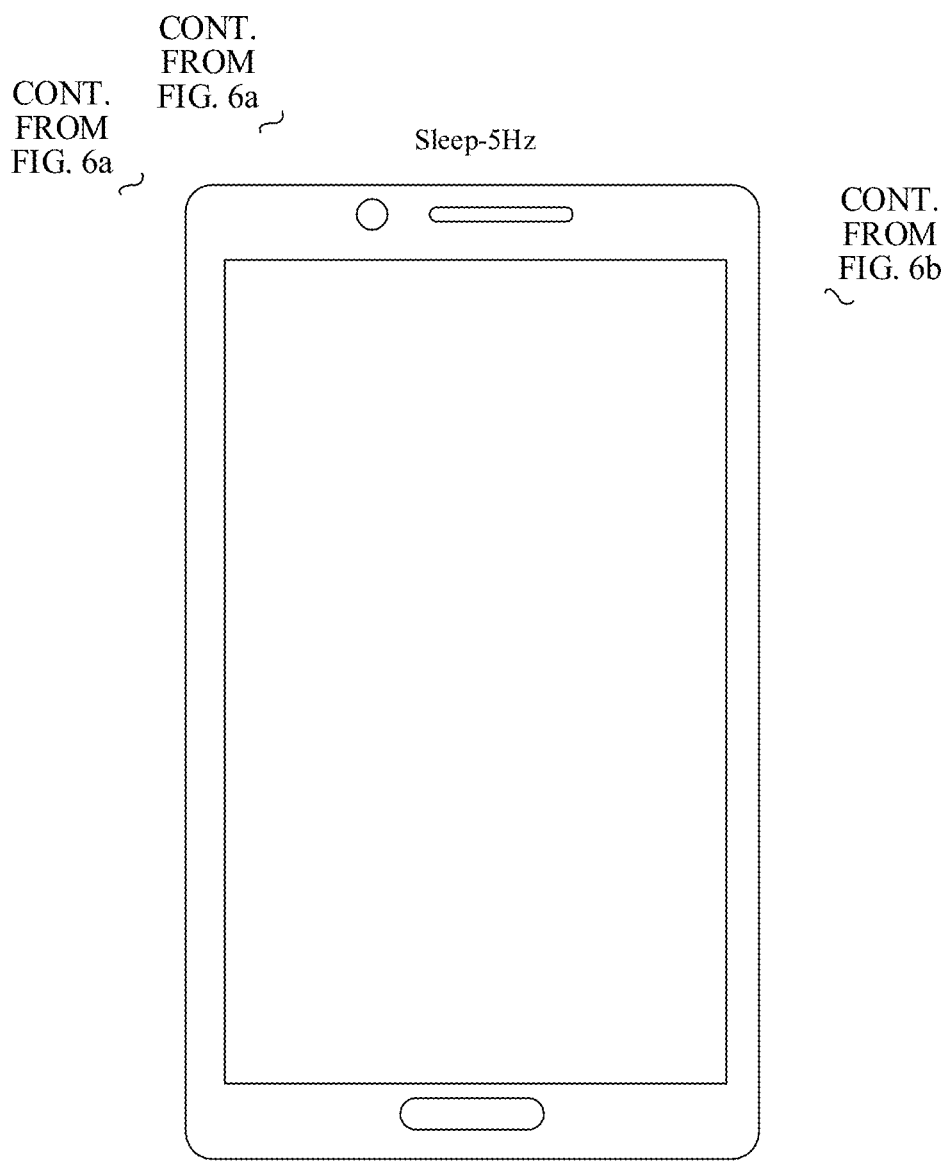

When a terminal is set before delivery, a stylus function on the terminal is enabled by default, and the terminal may scan and detect an input signal of a stylus at a first frequency (for example, 5 Hz) of a touchscreen. After the terminal receives the input signal of the stylus through the touchscreen, the terminal may switch to a second frequency (for example, 480 Hz) to scan an input signal state of the stylus, to implement smooth writing of the stylus on the terminal. Specific implementations may be as follows:

Refer to FIG. 6a to FIG. 6c. FIG. 6a, FIG. 6b, and FIG. 6c show an initial touch detection state and an initial stylus frequency detection state of the terminal after factory settings. In the detection states of the touchscreen shown in FIG. 6a to FIG. 6c, a user has not used the stylus. As shown in FIG. 6a, in an Active-5 Hz state, the terminal may detect an input signal of a touch operation of a user through the touchscreen at a 120 Hz mutual capacitance detection frequency and a 120 Hz self-capacitance detection frequency, and the terminal may detect the input signal of the stylus through the touchscreen at a scanning detection frequency of 5 Hz. As shown in FIG. 6b, in an Idle-5 Hz state, the terminal may detect the input signal of the touch operation through the touchscreen at a 1 Hz mutual capacitance detection frequency and the 120 Hz self-capacitance detection frequency, and the terminal may detect the input signal of the stylus through the touchscreen at the scanning detection frequency of 5 Hz. As shown in FIG. 6c, in a Sleep-5 Hz state, the terminal may not detect the input signal of the touch operation of the user on the touchscreen, and the terminal may detect the input signal of the stylus through the touchscreen at the scanning detection frequency of 5 Hz.

When the terminal detects the input signal of the touch operation of the user, a scanning detection state of the touchscreen of the terminal may be the Active-5 Hz state shown in FIG. 6a. If the terminal may be in the Active-5 Hz state shown in FIG. 6a, and duration in which the terminal does not detect the input signal of the touch operation of the user is greater than a preset time period (for example, 30 seconds, 1 minute, 2 minutes, or longer), the terminal may switch from the Active-5 Hz state shown in FIG. 6a to the Idle-5 Hz state shown in FIG. 4b.

If the terminal detects the input signal of the touch operation of the user in the Idle-5 Hz state shown in FIG. 6*b*, the terminal may switch from the Idle-5 Hz state shown in FIG. 6*b* to the Active-5 Hz state shown in FIG. 6*a*.

If the terminal is in the Idle-5 Hz state shown in FIG. 6*b*, and the duration in which the terminal does not detect the input signal of the touch operation of the user is greater than the preset time period (for example, 30 seconds, 1 minute, 2 minutes, or longer), the terminal may switch from the Idle-5 Hz state shown in FIG. 6*b* to the Sleep-5 Hz state shown in FIG. 6*c*. In the Sleep-5 Hz state, the terminal may not detect the input signal of the touch operation of the user, and the terminal may detect the input signal of the stylus through the touchscreen at the scanning detection frequency of 5 Hz.

In a possible case, the terminal is in the Active-5 Hz state shown in FIG. 6*a*, or in the Idle-5 Hz state shown in FIG. 6*b*. If the terminal receives a screen-off operation (for example, pressing a power key once) of the user, the terminal may switch from the Active-5 Hz state or the Idle-5 Hz state to the Sleep-5 Hz state. In a possible case, the terminal is in the Sleep-5 Hz state shown in FIG. 6*c*. If the terminal receives a screen-on operation (for example, pressing the power key once when the terminal is screen-off) of the user, the terminal may switch from the Sleep-5 Hz state to the Active-5 Hz state.

Figure 7A:
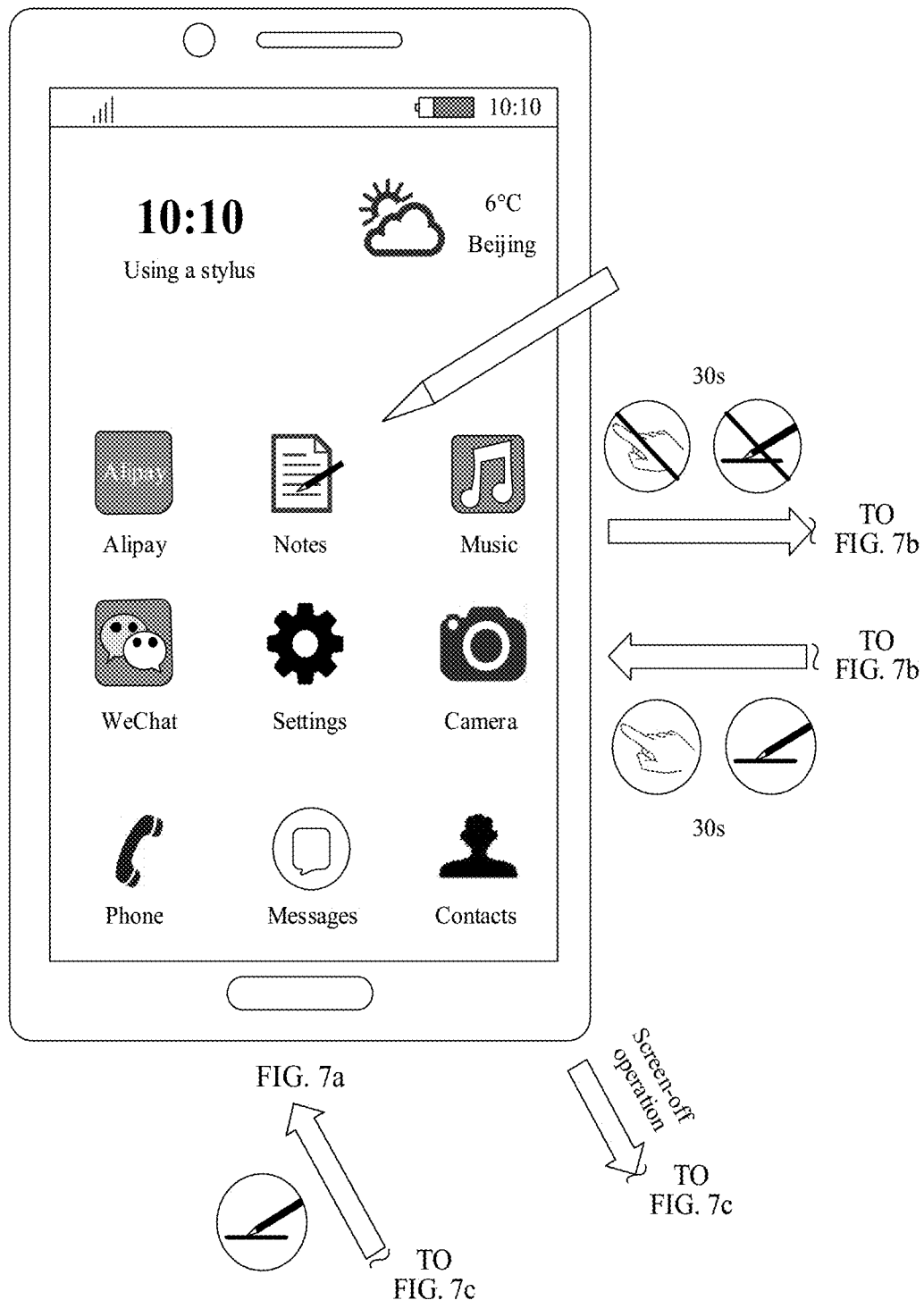

When the terminal is in the Active-5 Hz state shown in FIG. 6*a*, the Idle-5 Hz state shown in FIG. 6*b*, or the Sleep-5 Hz state shown in FIG. 6*c*, if the terminal detects the input signal of the stylus, the terminal may switch to an Active-480 Hz state shown in FIG. 7*a*.

Figure 7C:
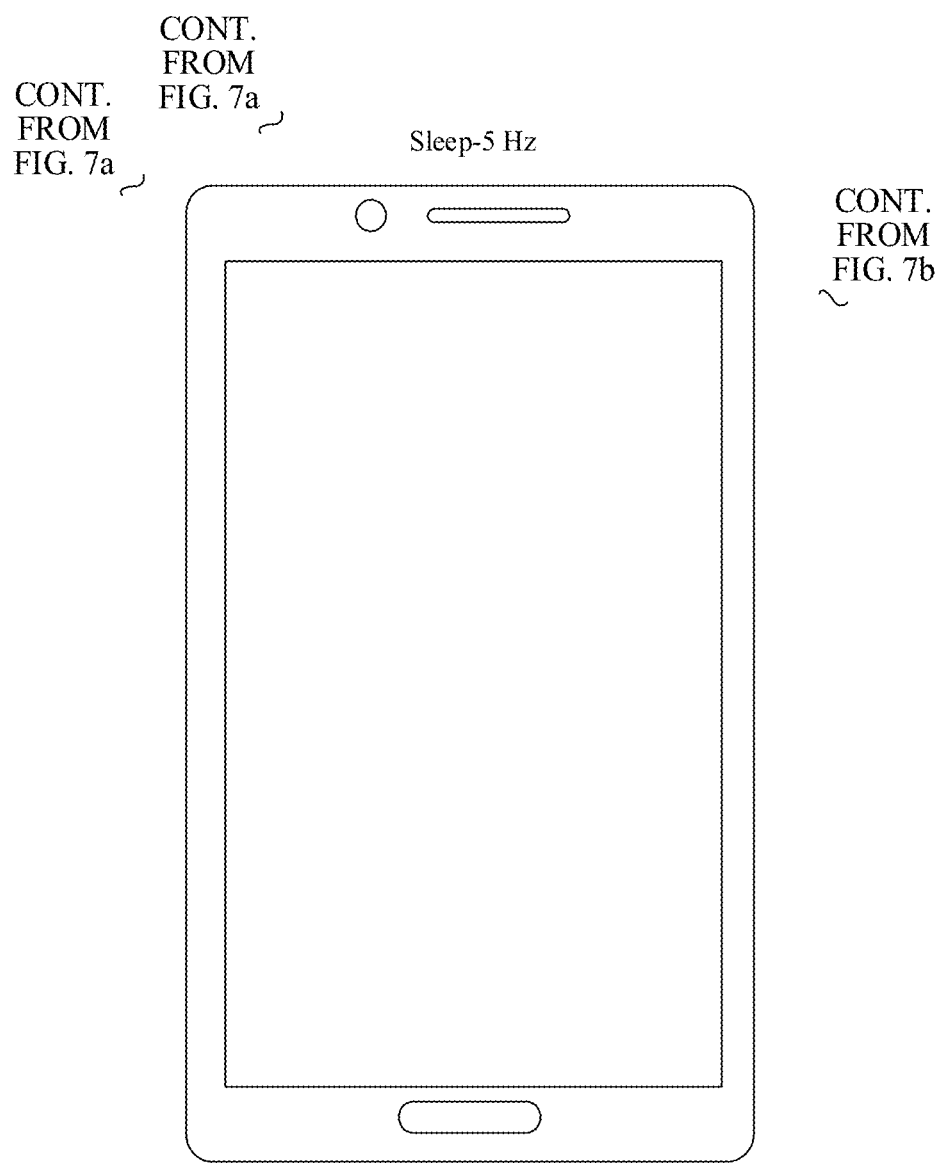

Refer to FIG. 7*a* to FIG. 7*c*. FIG. 7*a*, FIG. 7*b*, and FIG. 7*c* show several detection states of the terminal after the terminal has received an input of the stylus.

As shown in FIG. 7*a*, in the Active-480 Hz state, the terminal may detect the input signal of the touch operation through the touchscreen at the 120 Hz mutual capacitance detection frequency and the 120 Hz self-capacitance detection frequency, and the terminal may detect the input signal of the stylus through the touchscreen at a scanning detection frequency of 480 Hz.

As shown in FIG. 7*b*, in an Idle-60 Hz state, the terminal may detect the input signal of the touch operation at the 1 Hz mutual capacitance detection frequency and the 120 Hz self-capacitance detection frequency, and the terminal may detect the input signal of the stylus through the touchscreen at a scanning detection frequency of 60 Hz.

As shown in FIG. 7*c*, in the Sleep-5 Hz state, the terminal may not detect the input signal of the touch operation of the user on the touchscreen, and the terminal may detect the input signal of the stylus through the touchscreen at the scanning detection frequency of 5 Hz.

When the terminal detects the input signal of the stylus for a first time, the scanning detection state of the touchscreen of the terminal may be switched to the Active-480 Hz state of the terminal shown in FIG. 7*a*. For example, in the Active-5 Hz state of the terminal shown in FIG. 6*a*, if the terminal detects the input signal of the stylus for the first time, the terminal may switch from the Active-5 Hz state to the Active-480 Hz state. In other words, the terminal increases a detection frequency for the stylus from 5 Hz to 480 Hz. For another example, in the Idle-5 Hz state of the terminal shown in FIG. 6*b*, if the terminal detects the input signal of the stylus for the first time, the terminal may switch from the Idle-5 Hz state to the Active-480 Hz state of the terminal shown in FIG. 7*a*. In other words, the terminal may switch a finger touch detection state from an Idle state to an Active state, and increase the detection frequency for the stylus from 5 Hz to 480 Hz. For another example, in the Sleep-5 Hz state of the terminal shown in FIG. 6*c*, if the terminal detects the input signal of the stylus for the first time, the terminal may switch from the Sleep-5 Hz state to the Active-480 Hz state. In other words, the terminal may switch the finger touch detection state from a Sleep state to the Active state, and increase the detection frequency for the stylus from 5 Hz to 480 Hz.

When the terminal is in the Active-480 Hz state shown in FIG. 7*a*, if the terminal does not detect the input signal of the stylus through the touchscreen, and duration in which the terminal does not detect an input signal of a user touch through the touchscreen is greater than the preset time period (for example, 30 seconds, 1 minute, 2 minutes, or longer), the terminal may switch from the Active-480 Hz state shown in FIG. 7*a* to the Idle-60 Hz state shown in FIG. 7*b*.

When the terminal is in the Idle-60 Hz state shown in FIG. 7*b*, if the terminal does not detect the input signal of the stylus through the touchscreen and the duration in which the terminal does not detect the input signal of the touch operation of the user through the touchscreen is greater than the preset time period (for example, 30 seconds, 1 minute, 2 minutes, or longer), the terminal may switch from the Idle-60 Hz state shown in FIG. 7*b* to the Sleep-5 Hz state shown in FIG. 7*c*. In a possible case, when the terminal is in the Idle-60 Hz state shown in FIG. 7*b*, if the terminal detects the input signal of the stylus through the touchscreen or detects the input signal of the touch operation of the user through the touchscreen, the terminal may switch from the Idle-60 Hz state shown in FIG. 7*b* to the Active-480 Hz state shown in FIG. 7*a*. In this way, when the terminal detects the input signal of the stylus at a high frequency (for example, 480 Hz), if the terminal does not detect the input signal of the stylus within a period of time (for example, 30 s to 60 s), the terminal may reduce the detection frequency to a medium frequency (for example, 60 Hz), and wait for the input signal of the stylus to arrive again. In this way, when the input signal of the stylus arrives again, the terminal may quickly make a response and perform an action corresponding to the input signal of the stylus that arrives again. This improves user experience. For example, when the stylus temporarily stops writing and then writes again, the terminal may quickly record handwriting of the stylus, to ensure continuity of the handwriting of the stylus, so as to improve user writing experience.

When the terminal is in the Active-480 Hz state shown in FIG. 7*a* or in the Idle-60 Hz state shown in FIG. 7*b*, if the terminal receives the screen-off operation (for example, pressing the power key once) of the user, the terminal may switch from the Active-480 Hz state shown in FIG. 7*a* or the Idle-60 Hz state shown in FIG. 7*b* to the Sleep-5 Hz state shown in FIG. 7*c*.

When the terminal is in the Sleep-5 Hz state shown in FIG. 7*c*, if the terminal detects the input signal of the stylus through the touchscreen, the terminal may switch from the Sleep-5 Hz state shown in FIG. 7*c* to the Active-480 Hz state shown in FIG. 7*a*. In a possible case, when the terminal is in the Sleep-5 Hz state shown in FIG. 7*c*, if the terminal receives the screen-on operation (for example, pressing the power key once when the terminal is screen-off) of the user, the terminal may switch from the Sleep-5 Hz state shown in FIG. 7*c* to the Active-480 Hz state shown in FIG. 7*a*.

Figure 8A:
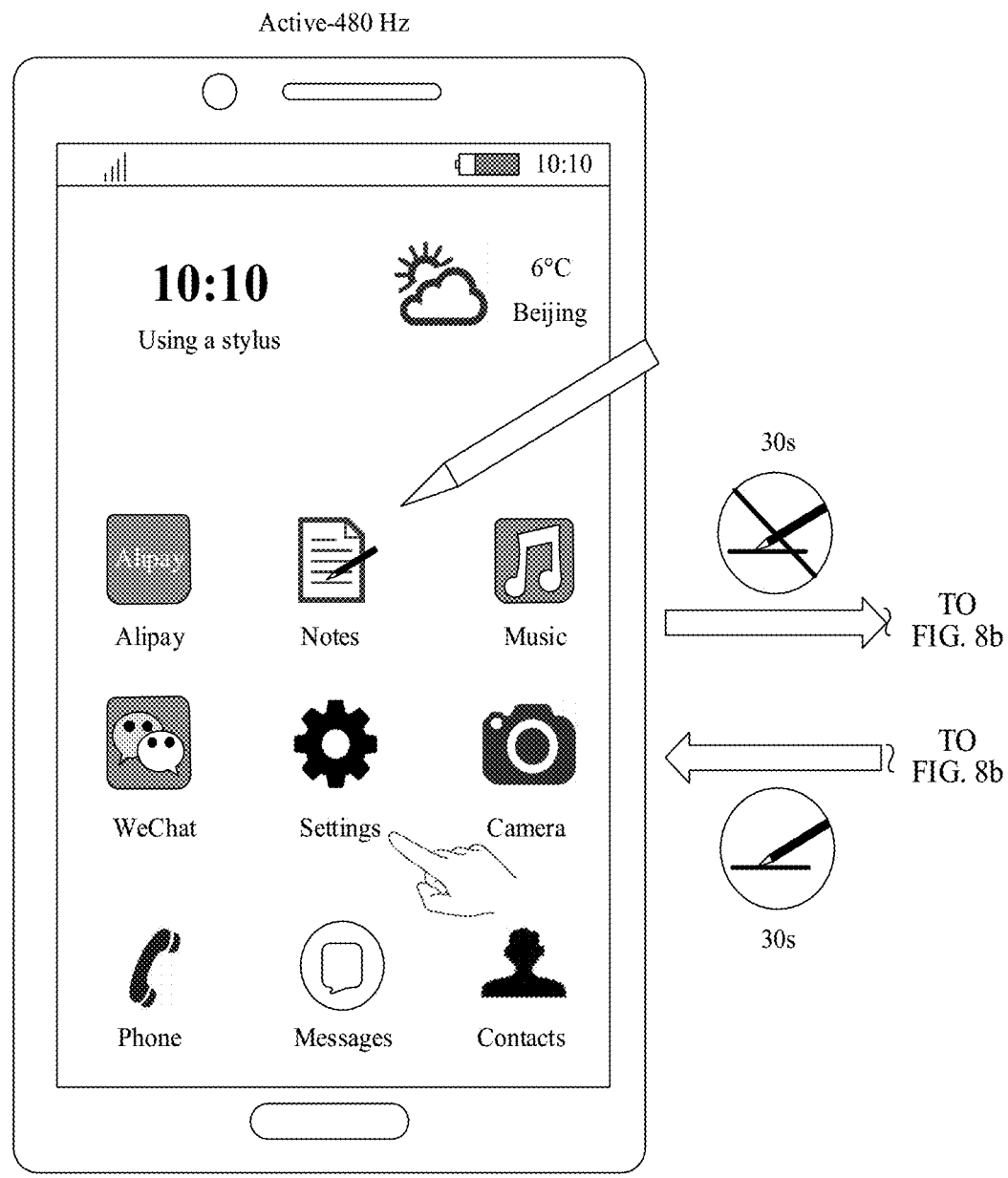
FIG. 8a to FIG. 8d are a schematic diagram of another group of screens according to an embodiment of this application.

In a possible case, when the terminal is in the Active-5 Hz state shown in FIG. 6*a*, the Idle-5 Hz state shown in FIG. 6*b*, or the Sleep-5 Hz state shown in FIG. 6*c*, if the terminal detects the input signal of the stylus, the terminal may switch to the Active-480 Hz state shown in FIG. 8a.

Figure 8B:
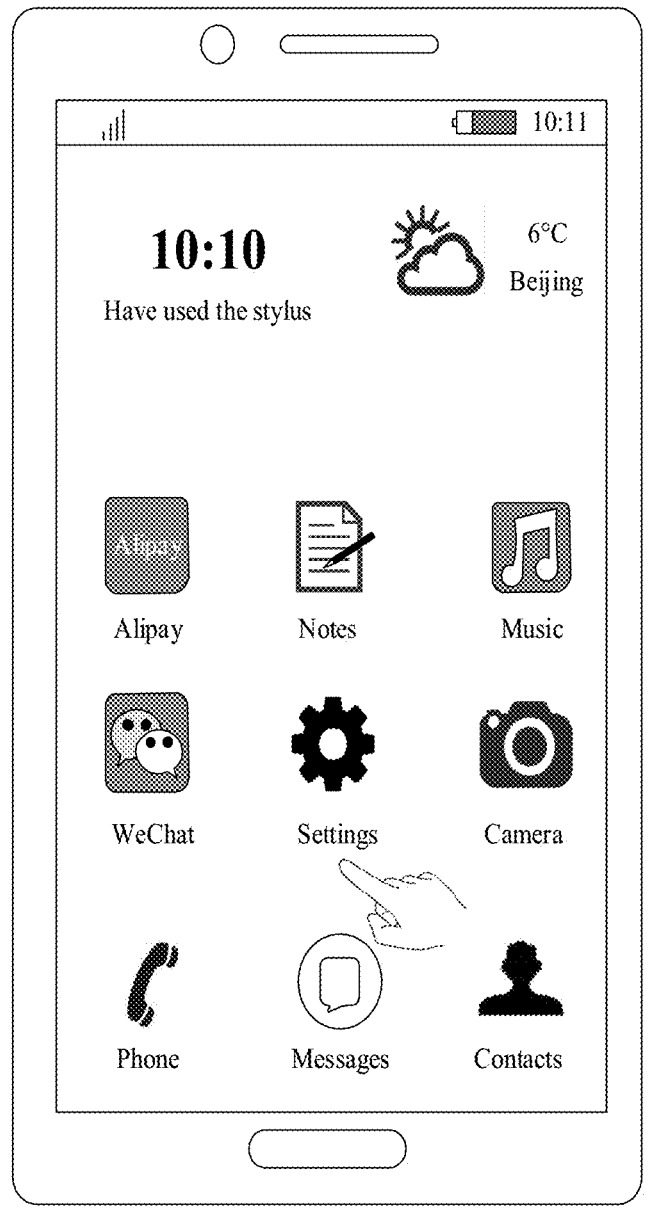
Figure 8B:
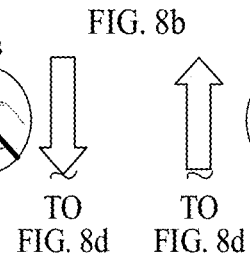
Figure 8C:
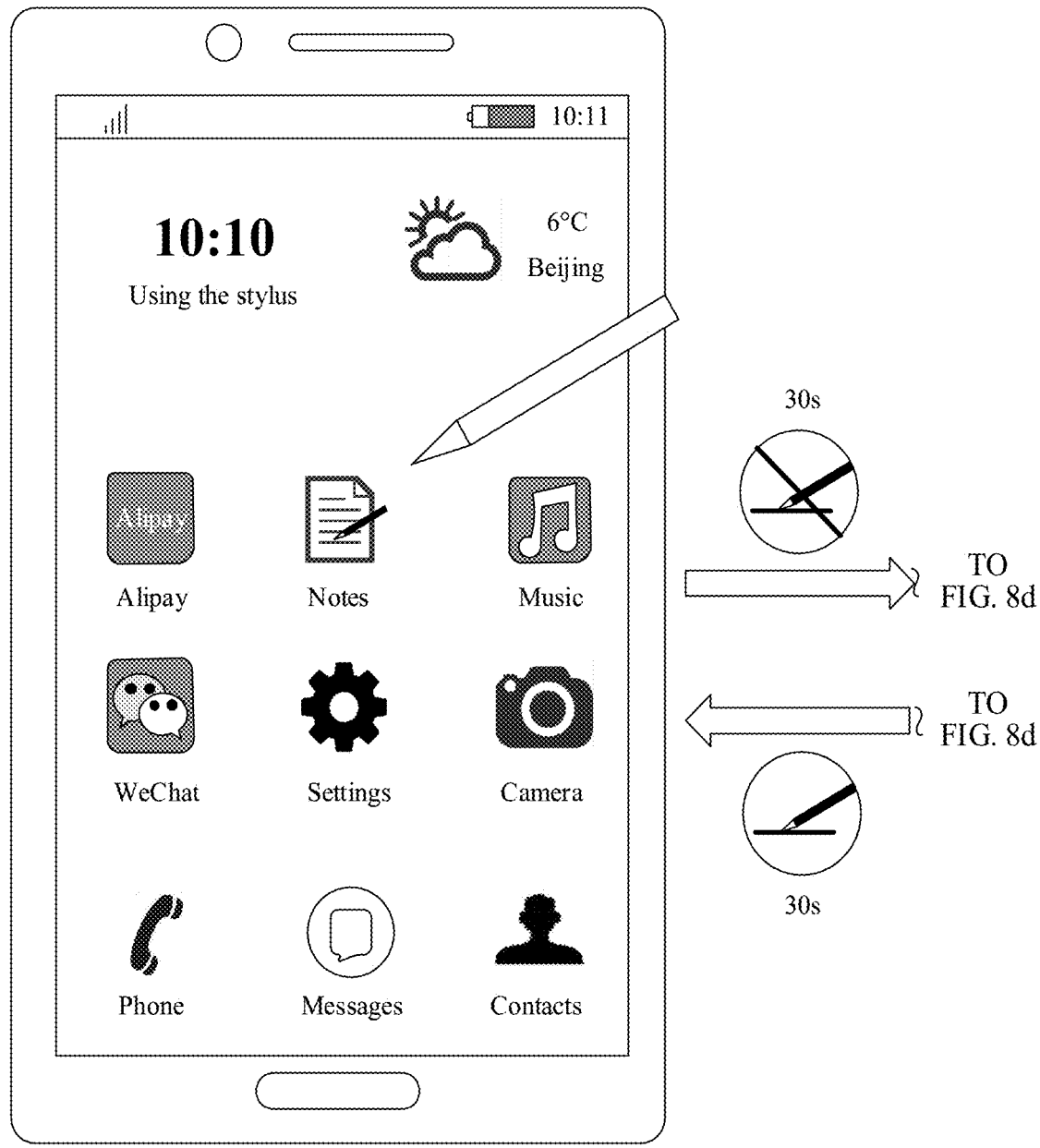

Refer to FIG. 8a to FIG. 8d. FIG. 8a, FIG. 8b, and FIG. 8c show several detection states of the terminal after the terminal receives an input of the stylus of the user.

As shown in FIG. 8a, in the Active-480 Hz state, the terminal may detect the input signal of the touch operation of the user through the touchscreen at the 120 Hz mutual capacitance detection frequency and the 120 Hz self-capacitance detection frequency, and the terminal may detect the input signal of the stylus through the touchscreen at the scanning detection frequency of 480 Hz.

As shown in FIG. 8b, in an Active-60 Hz state, the terminal may detect the input signal of the touch operation of the user through the touchscreen at the 120 Hz mutual capacitance detection frequency and the 120 Hz self-capacitance detection frequency, and the terminal may detect the input signal of the stylus through the touchscreen at the scanning detection frequency of 60 Hz. As shown in FIG. 8c, in an Idle-480 Hz state, the terminal may detect the input signal of the touch operation of the user at the 1 Hz mutual capacitance detection frequency and the 120 Hz self-capacitance detection frequency, and the terminal may detect the input signal of the stylus through the touchscreen at the scanning detection frequency of 480 Hz.

Figure 8D:
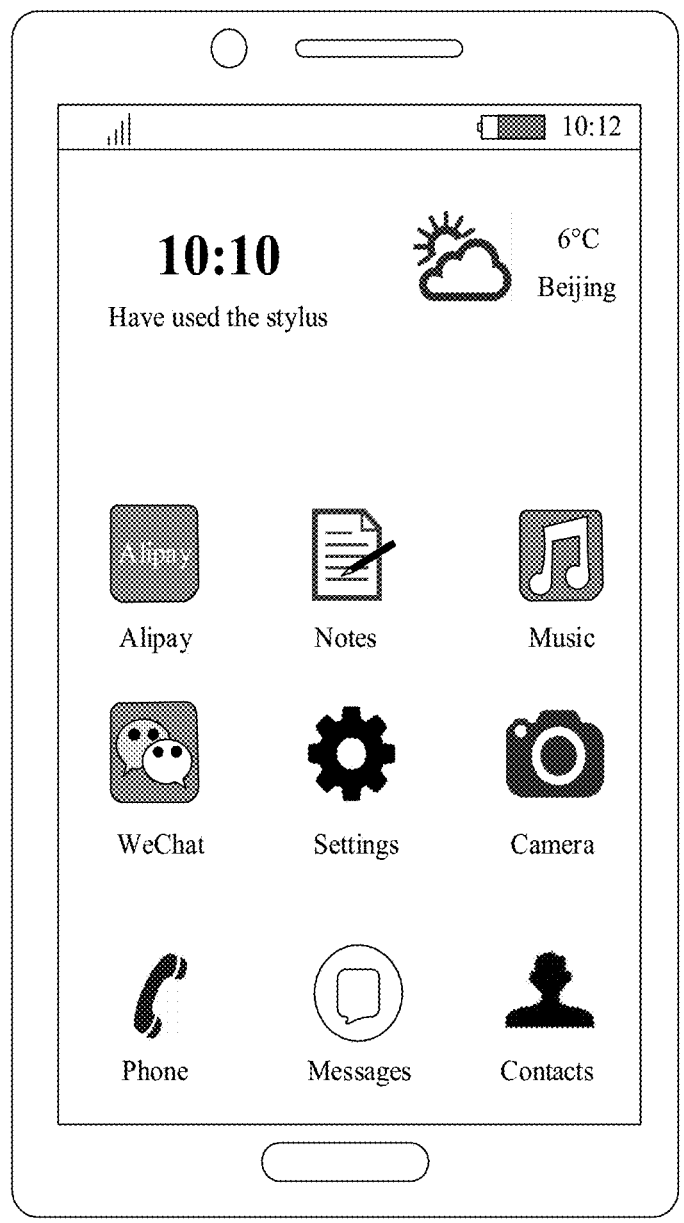

As shown in FIG. 8d, in the Idle-60 Hz state, the terminal may detect the input signal of the touch operation of the user at the 1 Hz mutual capacitance detection frequency and the 120 Hz self-capacitance detection frequency, and the terminal may detect the input signal of the stylus through the touchscreen at the scanning detection frequency of 60 Hz.

When the terminal is in the Active-480 Hz state shown in FIG. 8a, and duration in which the terminal does not detect the input signal of the stylus through the touchscreen is greater than the preset time period (for example, 30 seconds, 1 minute, 2 minutes, or longer), the terminal may switch from the Active-480 Hz state shown in FIG. 8a to the Active-60 Hz state shown in FIG. 8b. In a possible case, when the terminal is in the Active-480 Hz state shown in FIG. 8a, and the duration in which the terminal does not detect the input signal of the touch operation of the user through the touchscreen is greater than the preset time period (for example, 30 seconds, 1 minute, 2 minutes, or longer), the terminal may switch from the Active-480 Hz state shown in FIG. 8a to the Idle-480 Hz state shown in FIG. 8c.

When the terminal is in the Active-60 Hz state shown in FIG. 8b, and the duration in which the terminal does not detect the input signal of the touch operation of the user through the touchscreen is greater than a fifth time period, the terminal may switch from the Active-60 Hz state shown in FIG. 8b to the Idle-60 Hz state shown in FIG. 8d. In a possible case, when the terminal is in the Active-60 Hz state shown in FIG. 8b, if the terminal detects the input signal of the stylus through the touchscreen, the terminal may switch from the Active-60 Hz state shown in FIG. 8b to the Active-480 Hz state shown in FIG. 8a.

When the terminal is in the Idle-480 Hz state shown in FIG. 8c, and the duration in which the terminal does not detect the input signal of the stylus through the touchscreen is greater than the preset time period (for example, 30 seconds, 1 minute, 2 minutes, or longer), the terminal may switch from the Active-480 Hz state shown in FIG. 8c to the Active-60 Hz state shown in FIG. 8d. In a possible case, when the terminal is in the Idle-480 Hz state shown in FIG. 8c, if the terminal detects the input signal of the touch operation of the user through the touchscreen, the terminal may switch from the idle-60 Hz state shown in FIG. 8c to the Active-480 Hz state shown in FIG. 8a.

When the terminal is in the Idle-60 Hz state shown in FIG. 8d, if the terminal detects the input signal of the touch operation of the user through the touchscreen, the terminal may switch from the Idle-60 Hz state shown in FIG. 8d to the Active-60 Hz state shown in FIG. 8b. In a possible case, when the terminal is in the Idle-60 Hz state shown in FIG. 8d, if the terminal detects the input signal of the stylus through the touchscreen, the terminal may switch from the Idle-60 Hz state shown in FIG. 8d to the Idle-480 Hz state shown in FIG. 8c. In a possible case, when the terminal is in the Idle-60 Hz state shown in FIG. 8d, if the terminal does not detect the input signal of the stylus through the touchscreen and the duration in which the terminal does not detect the input signal of the touch operation of the user through the touchscreen is greater than the preset time period (for example, 30 seconds, 1 minute, 2 minutes, or longer), the terminal may switch from the idle-60 Hz state shown in FIG. 8d to the Sleep-5 Hz state (the Sleep-5 Hz state is not shown in FIG. 8a to FIG. 8d, and reference may be made to FIG. 7c).

When the terminal is in the Active-480 Hz state shown in FIG. 8a, or in the Active-60 Hz state shown in FIG. 8b, or in the Idle-480 Hz state shown in FIG. 8c, or in the Idle-60 Hz state shown in FIG. 8d, if the terminal receives the screen-off operation (for example, pressing the power key once) of the user, the terminal may switch from the Active-480 Hz state shown in FIG. 8a, or the Active-60 Hz state shown in FIG. 8b, or the Idle-480 Hz state shown in FIG. 8c to the Sleep-5 Hz state (the Sleep-5 Hz state is not shown in FIG. 8a to FIG. 8d, and reference may be made to FIG. 7c).

When the terminal is in the Sleep-5 Hz state (the Sleep-5 Hz state is not shown in FIG. 8a to FIG. 8d, and reference may be made to FIG. 7c), if the terminal detects the input signal of the stylus through the touchscreen, the terminal may switch from the Sleep-5 Hz state to the Active-480 Hz state shown in FIG. 8a. In a possible case, when the terminal is in the Sleep-5 Hz state (the Sleep-5 Hz state is not shown in FIG. 8a to FIG. 8d, and reference may be made to FIG. 7c), if the terminal receives the screen-on operation (for example, pressing the power key once when the terminal is screen-off) of the user, the terminal may switch from the Sleep-5 Hz state to the Active-480 Hz state shown in FIG. 8a.

Figure 9A:
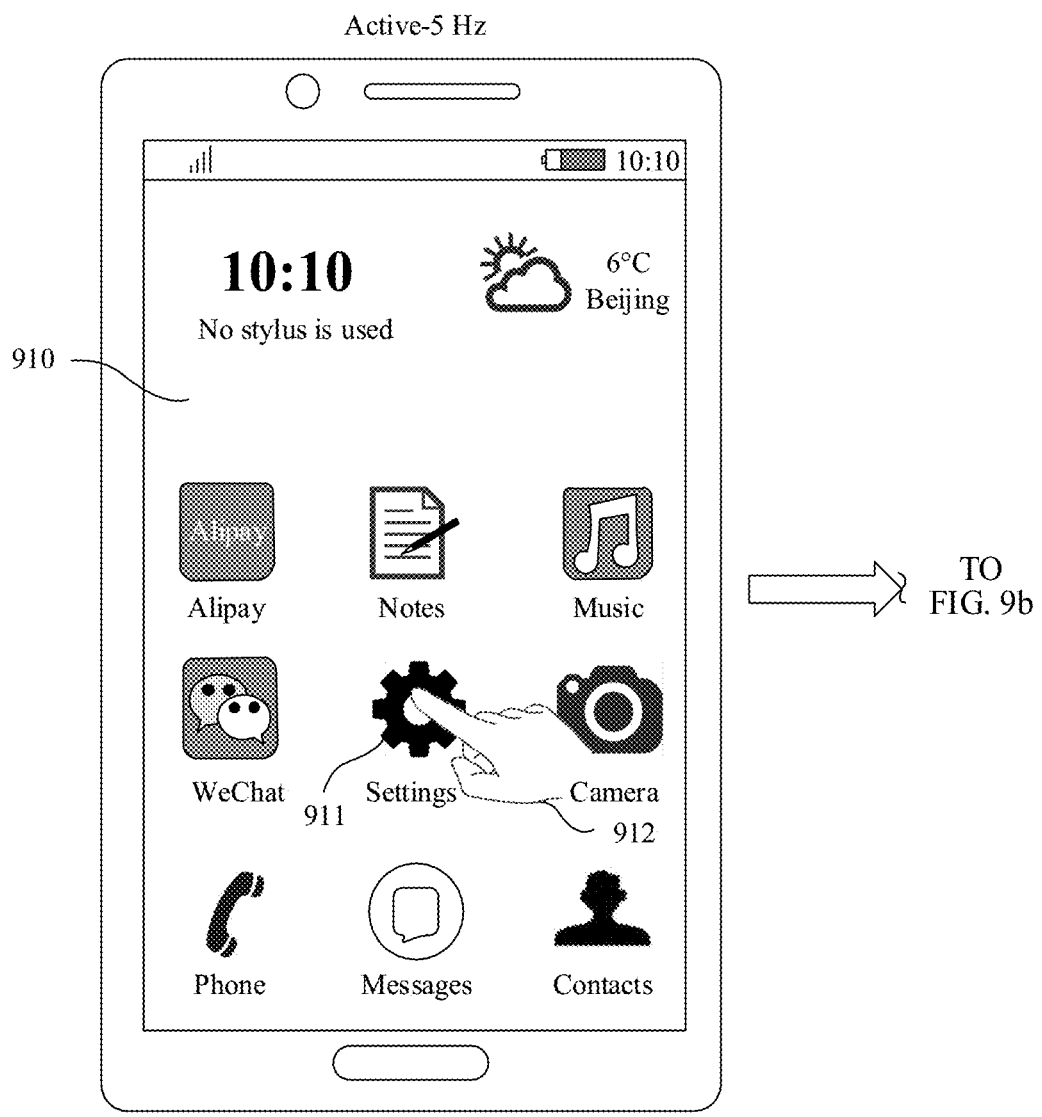
FIG. 9a to FIG. 9d are a schematic diagram of another group of screens according to an embodiment of this application.

Refer to FIG. 9a to FIG. 9d. FIG. 9a shows a home screen 910 displayed by the terminal in the Active-5 Hz state when a stylus function is enabled. In FIG. 9a, there is no use record of the stylus on the terminal. In other words, the terminal has not received the input signal of the stylus. The home screen 910 may include an icon 911 for setting an application and an icon of another application (for example, Alipay, Notes, Music, WeChat, Camera, Phone, Messages, or Contacts). The terminal may receive a touch operation 912 (for example, a tap) of the user on the icon 911 for setting an application on the home screen 910. In response to the touch operation 912, the terminal may display, on the touchscreen, a settings screen 920 shown in 9b in FIG. 9.

After the terminal receives the input signal of the stylus, the terminal may store, in a memory, an event that the terminal detects the input signal of stylus. For example, the terminal may store, in the memory by using a 1-bit field, the event that the terminal detects the input signal of the stylus. If a value of the 1-bit field is 1, it indicates that there is a use record of the stylus on the terminal. Alternatively, if the value of the 1-bit field is 0, it indicates that there is no use record of the stylus on the terminal.

Figure 9B:
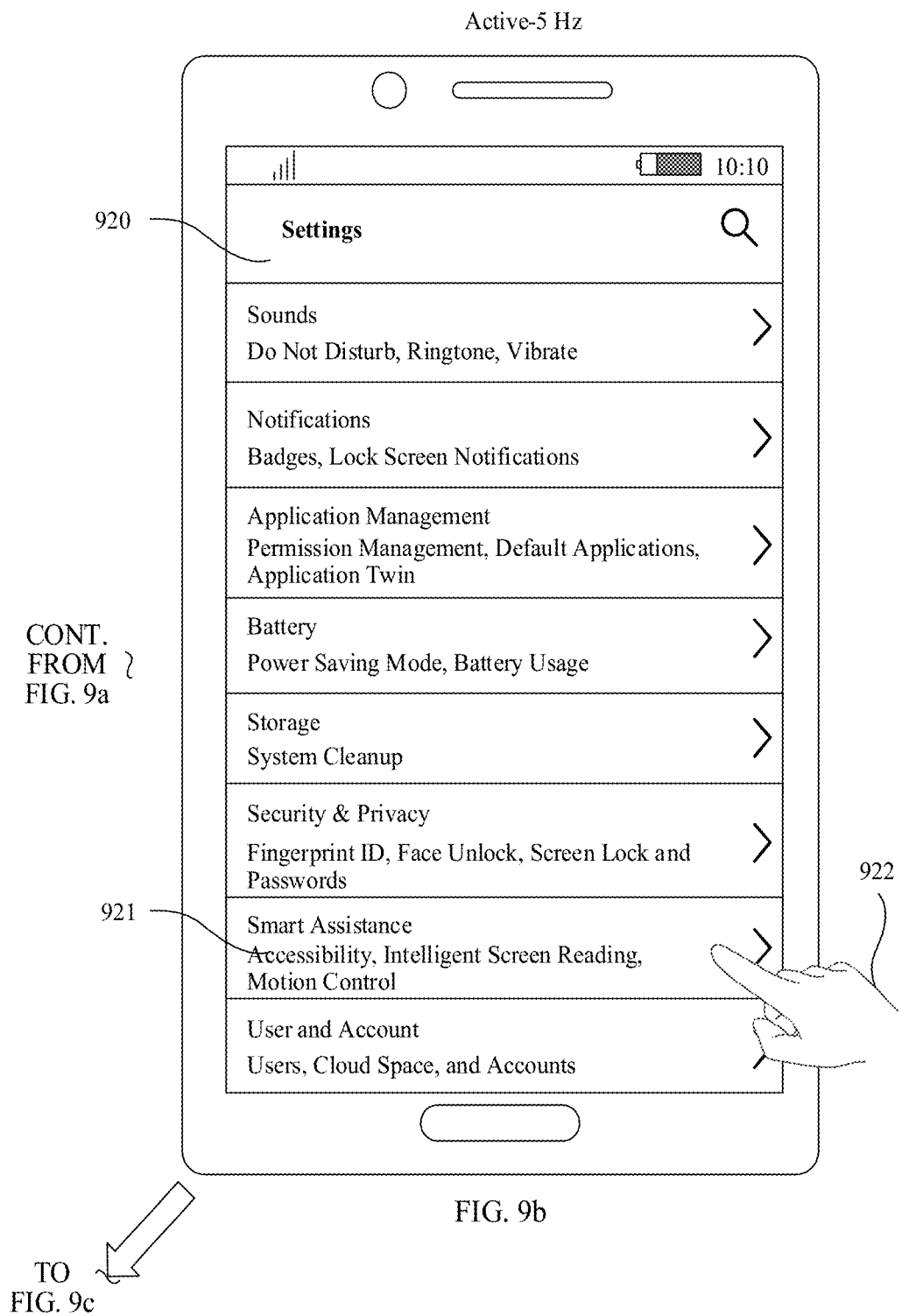

As shown in FIG. 9b, the stylus function on the terminal is enabled, and the terminal is in the Active-5 Hz state, but there is no record of using the stylus by the user on the terminal. The settings screen 920 may include a smart assistance setting bar 921 and another setting bar (for example, a sound setting bar, a notification center setting bar, an application management setting bar, a battery setting bar, a storage setting bar, a security and privacy setting bar, and a user and account setting bar). The terminal may receive a touch operation 922 (for example, a tap) of the user on the smart assistance setting bar 921 on the settings screen 920. In response to the touch operation 922, the terminal may display, on the touchscreen, a smart assistance settings screen 930 shown in FIG. 9c.

Figure 9C:
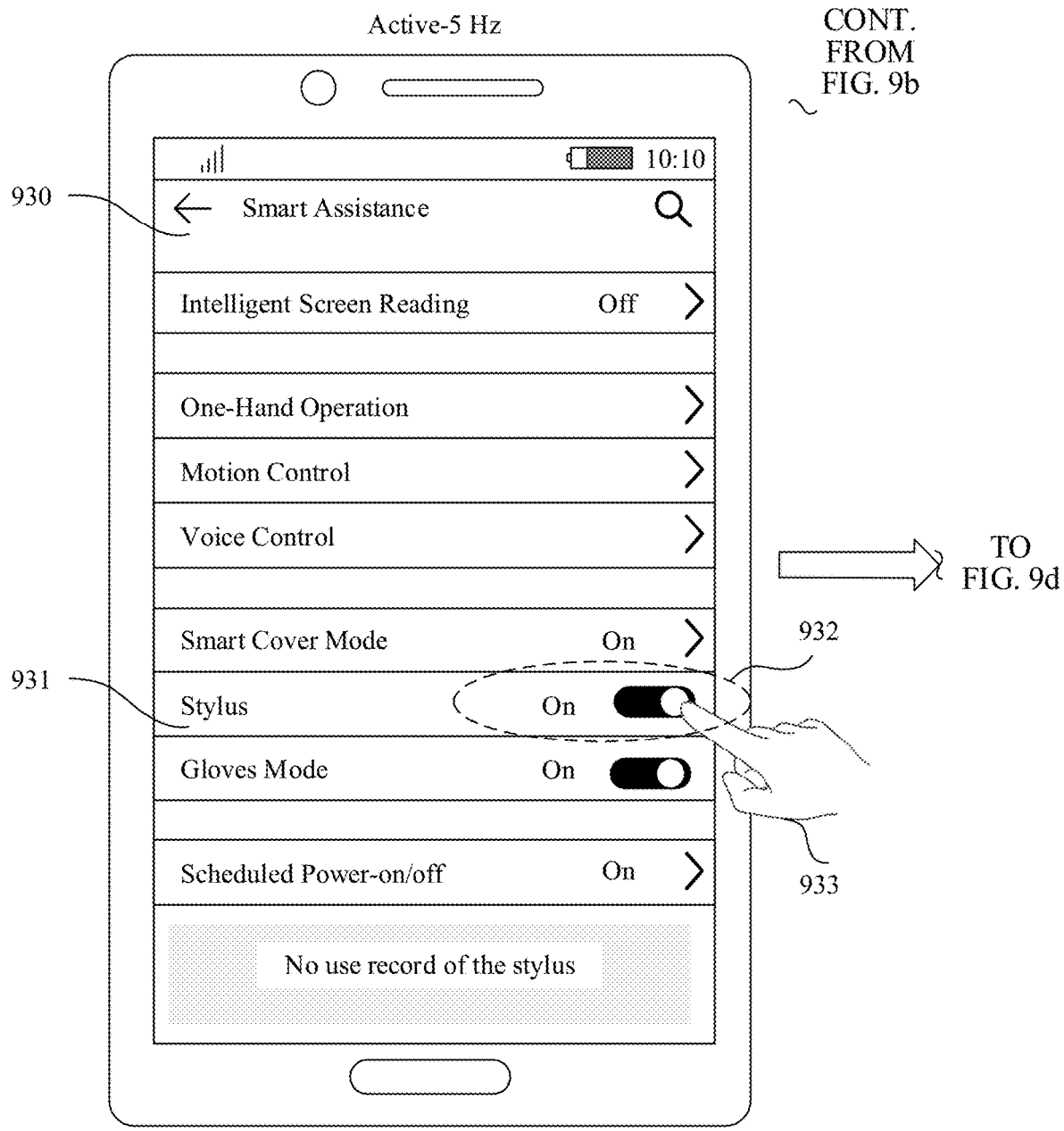
Figure 9D:
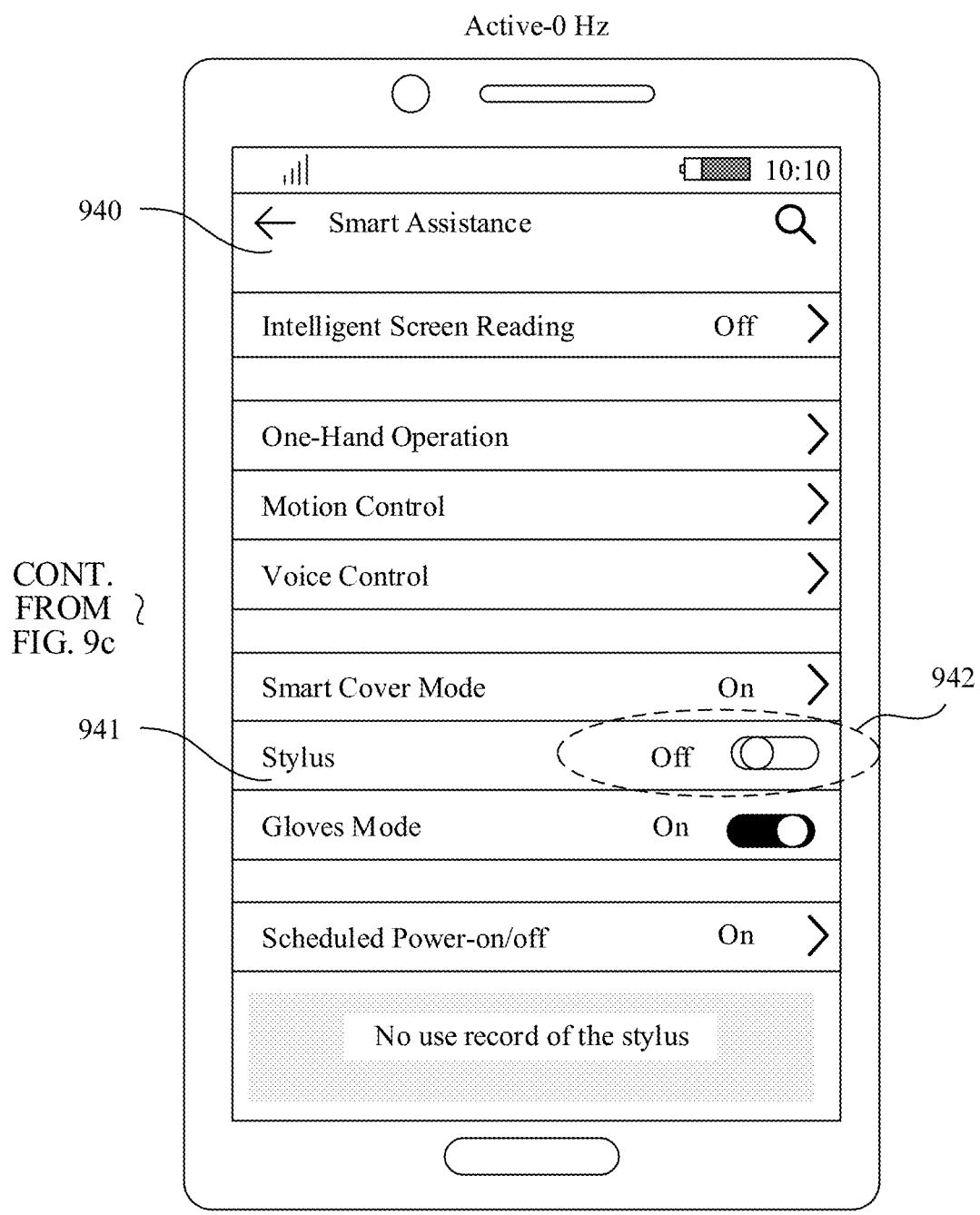

As shown in FIG. 9c, the stylus function on the terminal is enabled, and the terminal is in the Active-5 Hz state, but there is no record of using the stylus by the user on the terminal. The smart assistance settings screen 930 may include a stylus setting bar 931 and another setting bar (for example, an intelligent screen reading setting bar, a one-hand operation setting bar, a motion control setting bar, a voice control setting bar, a smart cover mode setting bar, a gloves mode setting bar, and a scheduled power-on/off setting bar). The stylus setting bar 931 is associated with a stylus setting control 932. In FIG. 9c, the stylus setting control 932 is in an on state. In other words, the stylus function on the terminal is enabled. The terminal may receive a touch operation 933 (for example, a tap) of the user on the stylus setting control 932 on the smart assistance settings screen 930. In response to the touch operation 933, the stylus function on the terminal is disabled, and the terminal switches from the Active-5 Hz state to an Active-0 Hz state shown in FIG. 9d. On a smart assistance settings screen 940 shown in FIG. 9d, a stylus setting control 942 is in an off state. In other words, the stylus function on the terminal is disabled. After the stylus function is disabled, the terminal does not detect the input signal of the stylus.

In the Active-0 Hz state, the terminal may detect the input signal of the touch operation of the user through the touchscreen at the 120 Hz mutual capacitance detection frequency and the 120 Hz self-capacitance detection frequency, and the terminal may not detect the input signal of the stylus. If the terminal is in the Active-0 Hz state, and duration in which the terminal does not detect the touch operation of the user is greater than a first time period (for example, 30 seconds, 1 minute, 2 minutes, or longer), the terminal may switch from the Active-0 Hz state to an Idle-0 Hz state. In the Idle-0 Hz state, the terminal may detect the input signal of the touch operation of the user through the touchscreen at the 1 Hz mutual capacitance detection frequency and the 120 Hz self-capacitance detection frequency, and the terminal may not detect the input signal of the stylus. In the Idle-0 Hz state, if the duration in which the terminal does not detect the input signal of the touch operation of the user is greater than a second time period (for example, 30 seconds, 1 minute, 2 minutes, or longer), the terminal may switch from the Idle-0 Hz state to a Sleep-0 Hz state. In the Sleep-0 Hz state, the terminal does not detect the input signal of the touch operation of the user, and does not detect the input signal of the stylus. In a possible case, the terminal is in the Idle-0 Hz state or the Sleep-0 Hz state. If the terminal receives the screen-off operation (for example, pressing the power key once) of the user, the terminal may switch from the Active-0 Hz state or the Idle-0 Hz state to the Sleep-0 Hz state. In a possible case, the terminal is in the Sleep-0 Hz state shown in FIG. 4c. If the terminal receives the screen-on operation (for example, pressing the power key once when the terminal is screen-off) of the user, the terminal may switch from the Sleep-0 Hz state to the Active-0 Hz state.

Figure 10A:
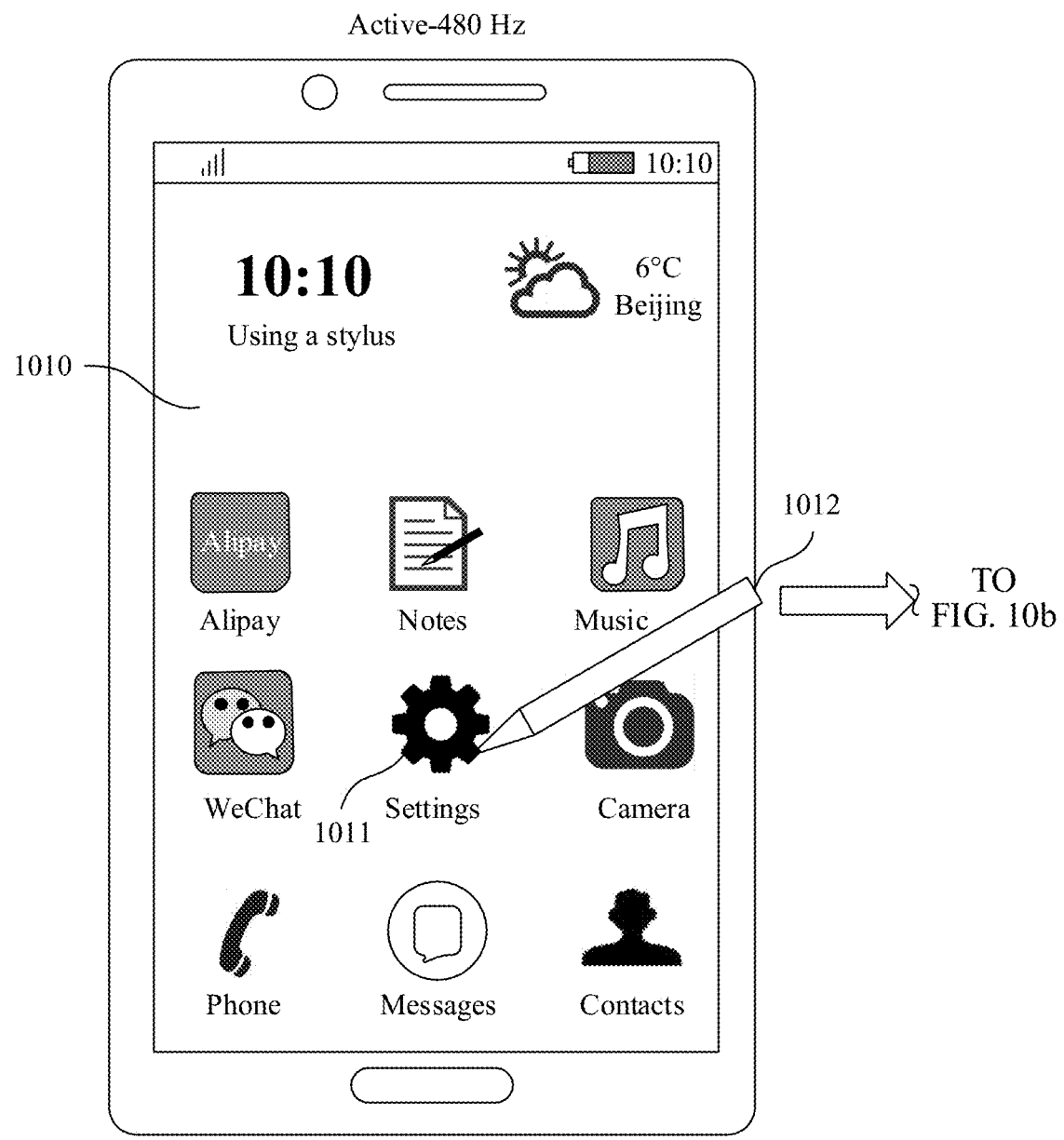
FIG. 10a to FIG. 10d are a schematic diagram of another group of screens according to an embodiment of this application.

Refer to FIG. 10a to FIG. 10d. FIG. 10a shows a home screen 1010 displayed by the terminal in the Active-480 Hz state when the stylus function is enabled. The home screen 1010 may include an icon 1011 for setting an application and an icon of another application (for example, Alipay, Notes, Music, WeChat, Camera, Phone, Messages, or Contacts). The terminal may receive an input operation 1012 (for example, a tap by a nib of the stylus) of the nib of the stylus on the icon 1011 for setting an application on the home screen 1010. In response to the input operation 1012, the terminal may display, on the touchscreen, a settings screen 1020 shown in FIG. 10b.

Figure 10B:
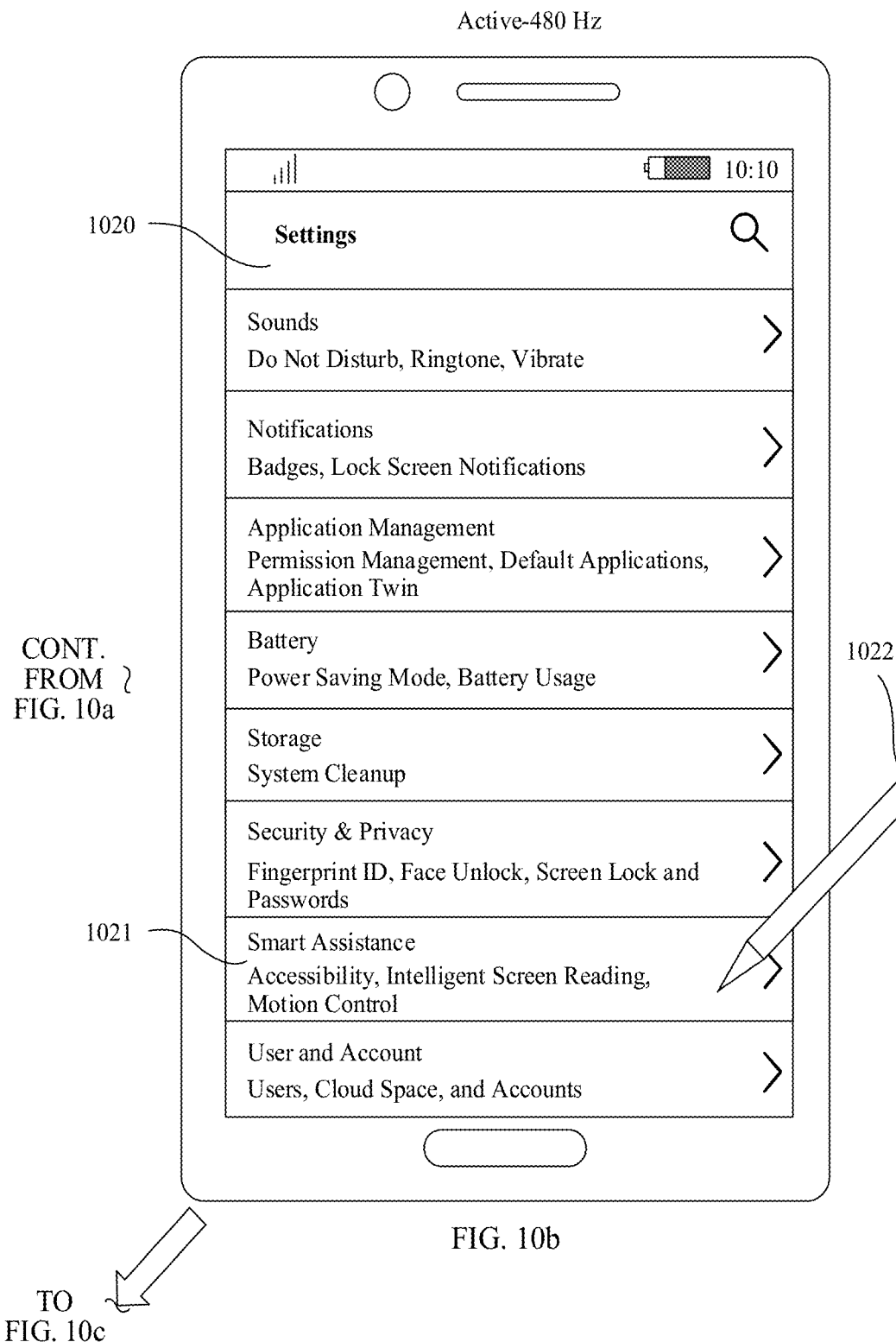

As shown in FIG. 10b, the stylus function on the terminal is enabled, and the terminal is in the Active-480 Hz state. The settings screen 1020 may include a smart assistance setting bar 1021 and another setting bar (for example, the sound setting bar, the notification center setting bar, the application management setting bar, the battery setting bar, the storage setting bar, the security and privacy setting bar, and the user and account setting bar). The terminal may receive an input operation 1022 (for example, a tap by the nib of the stylus) of the nib of the stylus on the smart assistance setting bar 1021 on the settings screen 1020. In response to the input operation 1022, the terminal may display, on the touchscreen, a smart assistance settings screen 1030 shown in FIG. 10c.

Figure 10C:
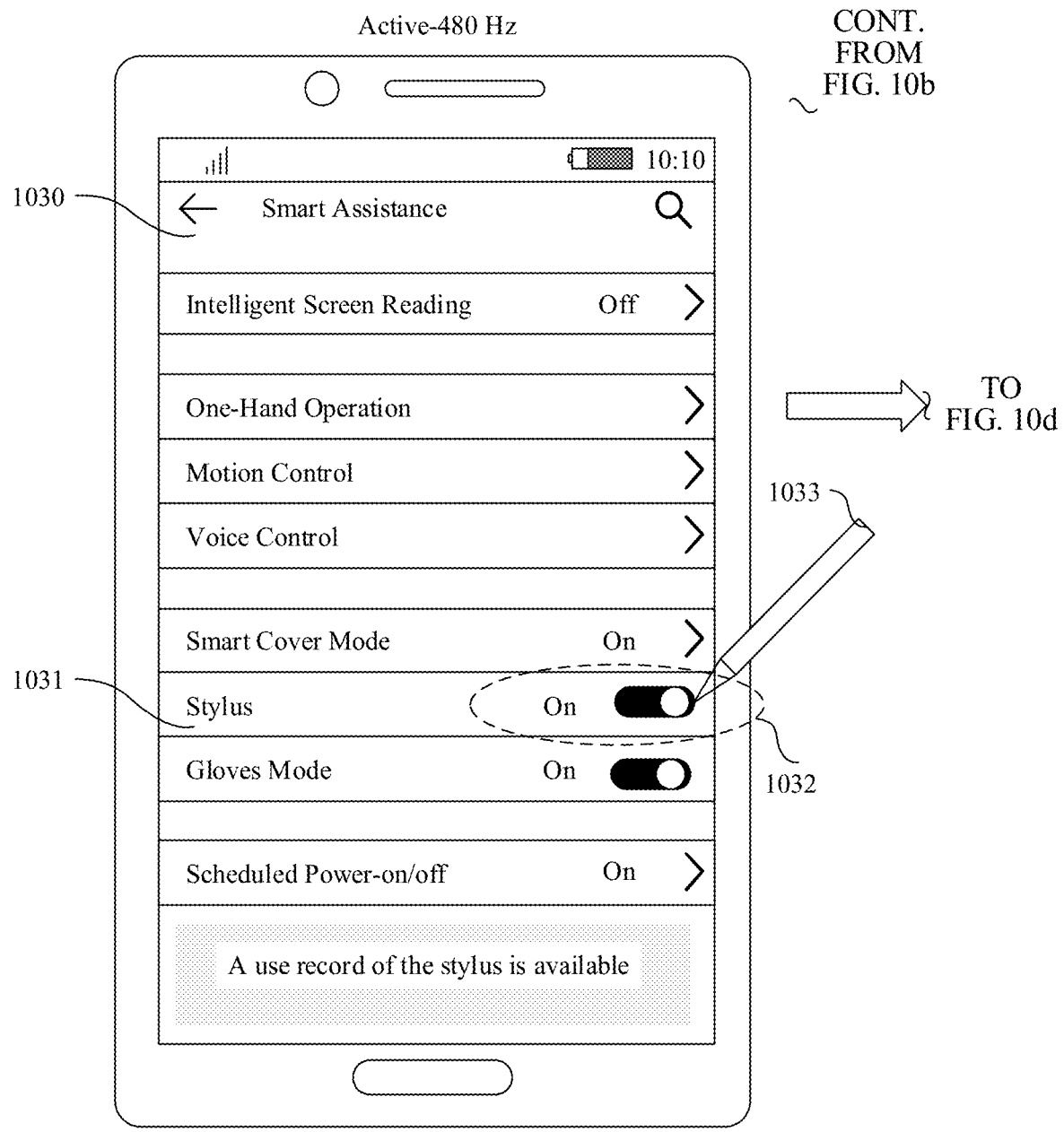
Figure 10D:
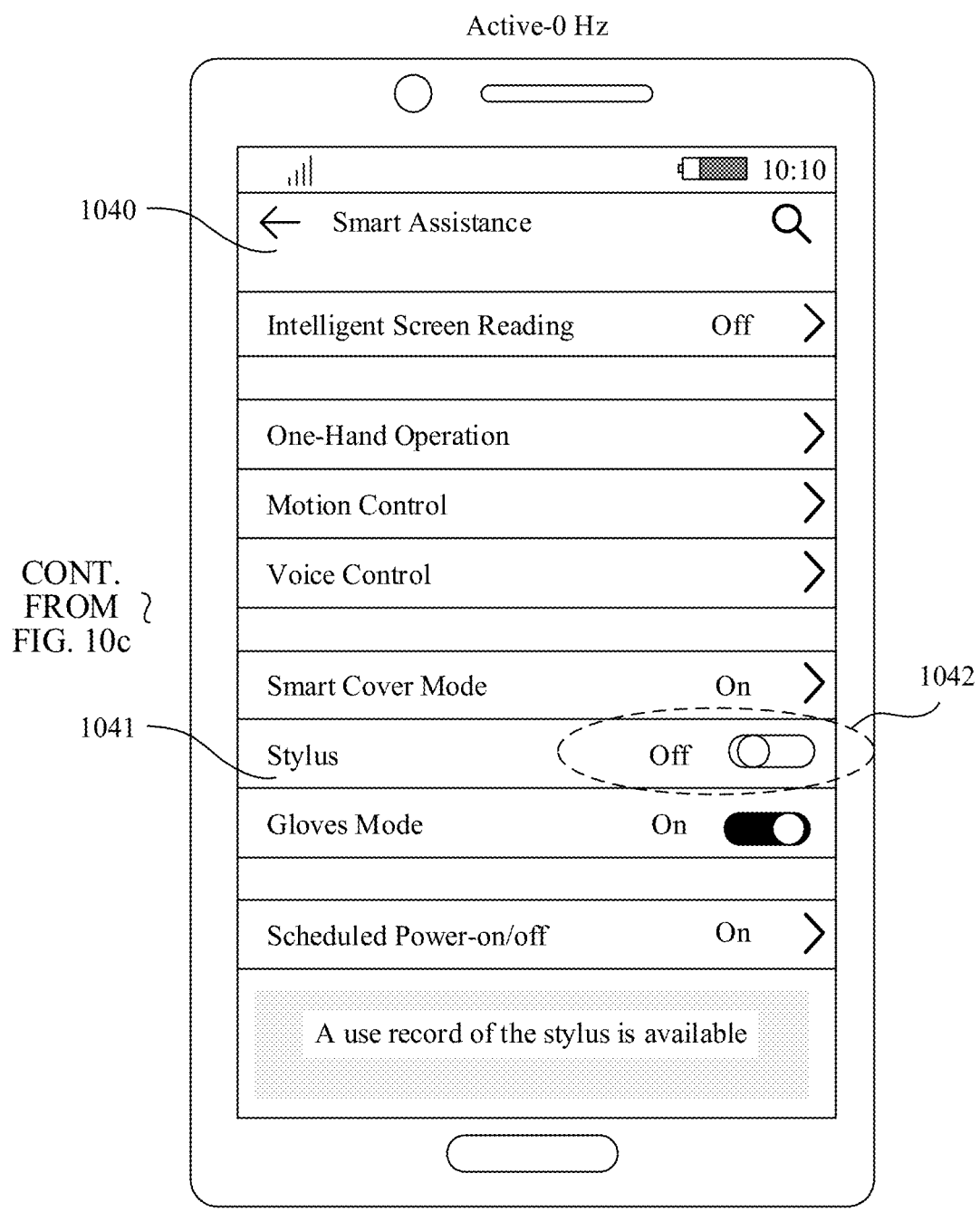

As shown in FIG. 10c, the stylus function on the terminal is enabled, and the terminal is in the Active-480 Hz state. There is a use record of the stylus on the terminal. In other words, the terminal has received the input signal of the stylus (for example, an input signal generated by the input operation 1012 or the input operation 1022). The settings screen 1030 may include a stylus setting bar 1031 and another setting bar (for example, the intelligent screen reading setting bar, the one-hand operation setting bar, the motion control setting bar, the voice control setting bar, the smart cover mode setting bar, the gloves mode setting bar, and the scheduled power-on/off setting bar). The stylus setting bar 1031 is associated with a stylus setting control 1032. In FIG. 10c, the stylus setting control 1032 is in an on state. In other words, the stylus function is enabled on the terminal. The terminal may receive an input operation 1033 (for example, a tap by the nib of the stylus) of the nib of the stylus on the stylus setting control 1032 on the smart assistance settings screen 1030. In response to the input operation 1033, the stylus function on the terminal is disabled, and the terminal switches from the Active-480 Hz state to an Active-0 Hz state shown in FIG. 10d. On a smart assistance settings screen 1040 shown in FIG. 10d, a stylus setting control 1042 is in an off state. In other words, the stylus function on the terminal is disabled. After the stylus function is disabled, the terminal does not detect the input signal of the stylus.

Figure 11A:
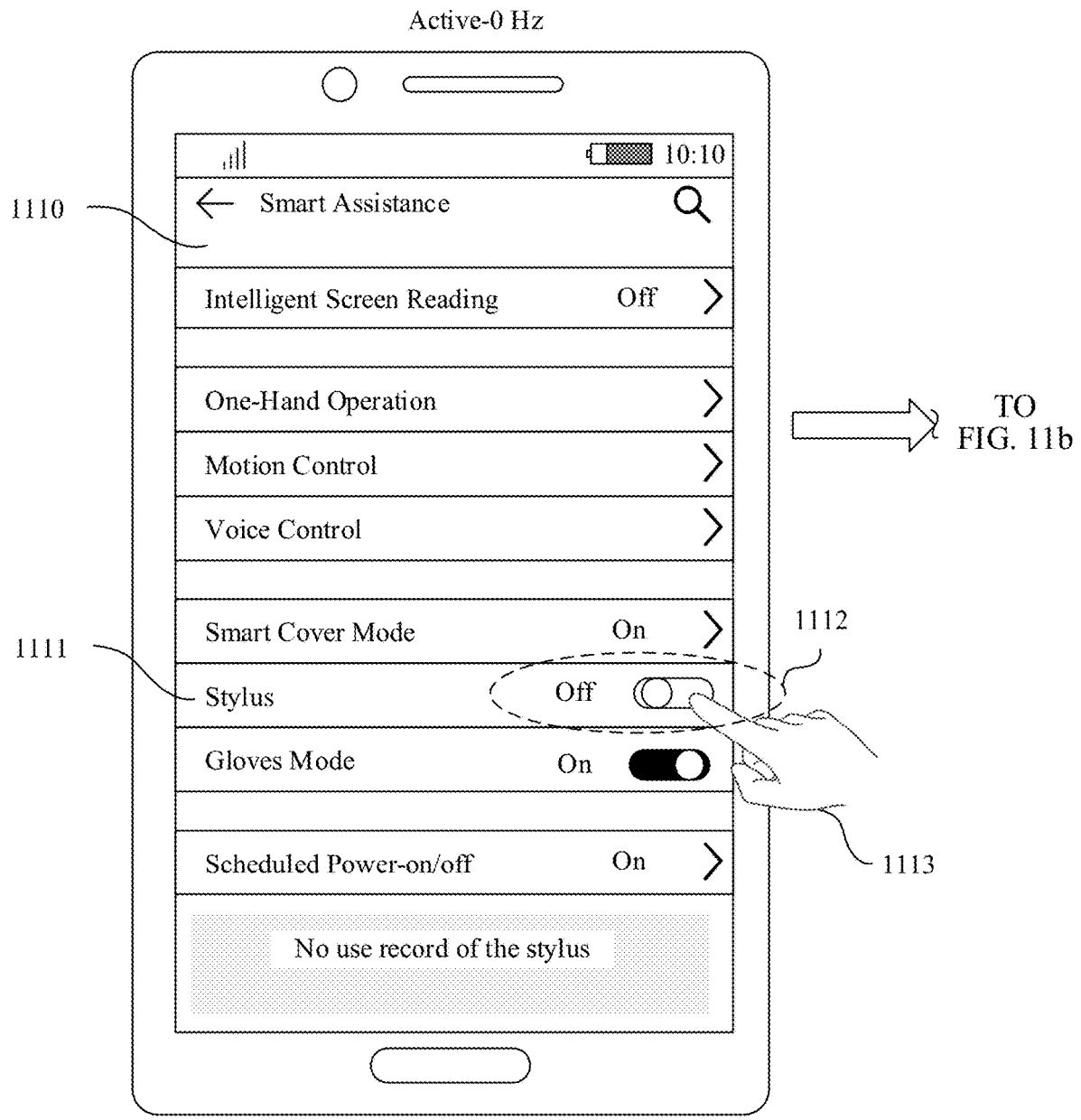
FIG. 11a to FIG. 11d are a schematic diagram of another group of screens according to an embodiment of this application.

Refer to FIG. 11a to FIG. 11d. FIG. 11a shows a settings screen 1110 displayed by the terminal in the Active-0 Hz state when the stylus function is disabled. There is no use record of the stylus on the terminal. In other words, the terminal has not received the input signal of the stylus. In the Active-0 Hz state, the terminal detects a touch input operation of the user on the touchscreen in a touch detection state of 120 Hz frequency mutual capacitance detection and 120 Hz frequency self-capacitance detection. A touch sensor on the touchscreen of the terminal does not report, to a touch control chip, a change of a capacitance value of each electrode on the touch sensor caused by the input signal of the stylus.

The settings screen 1110 may include a stylus setting bar 1111 and another setting bar (for example, the intelligent screen reading setting bar, the one-hand operation setting bar, the motion control setting bar, the voice control setting bar, the smart cover mode setting bar, the gloves mode setting bar, and the scheduled power-on/off setting bar) The stylus setting bar 1111 is associated with a stylus setting control 1112. In FIG. 11a, the stylus setting control 1112 is in an off state. In other words, the stylus function on the terminal is disabled. The terminal may receive a touch operation (for example, a finger tap) of the user on the stylus setting control 1112 on the smart assistance settings screen 1110. Because there is no use record of the stylus on the terminal, in response to the touch operation 1112, the terminal may switch from the Active-0 Hz state to an Active-5 Hz state shown in FIG. 11b. On a smart assistance settings screen 1120 shown in FIG. 11b, a stylus setting control 1122 is in an on state. In other words, the stylus function on the terminal is enabled.

Figures 11B, 11C:
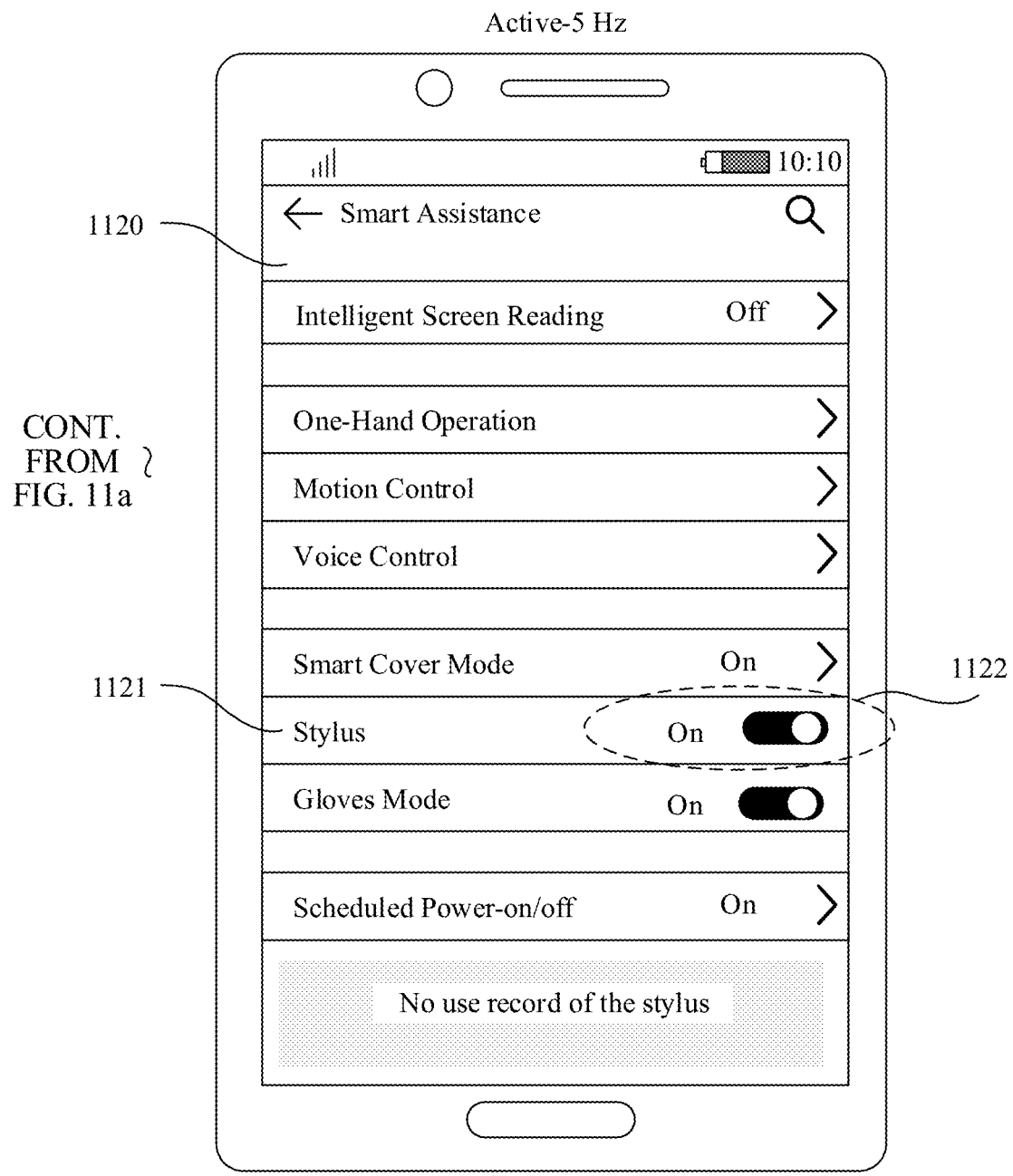
Figure 11C:
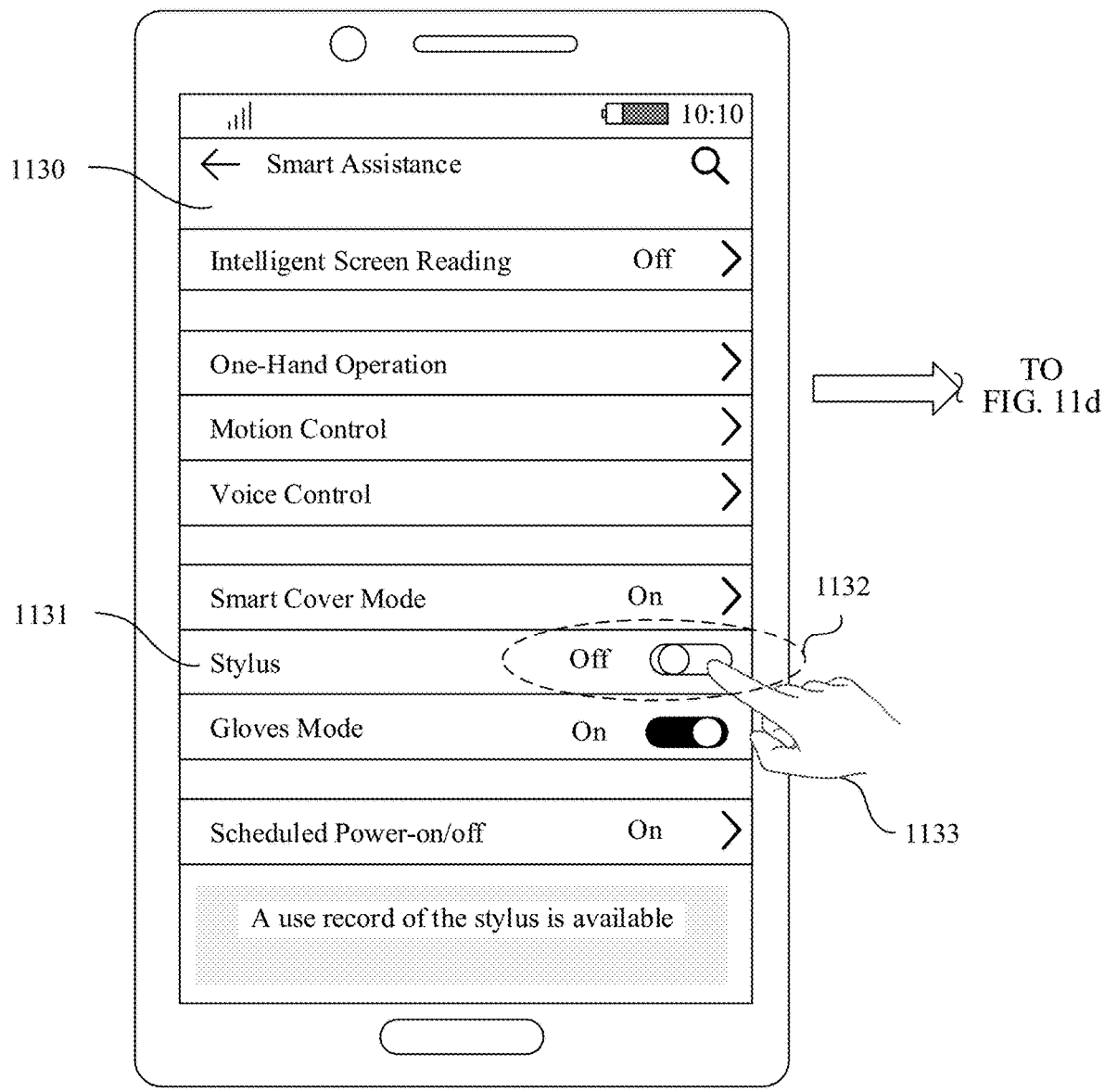
Figure 11D:
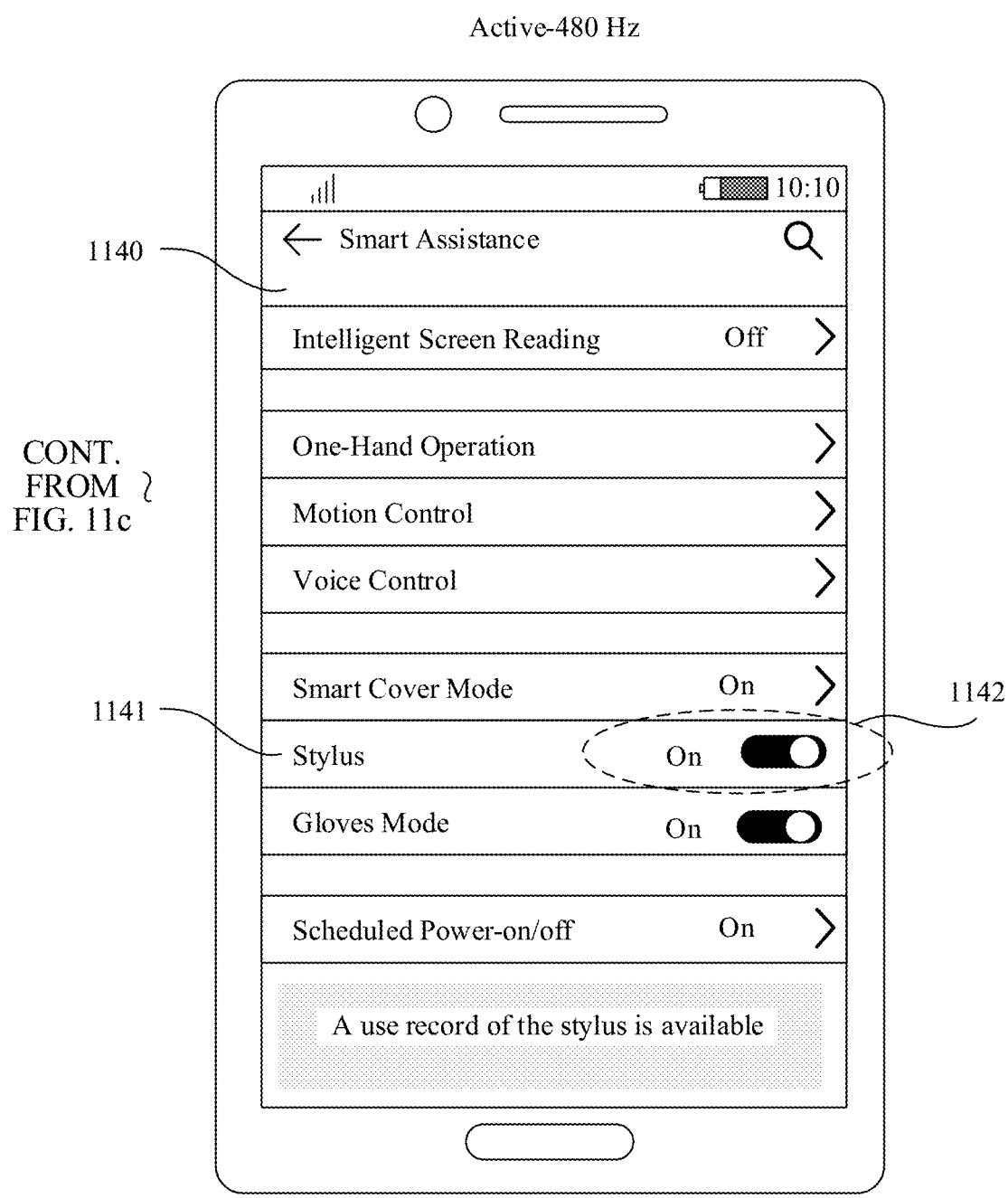

FIG. 11c shows a settings screen 1130 displayed by the terminal in the Active-0 Hz state when the stylus function is disabled. There is a use record of the stylus on the terminal. In other words, the terminal has received the input signal of the stylus. The settings screen 1130 may include a stylus setting bar 1131 and another setting bar (for example, the intelligent screen reading setting bar, the one-hand operation setting bar, the motion control setting bar, the voice control setting bar, the smart cover mode setting bar, the gloves mode setting bar, and the scheduled power-on/off setting bar) The stylus setting bar 1131 is associated with a stylus setting control 1132. In FIG. 11c, the stylus setting control 1132 is in an off state. In other words, the stylus function on the terminal is disabled. The terminal may receive an input operation (for example, a finger tap) of the user on the stylus setting control 1132 on the smart assistance settings screen 1130. Because there is a use record of the stylus on the terminal, in response to the input operation 1132, the terminal may switch from the Active-0 Hz state to an Active-480 Hz state shown in FIG. 11d. On a smart assistance settings screen 1140 shown in FIG. 11d, a stylus setting control 1142 is in an on state. In other words, the stylus function on the terminal is enabled.

Figure 12A:
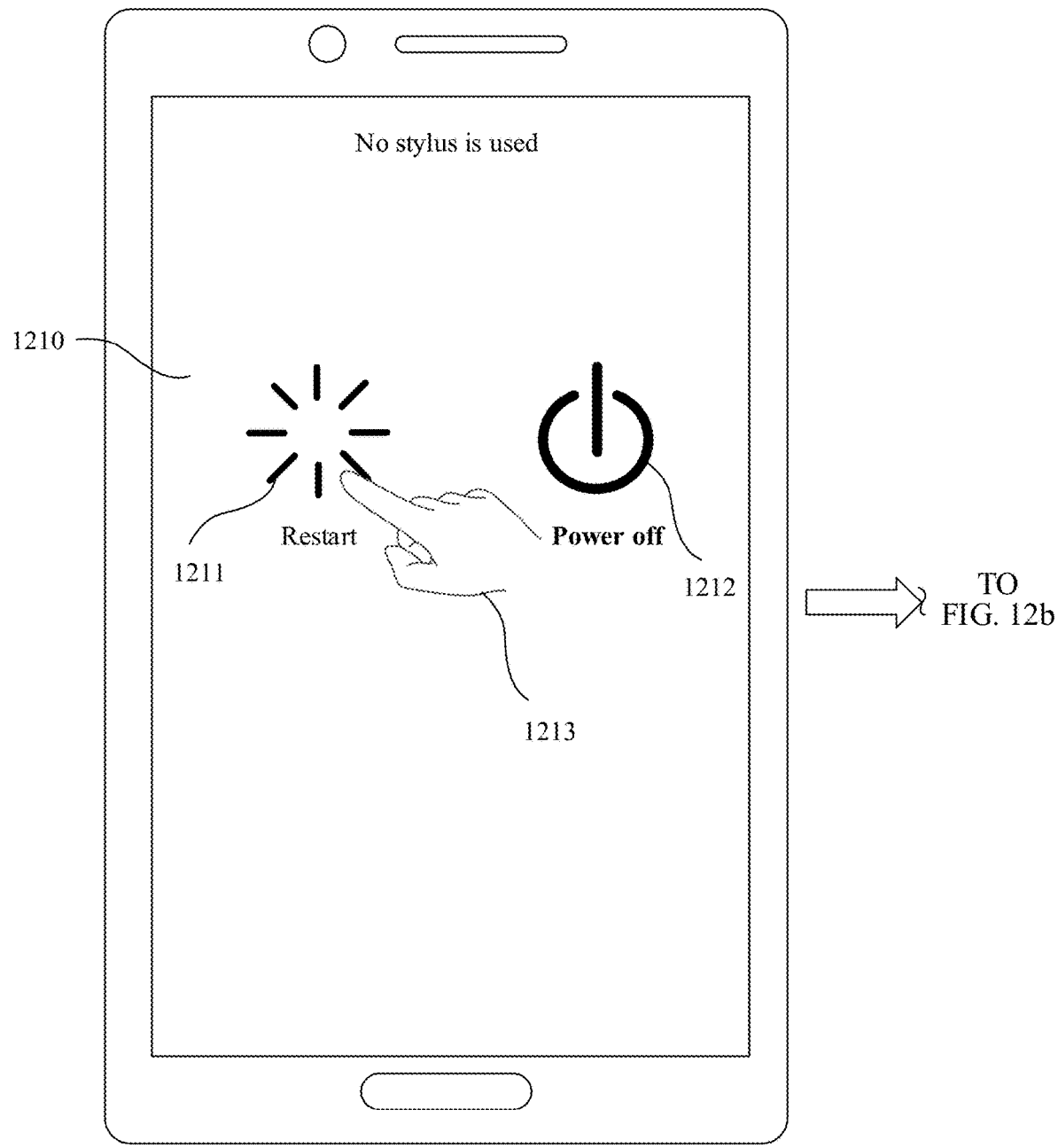
FIG. 12a to FIG. 12d are a schematic diagram of another group of screens according to an embodiment of this application.

Refer to FIG. 12a to FIG. 12d. FIG. 12a shows a restart screen 1210 displayed by the terminal in the Active-5 Hz state. There is no use record of the stylus on the terminal. In other words, the terminal has not received the input signal of the stylus. The restart screen 1210 includes a restart key 1211 and a power-off key 1212. The terminal may receive a touch operation 1213 (for example, a finger tap) of the user on the restart key 1211 on the restart screen 1210. In response to the touch operation 1213, the terminal may be restarted. After a restart, the terminal may be in an Active-5 Hz state shown in FIG. 12b.

Figures 12B, 12C:
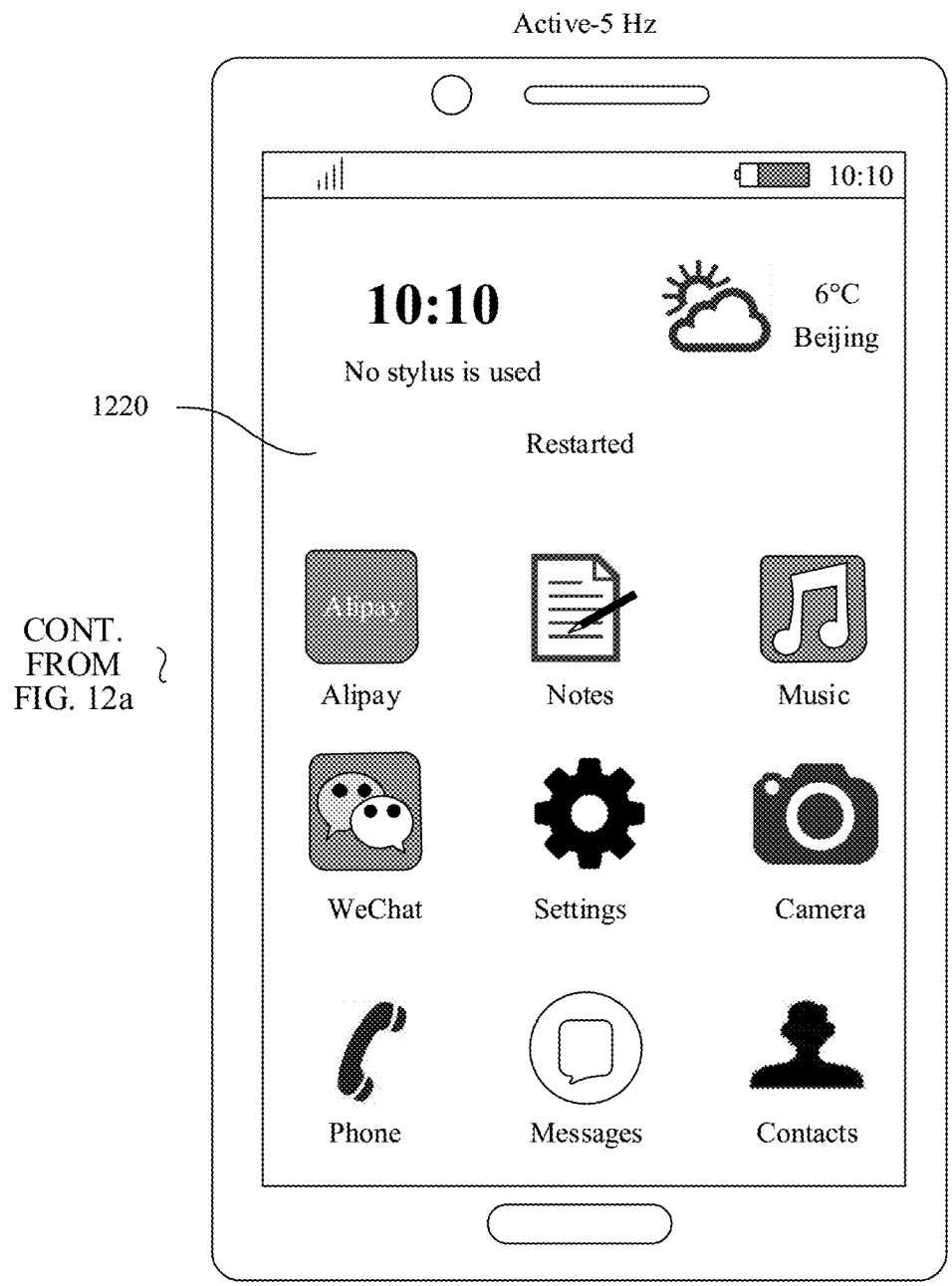
Figure 12C:
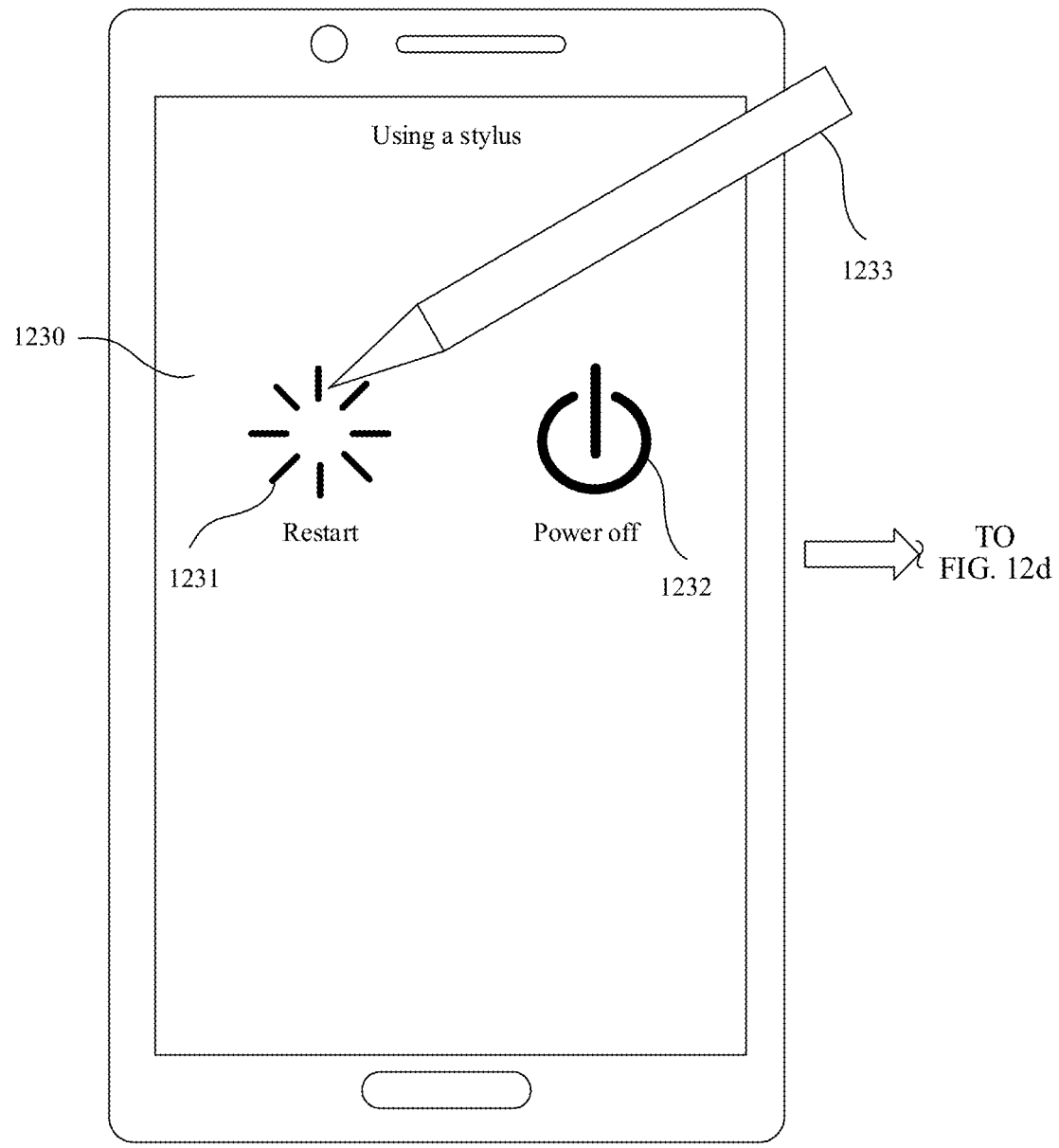
Figure 12D:
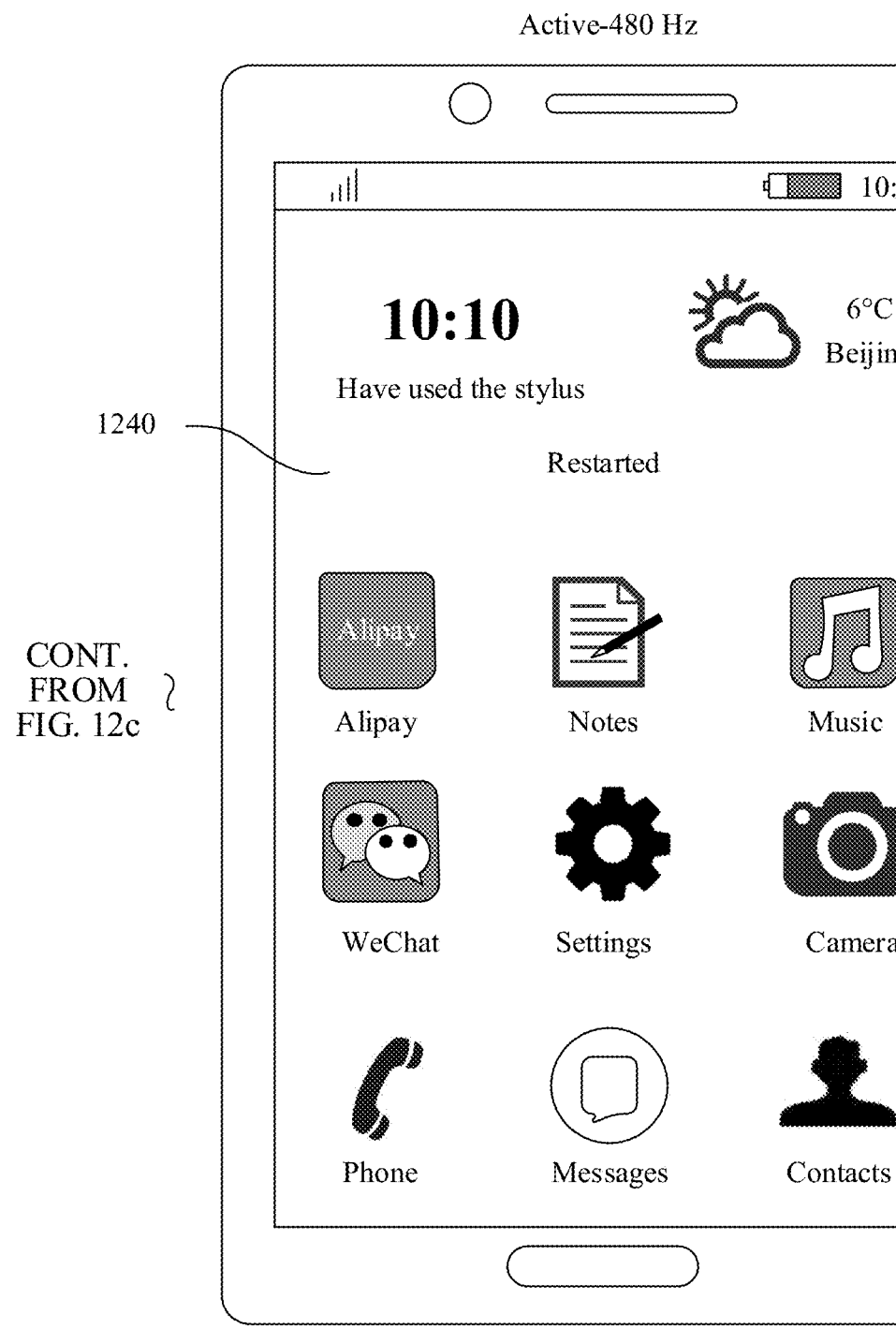

FIG. 12c shows a restart screen 1230 displayed by the terminal in the Active-480 Hz state. There is a use record of the stylus on the terminal. In other words, the terminal has received the input signal of the stylus. The restart screen 1230 includes a restart key 1231 and a power-off key 1232. The terminal may receive an input operation 1233 (for example, a tap by the nib of the stylus) of the stylus on the restart key 1231 on the restart screen 1230. In response to the input operation 1233, the terminal may be restarted. After a restart, the terminal may be in an Active-480 Hz state shown in FIG. 12d.

Figure 13A:
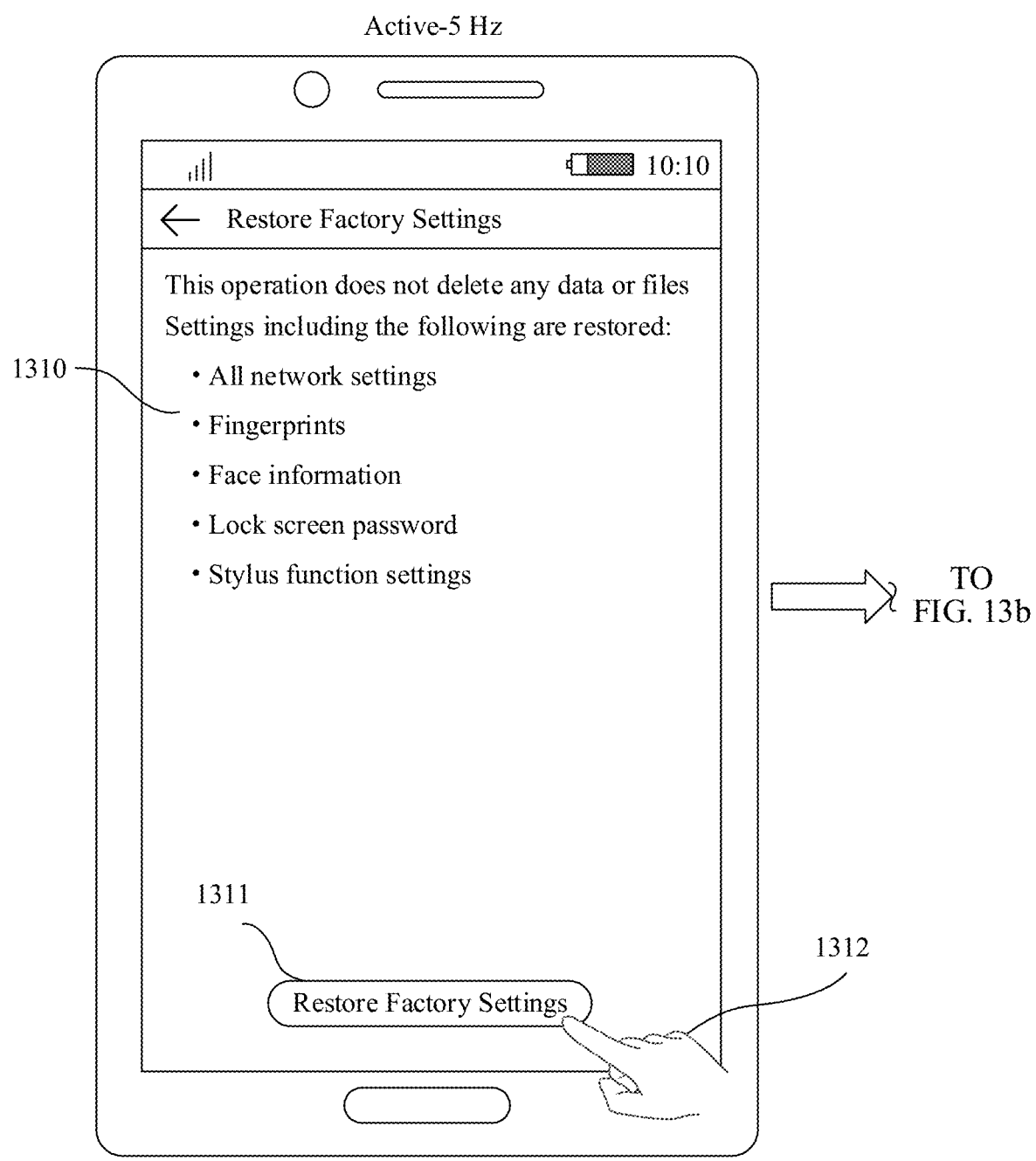
FIG. 13a to FIG. 13d are a schematic diagram of another group of screens according to an embodiment of this application.

Refer to FIG. 13a to FIG. 13d. FIG. 13a shows a factory settings restoration screen 1310 displayed by the terminal in the Active-5 Hz state. There is no use record of the stylus on the terminal. In other words, the terminal does not receive the input signal of the stylus before displaying the screen shown in FIG. 13a. The factory settings restoration screen 1310 includes a factory settings restoration key 1311.

The terminal may receive a touch operation 1312 (for example, a finger tap) of the user on the factory settings restoration key 1311. In response to the touch operation 1312, the terminal may restore factory settings. The factory settings restored by the terminal may include all network settings, a fingerprint, face information, a lock screen password, a stylus function setting, and the like. After the factory settings are restored, the terminal may be in an Active-5 Hz state shown in FIG. 13b. In the Active-5 Hz state shown in FIG. 13b, there is no use record of the stylus on the terminal.

Figures 13B, 13C:
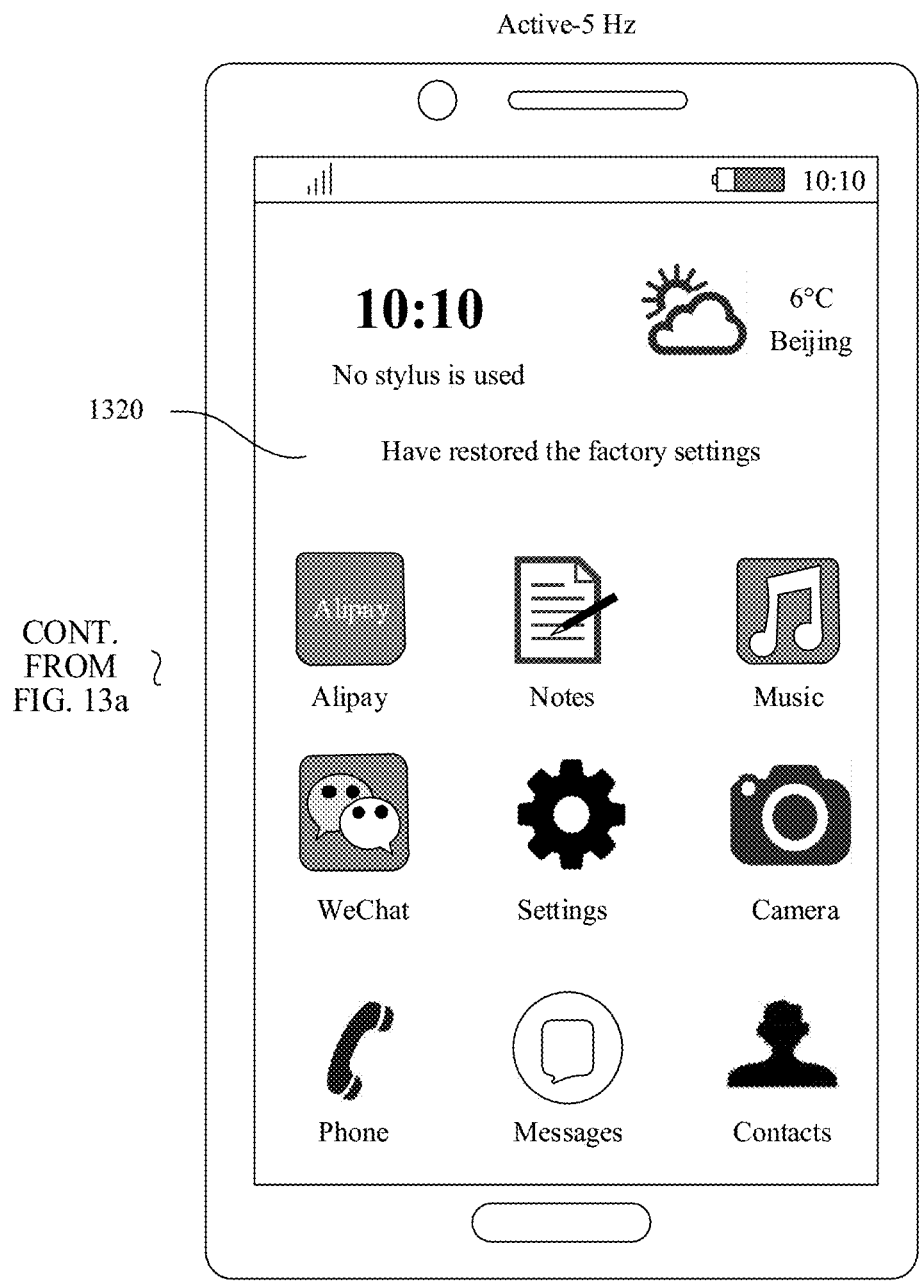
Figure 13C:
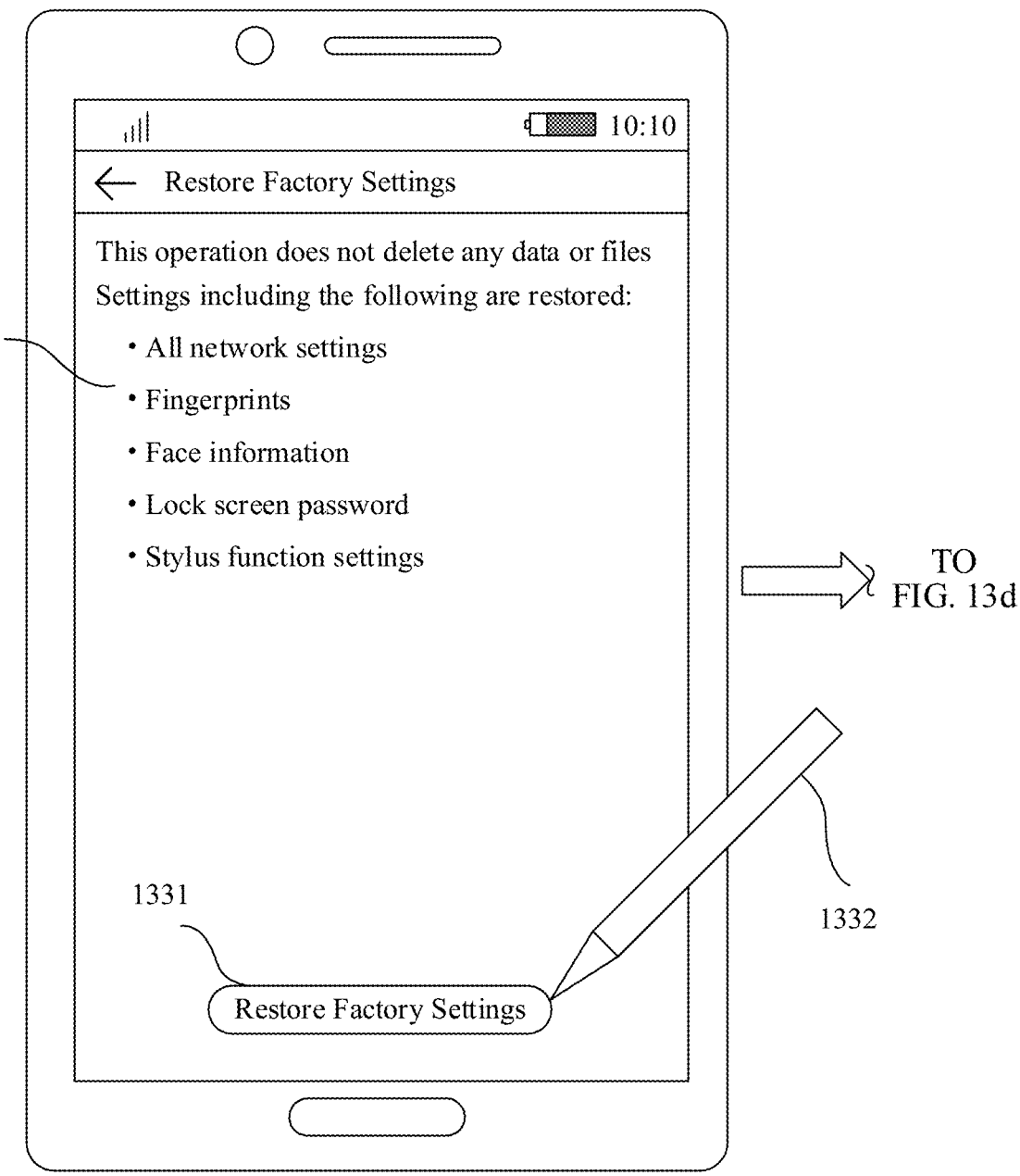
Figure 13D:
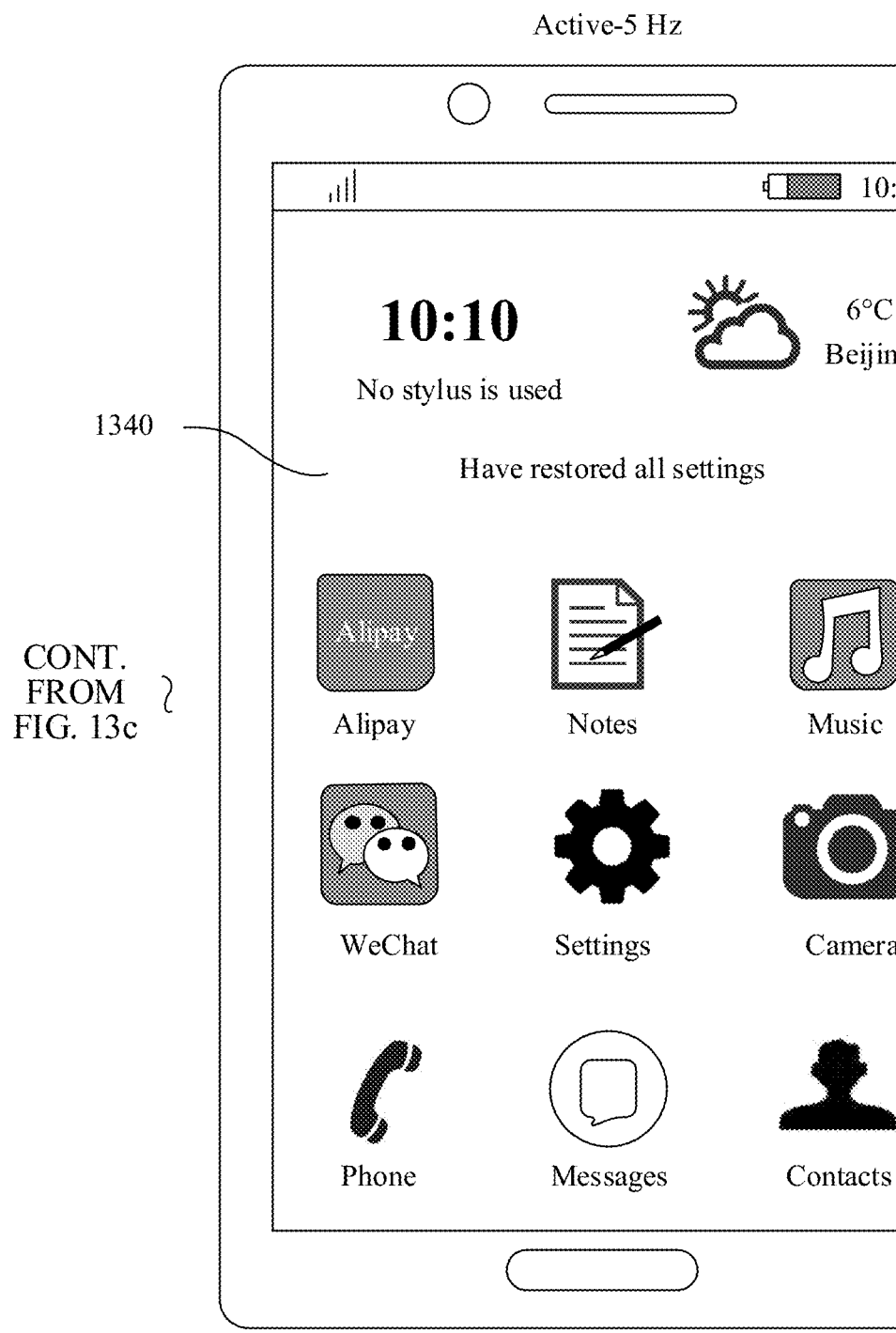

FIG. 13c shows a factory settings restoration screen 1330 displayed by the terminal in the Active-480 Hz state. There is a use record of the stylus on the terminal. In other words, the terminal has received the input signal of the stylus before displaying the screen shown in FIG. 13c. The factory settings restoration screen 1330 includes a factory settings restoration key 1331. The terminal may receive an input operation 1332 (for example, a tap by the nib of the stylus) of the stylus on the factory settings restoration key 1331 on the factory settings restoration screen 1330. In response to the input operation 1332, the terminal may restore the factory settings. The factory settings restored by the terminal may include all the network settings, the fingerprint, the face information, the lock screen password, the stylus function setting, and the like. After the factory settings are restored, the terminal may be in an Active-5 Hz state shown in FIG. 13d. In the Active-5 Hz state shown in FIG. 13d, there is no use record of the stylus on the terminal.

Figure 14A:
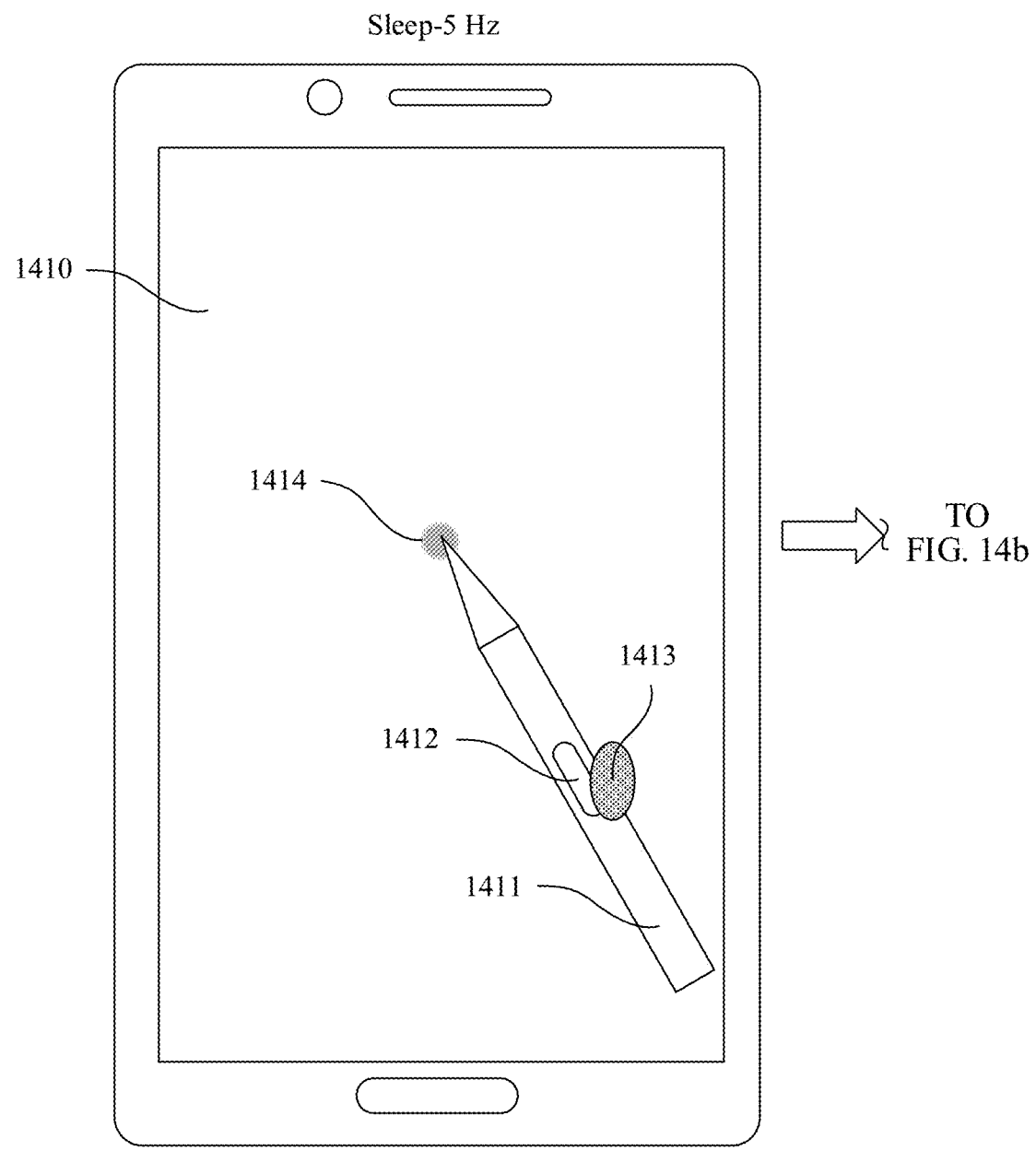
FIG. 14a to FIG. 14d are a schematic diagram of another group of screens according to an embodiment of this application.
Figures 14B, 14C:
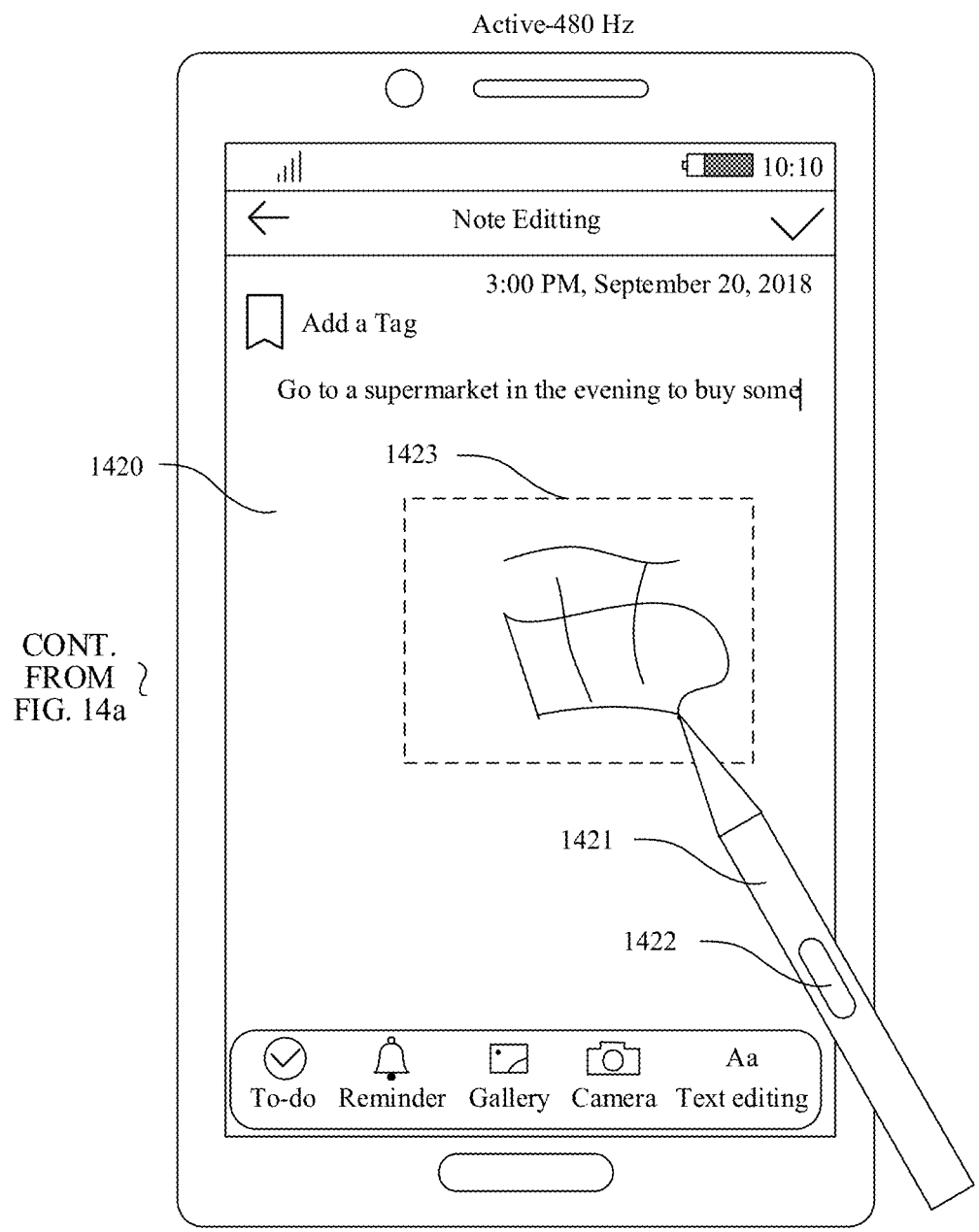
Figure 14C:
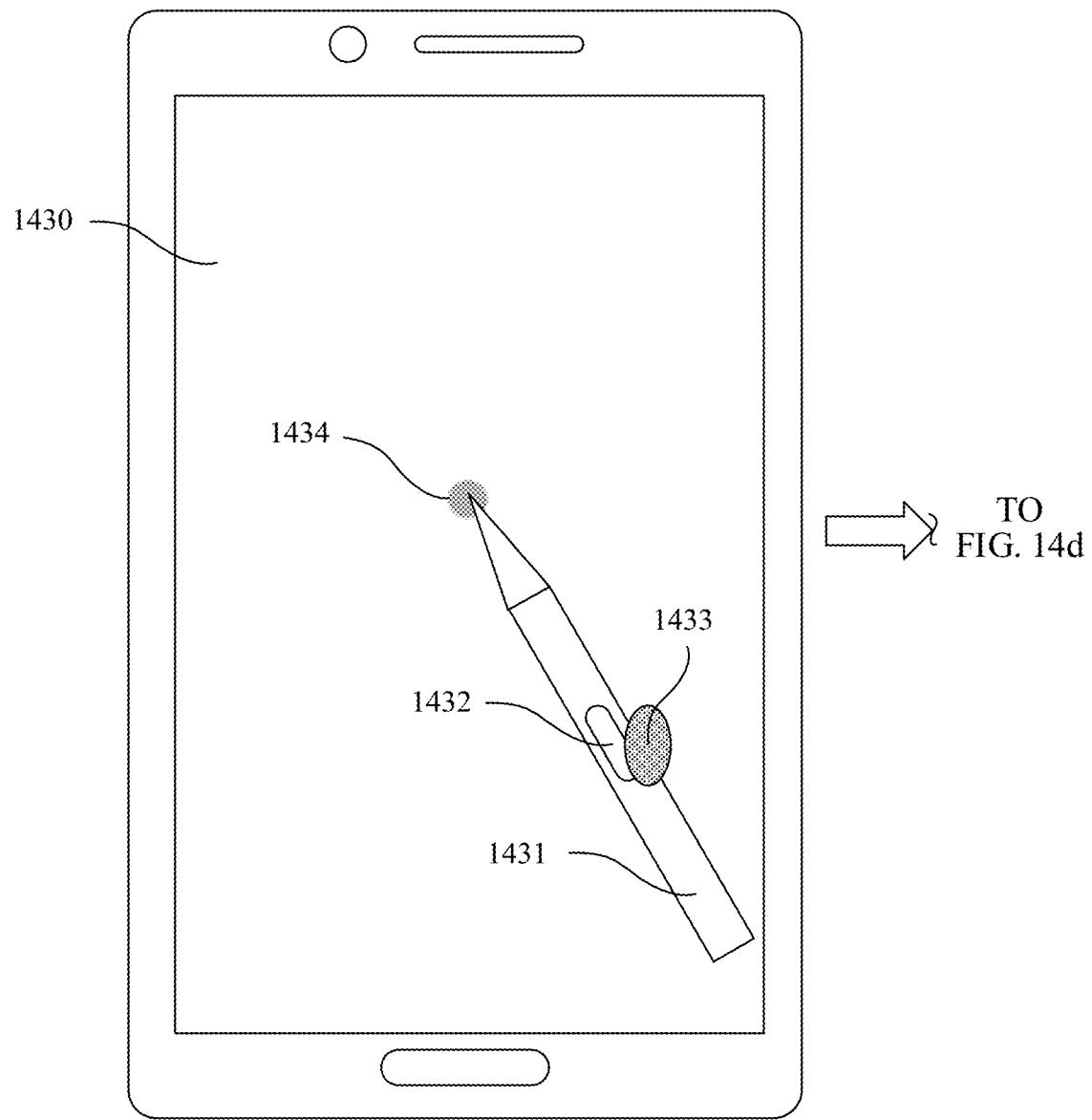

Refer to FIG. 14a to FIG. 14c. FIG. 14a shows a touchscreen 1410 of the terminal in the Sleep-5 Hz state. The touchscreen 1410 may be a touchscreen of the terminal in the Sleep-5 Hz state shown in FIG. 6c or in the Sleep-5 Hz state shown in FIG. 7c. FIG. 14a further shows a stylus 1411, and there is a key 1412 on the stylus 1411. As shown in FIG. 14a, the key 1412 on the stylus 1411 may receive an input operation 1413 (for example, pressing and holding) of the user. When the key 1412 is pressed, a signal output by the nib of the stylus changes. The terminal may receive, on the touchscreen 1410, an input operation 1414 (for example, a nib tap) of the stylus 1411 on which the user presses and holds the key 1412. In response to the input operation 1414 (for example, the nib tap), the terminal may detect a change signal output by the nib of the stylus, and switch from the Sleep-5 Hz state to the Active-480 Hz state. To be specific, the terminal detects the input signal of the stylus at 480 Hz, and displays a note editing screen 1420 shown in FIG. 14b on the touchscreen. As shown in FIG. 14b, the terminal may receive a writing operation 1423 of the user on the note editing screen 1420 by using the stylus 1421. In response to the writing operation 1423, the terminal may recognize written content (for example, a text) of the writing operation 1423 through picture recognition, and save the content.

In addition to the case in FIG. 14a, the terminal may alternatively receive the input operation 1414 (for example, tapping a screen by the nib) of the stylus 1411 on which the key 1414 is pressed when the touchscreen is in a screen-on state or a screen-locked state, or the touchscreen displays a home screen or an APP application screen. In response to the input operation 1414, the terminal may automatically open an APP on which a text or a doodle may be inputted, for example, WeChat, Messages, or a browser. The terminal may enter the note editing screen, and record a writing operation of the stylus. After the key 1412 on the stylus is pressed, the nib of the stylus may output a signal different from a signal before the key 1412 is pressed. The signal output by the nib may be an electrical signal (for example, a signal of a frequency between 30 KHz and 70 KHz). The signal output by the nib may include information such as pressure felt by the nib, a key status of the stylus, and an ID serial number of the stylus. In an optional case, the stylus may be connected to the terminal through Bluetooth or the like. After detecting that the nib is in contact with a touchscreen, the stylus may indicate, through the Bluetooth, the terminal to adjust the detection frequency for the stylus and open Notepad.

Figure 14D:
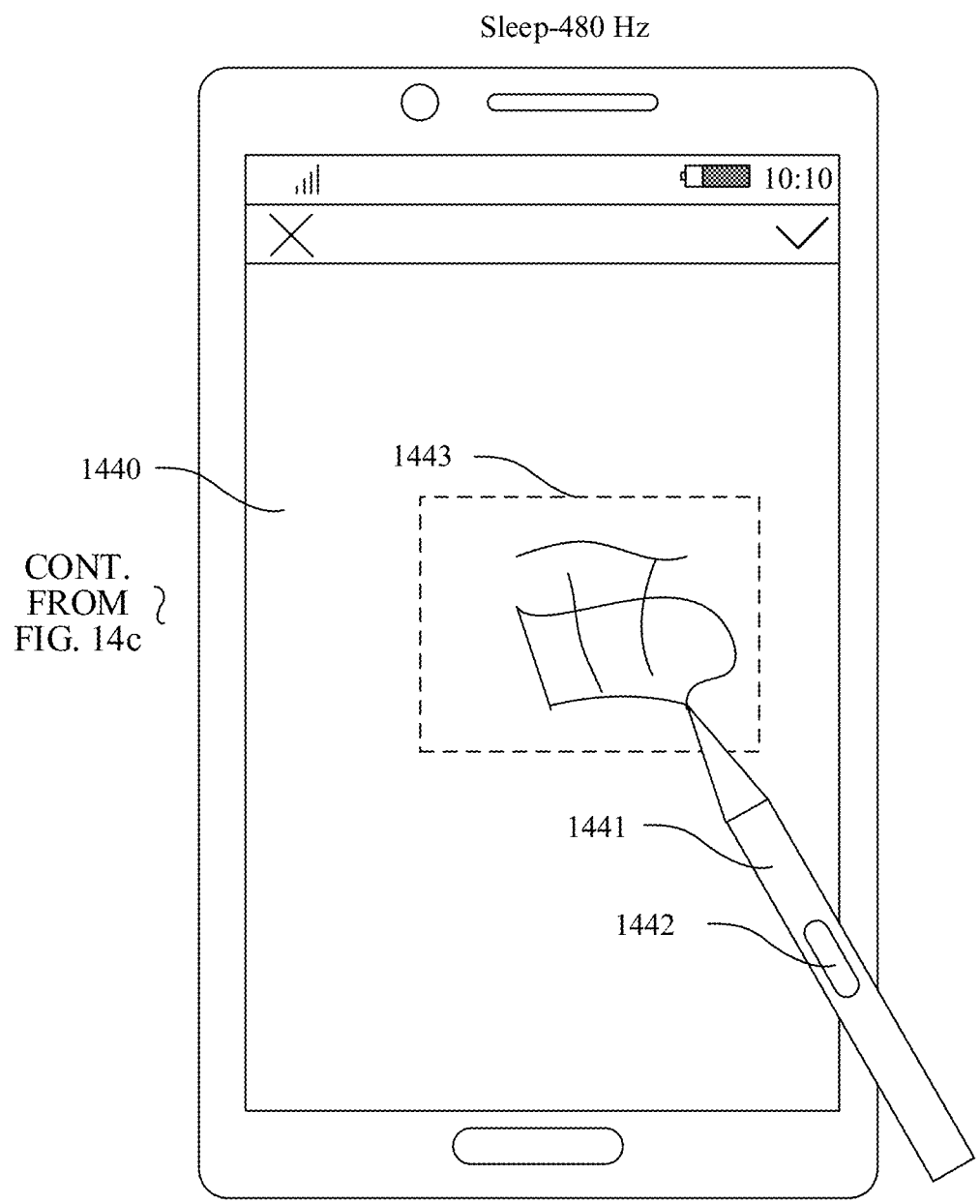

In a possible case, FIG. 14c shows a touchscreen 1430 of the terminal in the Sleep-5 Hz state. The touchscreen 1430 may be the touchscreen of the terminal in the Sleep-5 Hz state shown in FIG. 6c or in the Sleep-5 Hz state shown in FIG. 7c. FIG. 14c further shows a stylus 1431, and there is a key 1432 on the stylus 1431. As shown in FIG. 14c, the key 1432 on the stylus 1431 may receive an input operation 1433 (for example, pressing and holding) of the user. The terminal may receive, on the touchscreen 1430, an input operation 1434 (for example, a nib tap) of the stylus 1431 on which the user presses and holds the key 1432. In response to the input operation 1434 (for example, the nib tap), the terminal may switch from the Sleep-5 Hz state to the Sleep-480 Hz state shown in FIG. 14d. In the Sleep-480 Hz state, the terminal may save handwriting 1443 of the stylus 1441.

In a possible case, the terminal may make a response to the writing operation 1423, and store handwriting of the writing operation 1423 in a form of a picture. In this way, when the terminal is screen-off, and the user presses and holds a key on the stylus and taps the touchscreen of the terminal with the stylus, the terminal may quickly record content written by the user with the stylus on the touchscreen, to provide quick recording experience for the user.

Figure 15A:
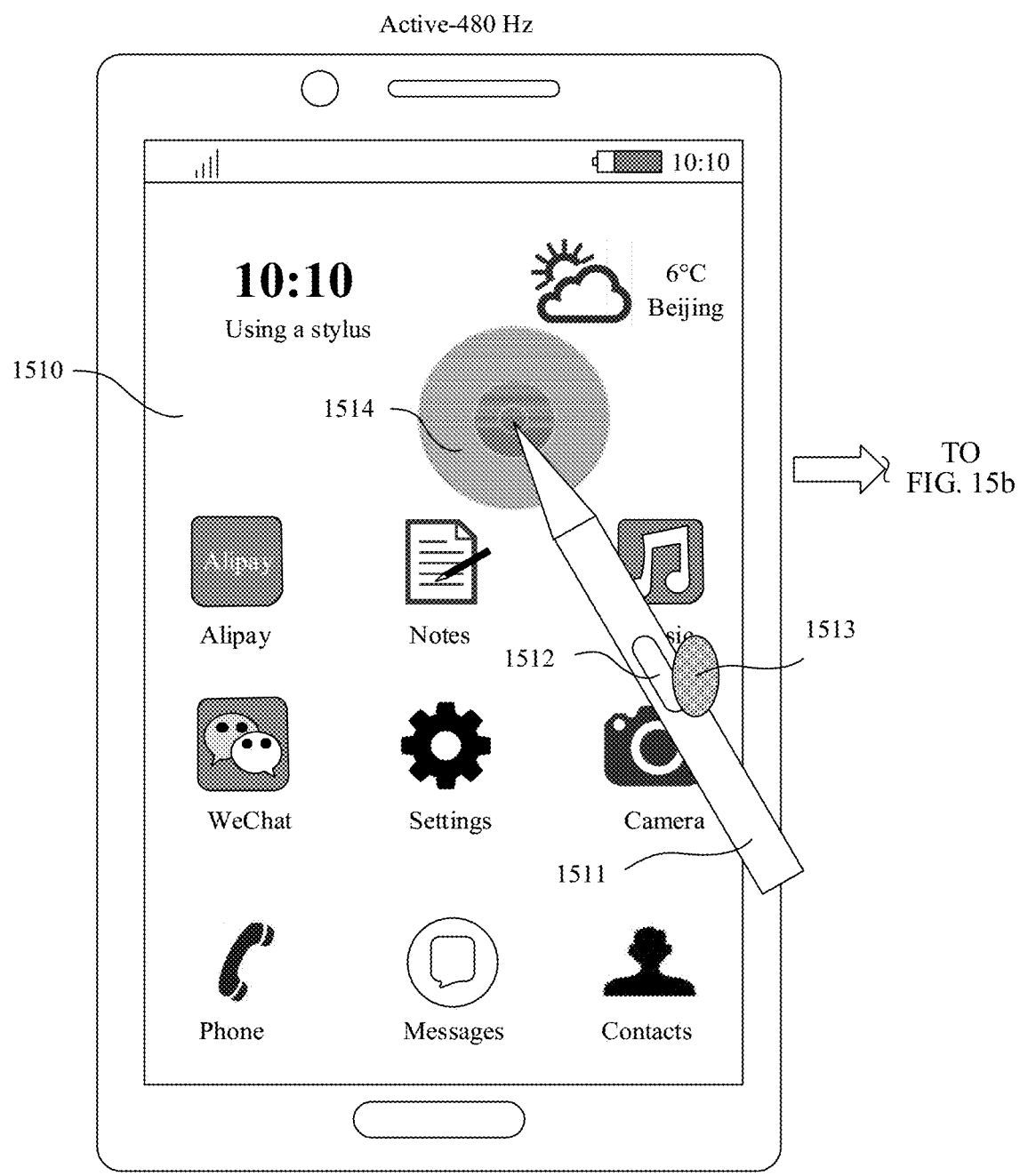
FIG. 15a and FIG. 15b are a schematic diagram of another group of screens according to an embodiment of this application.
Figure 15B:
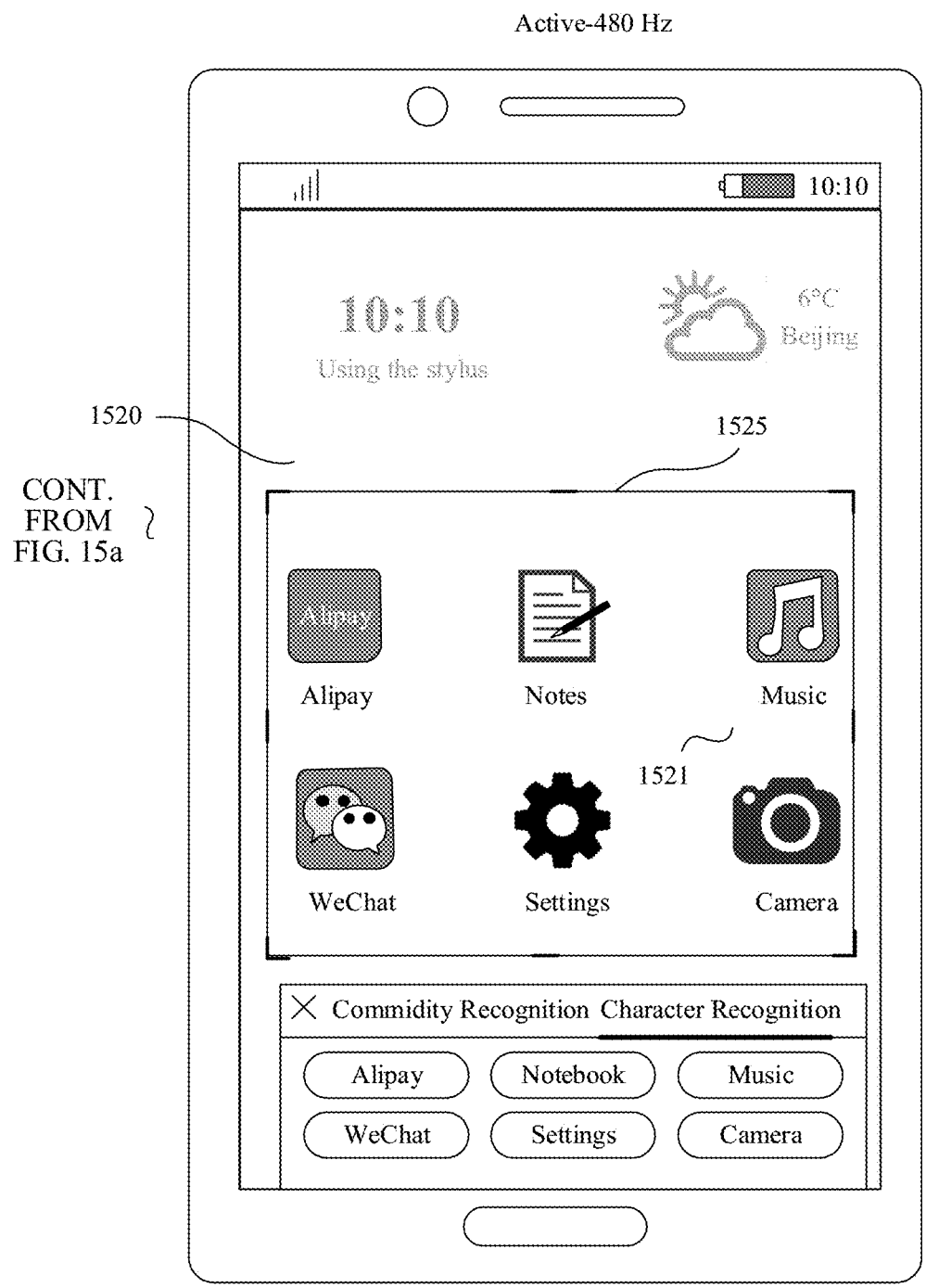

Refer to FIG. 15a and FIG. 15b. FIG. 15a shows a home screen 1510 displayed by the terminal in the Active-480 Hz state. The home screen 1510 may include one or more application (for example, Alipay, Notes, Music, WeChat, Settings, Camera, Phone, Messages, and Contacts) icons. As shown in FIG. 15a, a key 1512 on a stylus 1511 may receive a press-and-hold operation 1513 of the user. The terminal may receive, on the home screen, an input operation 1514 (for example, pressing and holding by the nib) of the stylus 1511 on which the user presses and holds the key 1512. In response to the input operation 1514 (for example, pressing and holding by the nib), the terminal may enable intelligent screen reading. An intelligent screen reading screen may be shown in FIG. 15b. As shown in FIG. 15b, an intelligent screen reading screen 1520 may include an intelligent recognition area 1525. A size of the intelligent screen reading area 1525 may be adjusted. The terminal may recognize a text or a picture in the intelligent screen reading area 1525. For example, texts in the screen reading area 1525 of the terminal include "Alipay", "Notes", "Music", "WeChat", "Settings", "Camera", and the like. In addition to the home screen 1510 shown in FIG. 15a, the user may also enable intelligent screen reading on another screen with the stylus. This is not limited herein. In this way, when the user presses and holds the key on the stylus, and presses and holds the touchscreen of the terminal with the stylus, an intelligent screen reading function may be quickly enabled. This improves user experience.

Figure 16A:
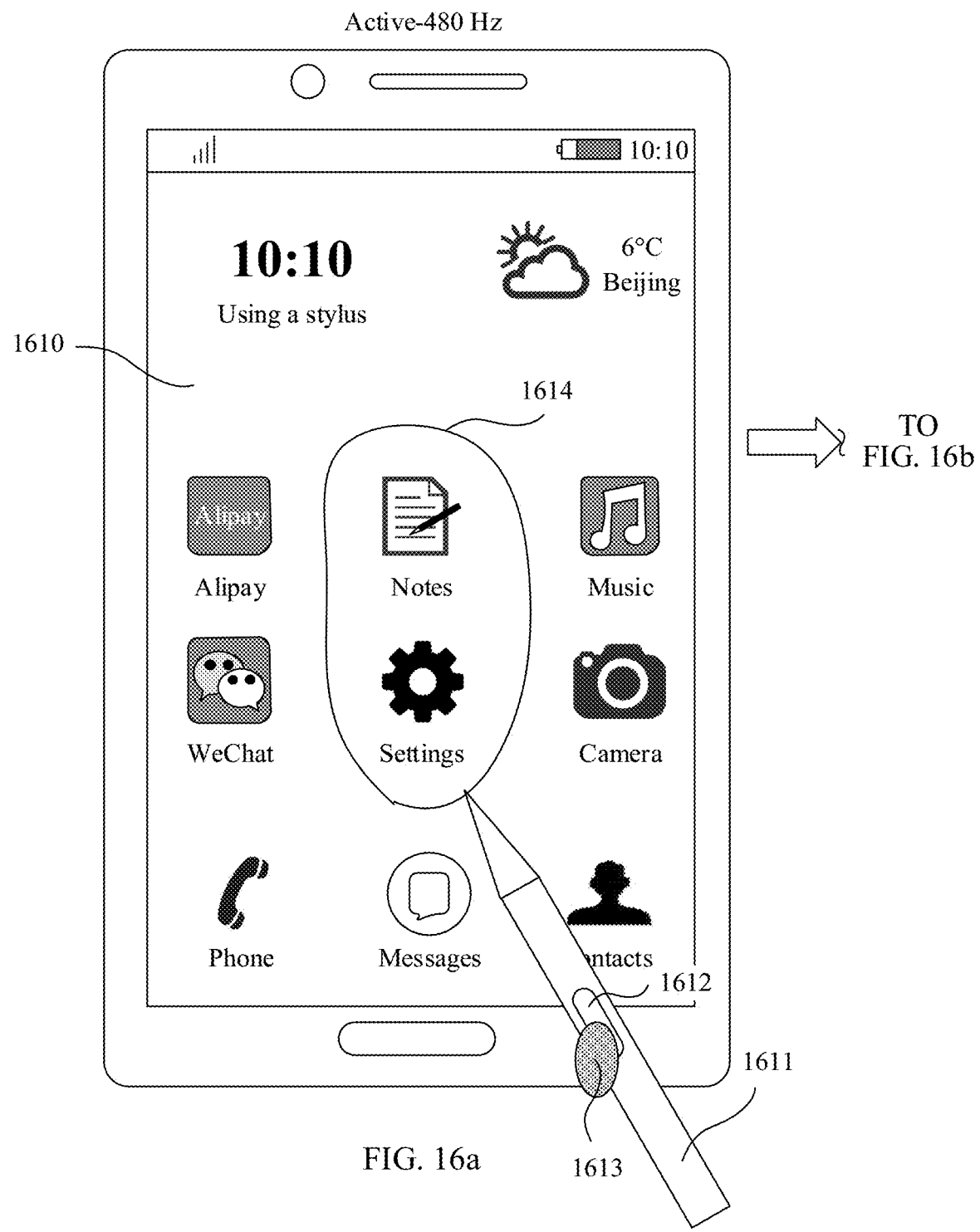
FIG. 16a and FIG. 16b are a schematic diagram of another group of screens according to an embodiment of this application.
Figure 16B:
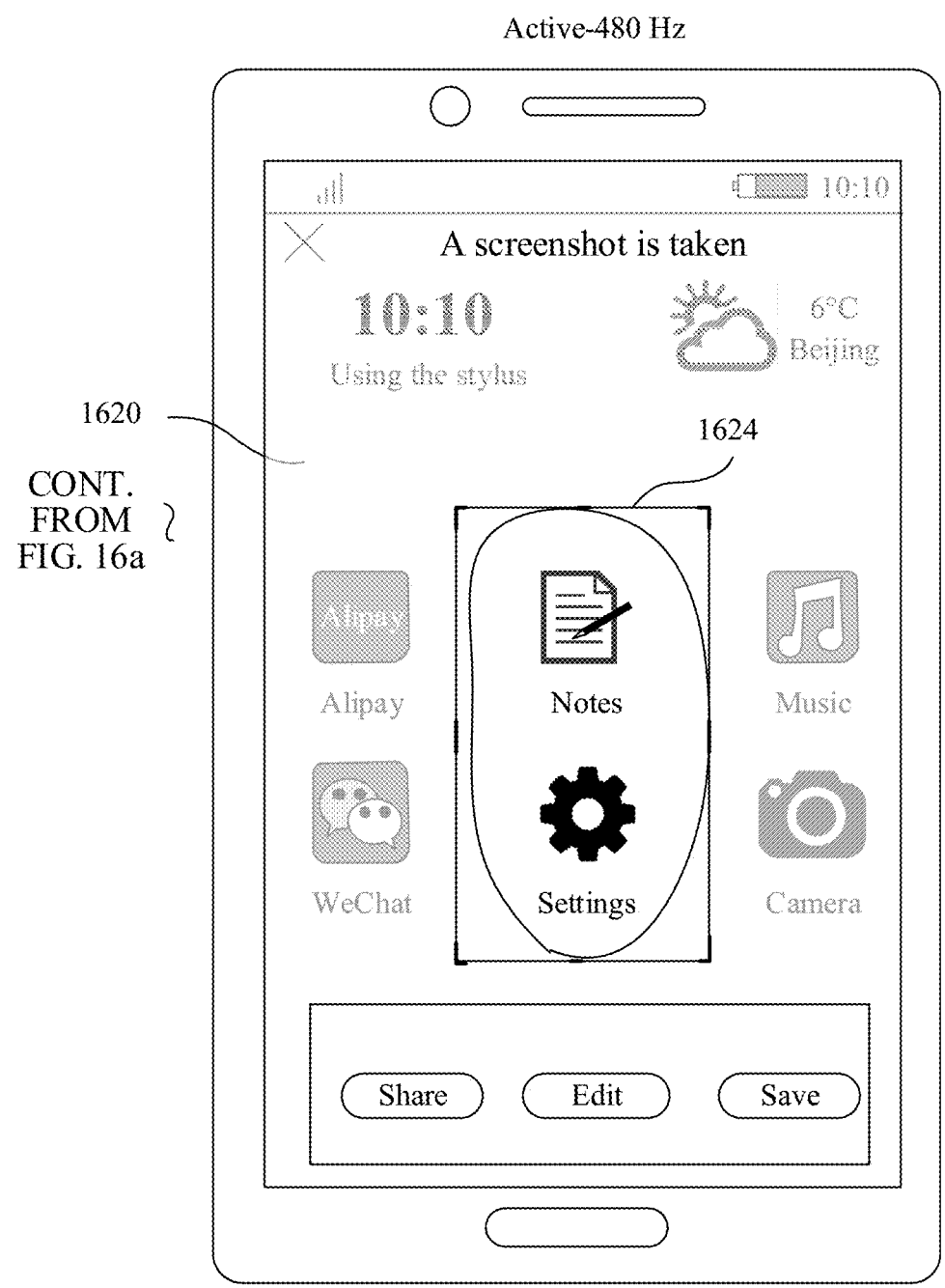

Refer to FIG. 16a and FIG. 16b. FIG. 16a shows a home screen 1610 displayed by the terminal in the Active-480 Hz state. The home screen 1610 may include one or more application (for example, Alipay, Notes, Music, WeChat, Settings, Camera, Phone, Messages, and Contacts) icons. As shown in FIG. 16a, a key 1612 on a stylus 1611 may receive a press-and-hold operation 1613 of the user. The terminal may receive, on the home screen, an input operation 1614 (for example, circling an area on the home screen by the nib) of the stylus 1611 on which the user presses and holds the key 1612. In response to the input operation 1614 (for example, circling the area on the home screen by the nib), the terminal may enable a screenshot function, and capture the area circled by the nib of the stylus on the home screen 1610. A screenshot screen may be shown in FIG. 16b. As shown in FIG. 16b, a screenshot screen 1620 may include an area 1624 circled by the nib of the stylus, a share key, an edit key, a save key, and the like. In a possible case, the terminal may receive, on the home screen 1610, a double-tap operation of the stylus 1611 on which the user presses and holds the key 1612. In response to the double-tap operation, the terminal may enable the screenshot function, and capture the home screen 1610 currently displayed on a display of the terminal. In addition to the home screen 1610 shown in FIG. 16a, the user may also enable the screenshot function with the stylus on another screen. This is not limited herein. In this way, when the user presses and holds the key on the stylus, and circles an area on the touchscreen with the stylus or double-taps the touchscreen with the nib of the stylus, the screenshot function may be quickly enabled. This improves user experience.

Figure 17A:
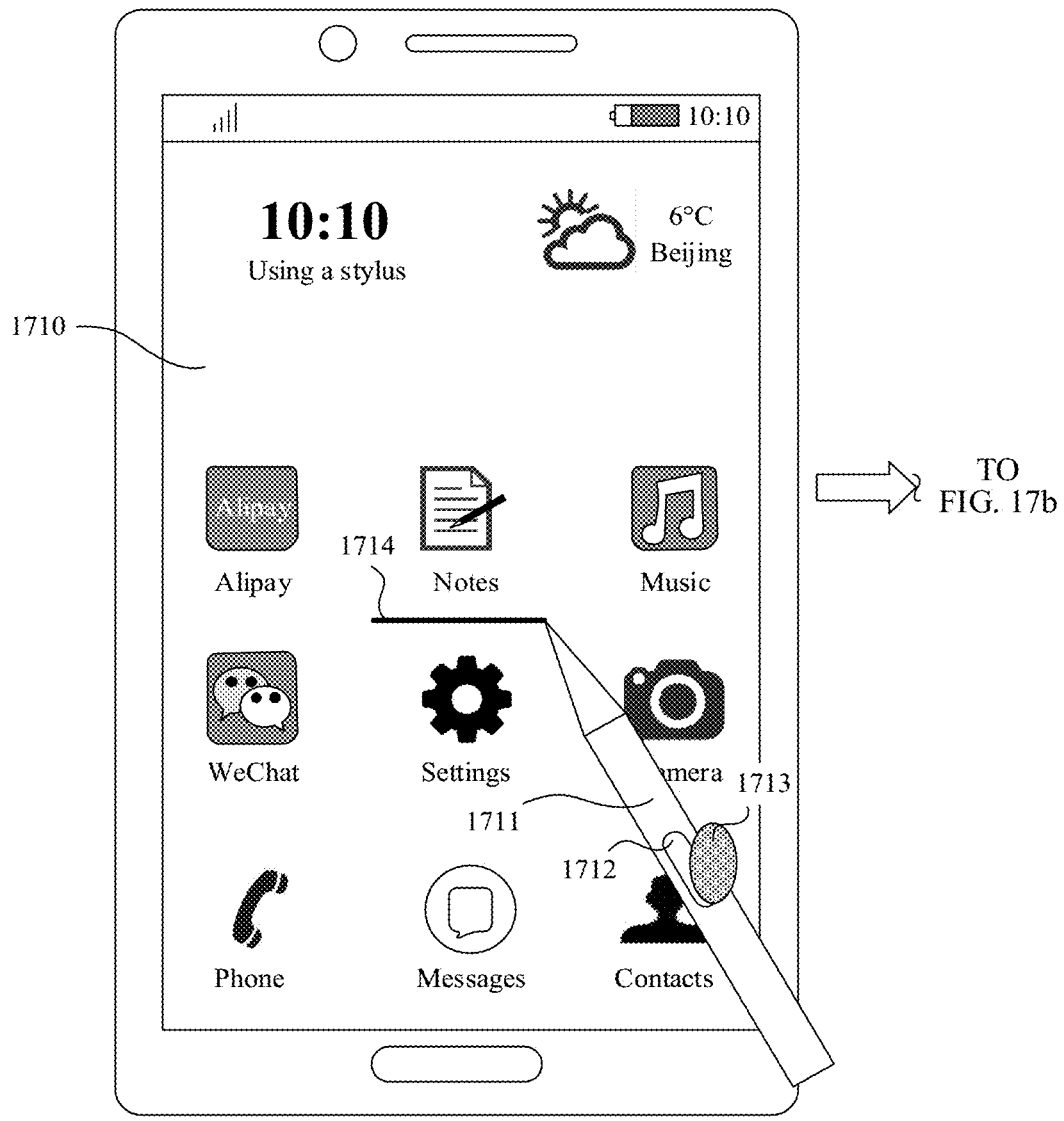
FIG. 17a and FIG. 17b are a schematic diagram of another group of screens according to an embodiment of this application.
Figure 17B:
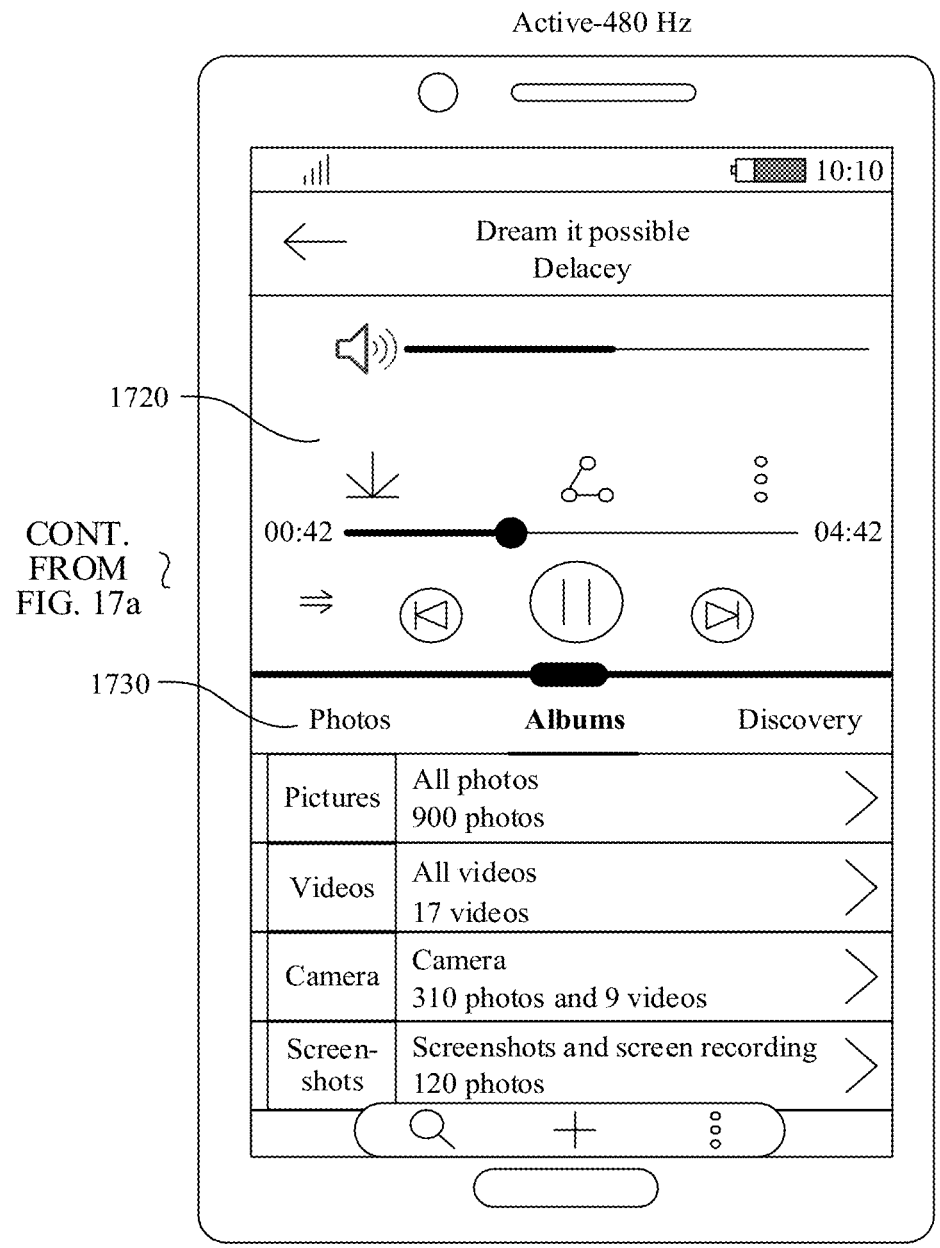

Refer to FIG. 17a and FIG. 17b. FIG. 17 shows a home screen 1710 displayed by the terminal in the Active-480 Hz state. The home screen 1710 may include one or more application (for example, Alipay, Notes, Music, WeChat, Settings, Camera, Phone, Messages, and Contacts) icons. As shown in FIG. 17a, a key 1712 on a stylus 1711 may receive a press-and-hold operation 1714 of the user. The terminal may receive, on the home screen 1610, an input operation 1714 (for example, drawing a horizontal line in the center of the touchscreen by the nib) of the stylus 1711 on which the user presses and holds the key 1712. In response to the input operation 1714 (for example, drawing the horizontal line in the center of the touchscreen by the nib), the terminal may enable a screen splitting function, and screens of the terminal after screen splitting may be shown in FIG. 17b. As shown in FIG. 17b, two screens after the screen splitting may be a music playing screen 1720 and an album application screen 1730. In addition to the home screen 1710 shown in FIG. 17a, the user may also enable the screen splitting function with the stylus on another screen. This is not limited herein. In this way, when the user presses and holds the key on the stylus, and draws the horizontal line in the center of the touchscreen with the stylus, the screen splitting function may be quickly enabled. This improves user experience.

In a possible case, the terminal receives an input operation of the user. In response to the input operation, the stylus function on the terminal may be disabled. When the stylus function on the terminal is disabled, the terminal may detect the input signal of the stylus at the first frequency (for example, 5 Hz).

Figure 18A:
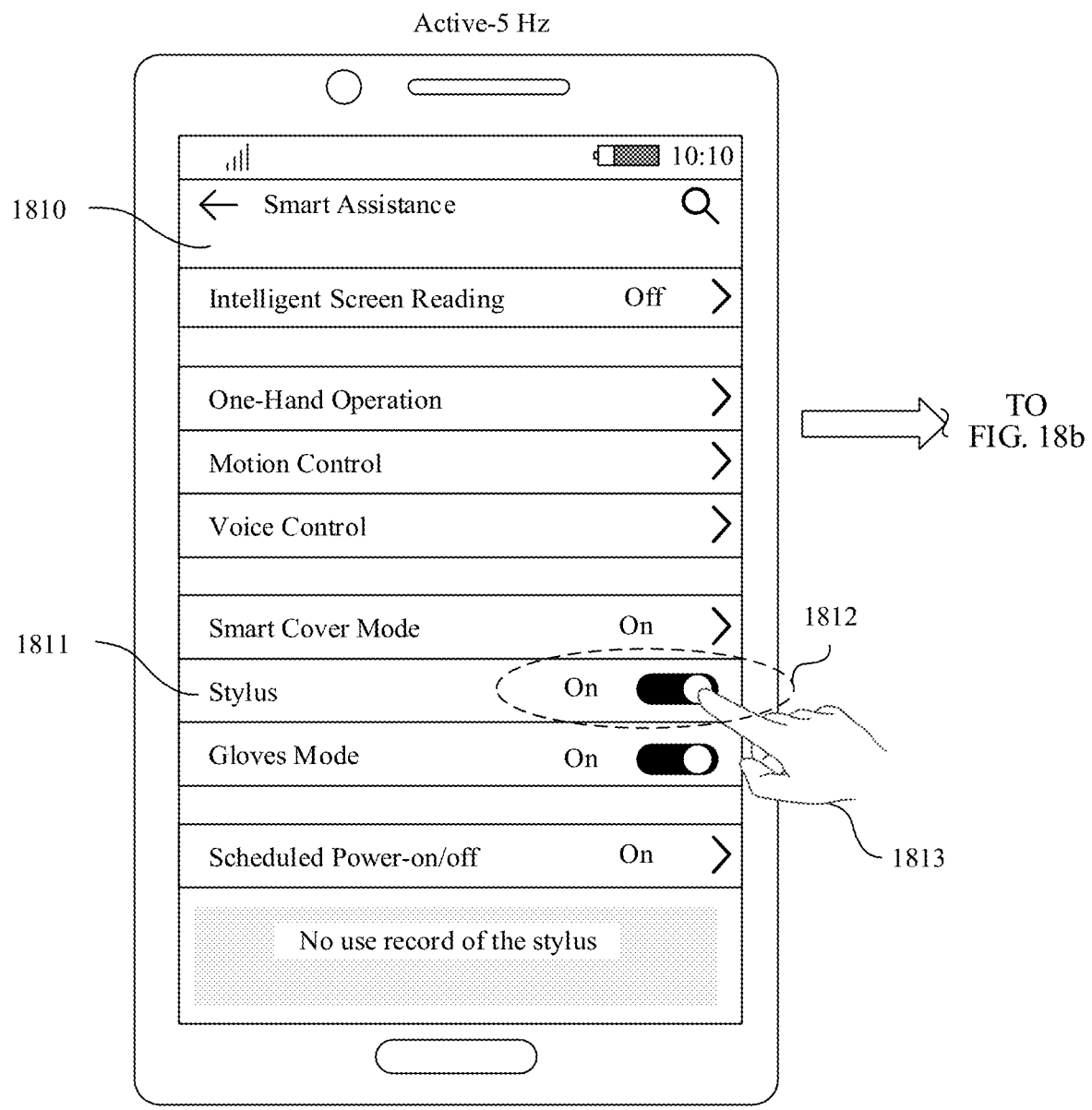
FIG. 18a to FIG. 18d are a schematic diagram of another group of screens according to an embodiment of this application.
Figure 18B:
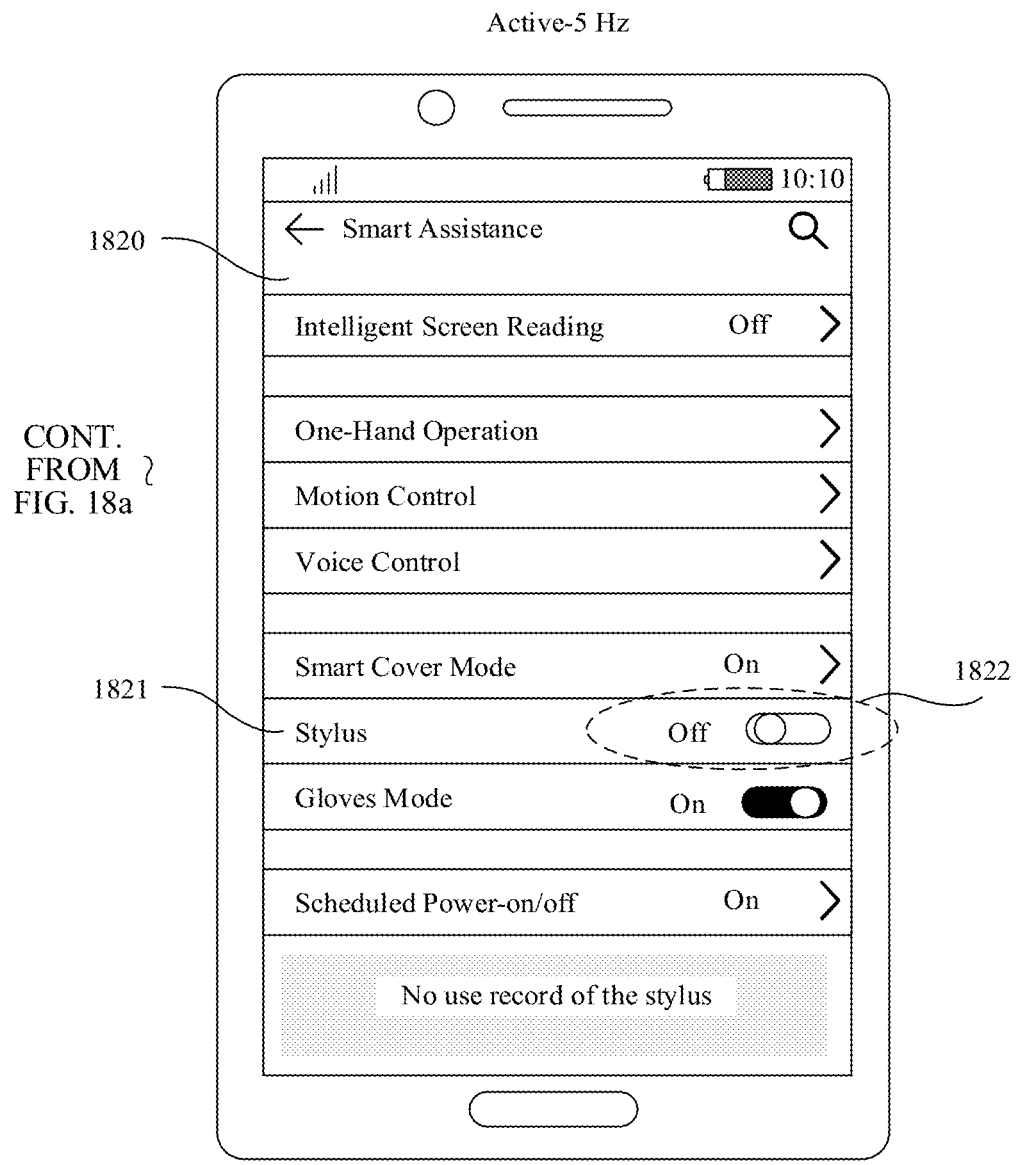

Refer to FIG. 18a to FIG. 18d. As shown in FIG. 18a, the stylus function on the terminal is enabled, and the terminal is in the Active-5 Hz state, but there is no record of using the stylus by the user on the terminal. A smart assistance settings screen 1810 may include a stylus setting bar 1811 and another setting bar (for example, the intelligent screen reading setting bar, the one-hand operation setting bar, the motion control setting bar, the voice control setting bar, the smart cover mode setting bar, the gloves mode setting bar, and the scheduled power-on/off setting bar). The stylus setting bar 1811 is associated with a stylus setting control 1812. In FIG. 18a the stylus setting control 1812 is in an on state. In other words, the stylus function on the terminal is enabled. The terminal may receive a touch operation 1813 (for example, a tap) of the user on the stylus setting control 1812 on the smart assistance settings screen 1810. In response to the touch operation 1813, the stylus function is disabled on the terminal, and the terminal maintains in the Active-5 Hz state. On a smart assistance settings screen 1820 shown in FIG. 18b, a stylus setting control 1822 is in an off state. In other words, the stylus function on the terminal is disabled. When the stylus function on the terminal is disabled, that is, the stylus setting control 1812 in FIG. 18a is in an off state, the terminal detects the input signal of the stylus at a detection frequency of the first frequency (for example, 5 Hz). When the stylus setting control 1812 is in the off state, and the terminal detects the input signal of the stylus at the detection frequency of the first frequency (for example, 5 Hz), if the terminal receives an input operation (for example, a tap) of the stylus on the touchscreen, in response to the input operation (for example, the tap) of the stylus, the terminal detects the input signal of the stylus at a frequency of 480 Hz.

Figure 18C:
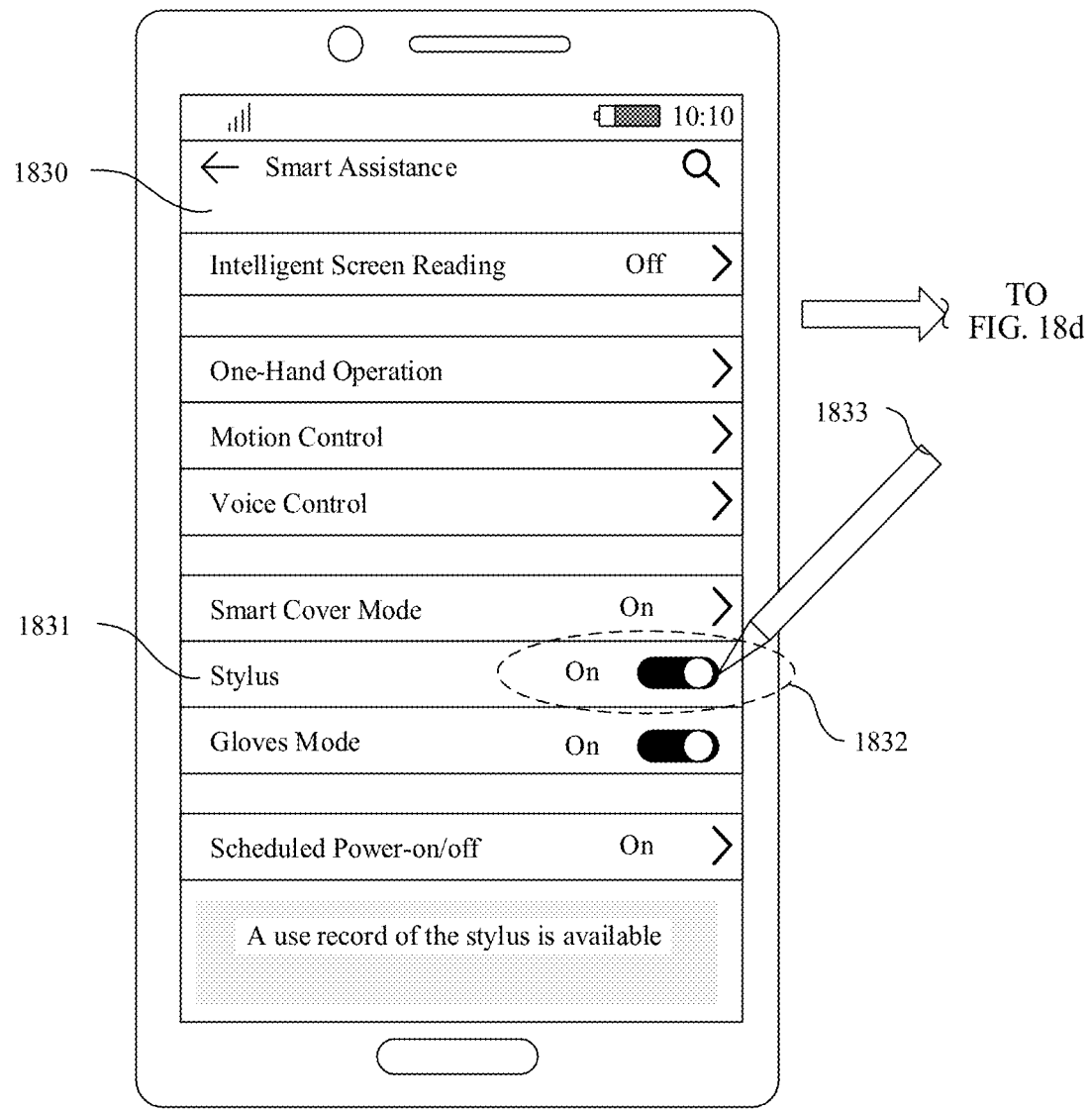
Figure 18D:
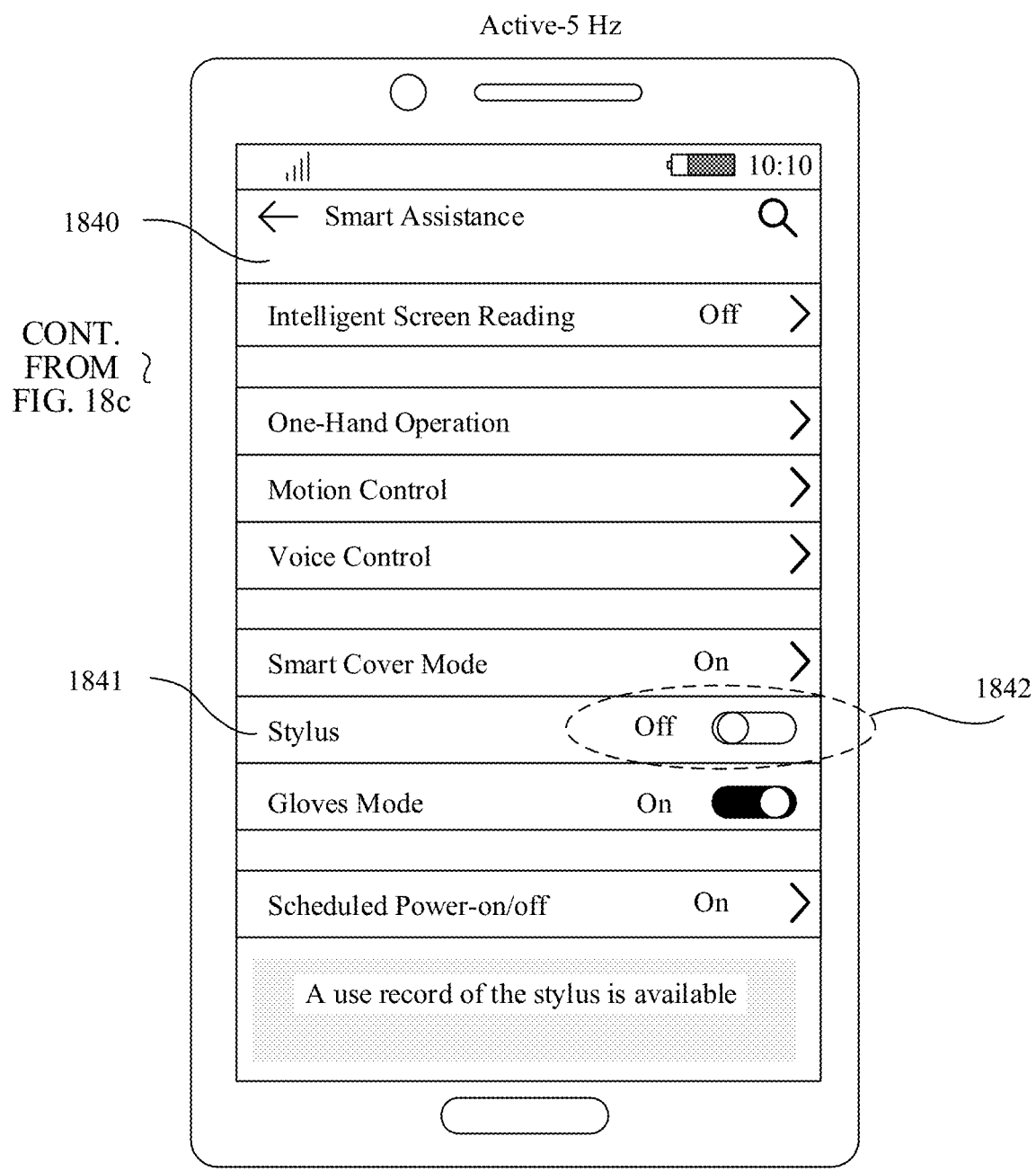

As shown in FIG. 18c, the stylus function on the terminal is enabled, and the terminal is in the Active-480 Hz state, but there is no record of using the stylus by the user on the terminal. A smart assistance settings screen 1830 may include a stylus setting bar 1831 and another setting bar (for example, the intelligent screen reading setting bar, the one-hand operation setting bar, the motion control setting bar, the voice control setting bar, the smart cover mode setting bar, the gloves mode setting bar, and the scheduled power-on/off setting bar). The stylus setting bar 1831 is associated with a stylus setting control 1832. In FIG. 18c, the stylus setting control 1832 is in an on state. In other words, the stylus function on the terminal is enabled. The terminal may receive a touch operation 1833 (for example, a tap) of the user on the stylus setting control 1832 on the smart assistance settings screen 1830. In response to the touch operation 1833, the stylus function on the terminal is disabled, and the terminal switches from the Active-480 Hz state to the Active-5 Hz state. On a smart assistance settings screen 1840 shown in FIG. 18d, a stylus setting control 1842 is in an off state. In other words, the stylus function on the terminal is disabled. After the stylus function is disabled, the terminal may detect the input signal of the stylus at a detection frequency of 5 Hz.

In this way, it can be ensured that when the user uses the stylus for a first time, the terminal may quickly make a response to a stylus input operation of the user. This improves user experience.

In a possible case, when the stylus function on the terminal is enabled, the terminal may verify the stylus. After verification succeeds, the terminal may perform the stylus functions shown in FIG. 14a to FIG. 14d, FIG. 15a and FIG. 15b, FIG. 16a and FIG. 16b, and FIG. 17a and FIG. 17b.

Figure 19A:
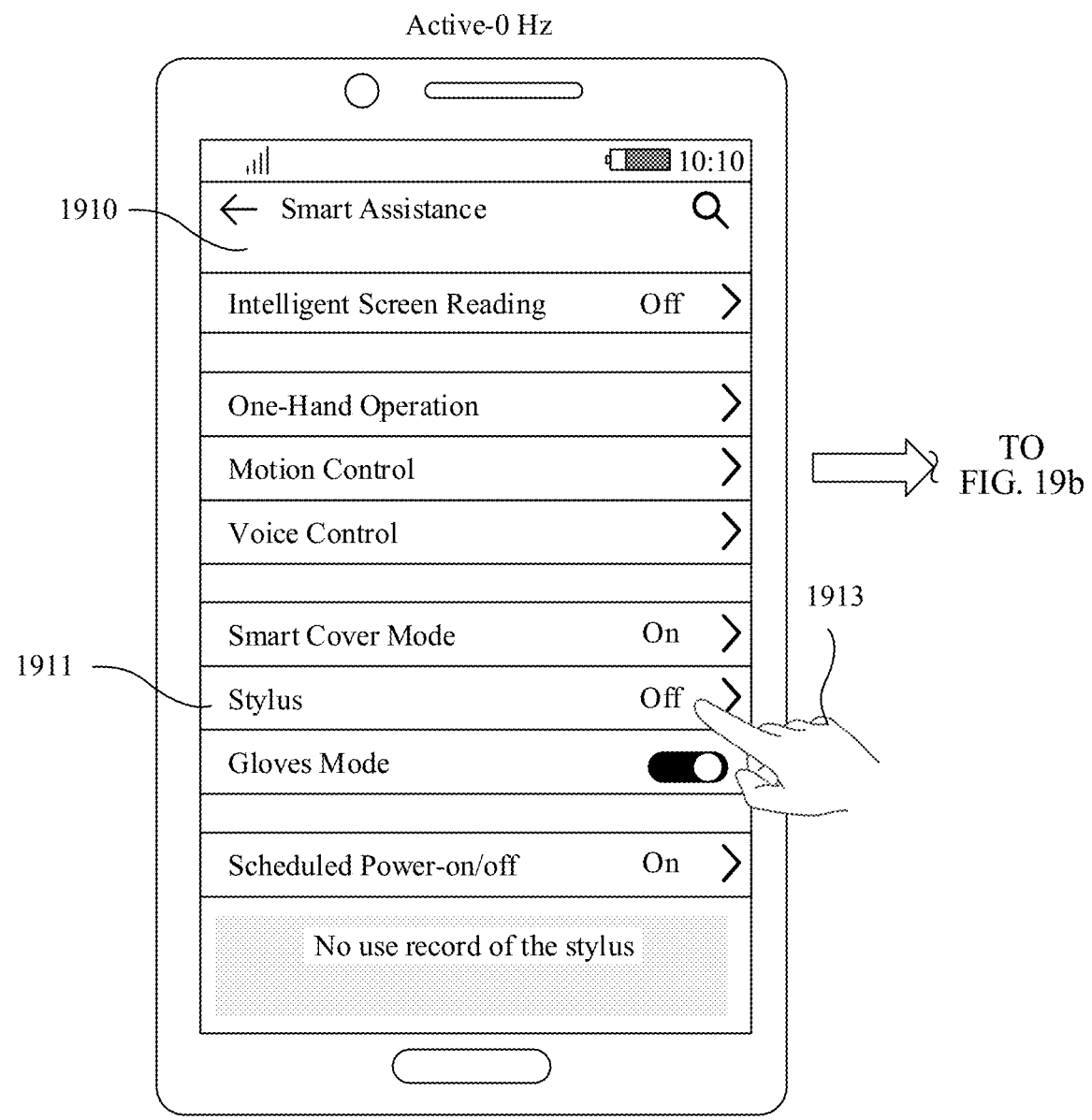
FIG. 19a to FIG. 19d are a schematic diagram of another group of screens according to an embodiment of this application.
Figure 19B:
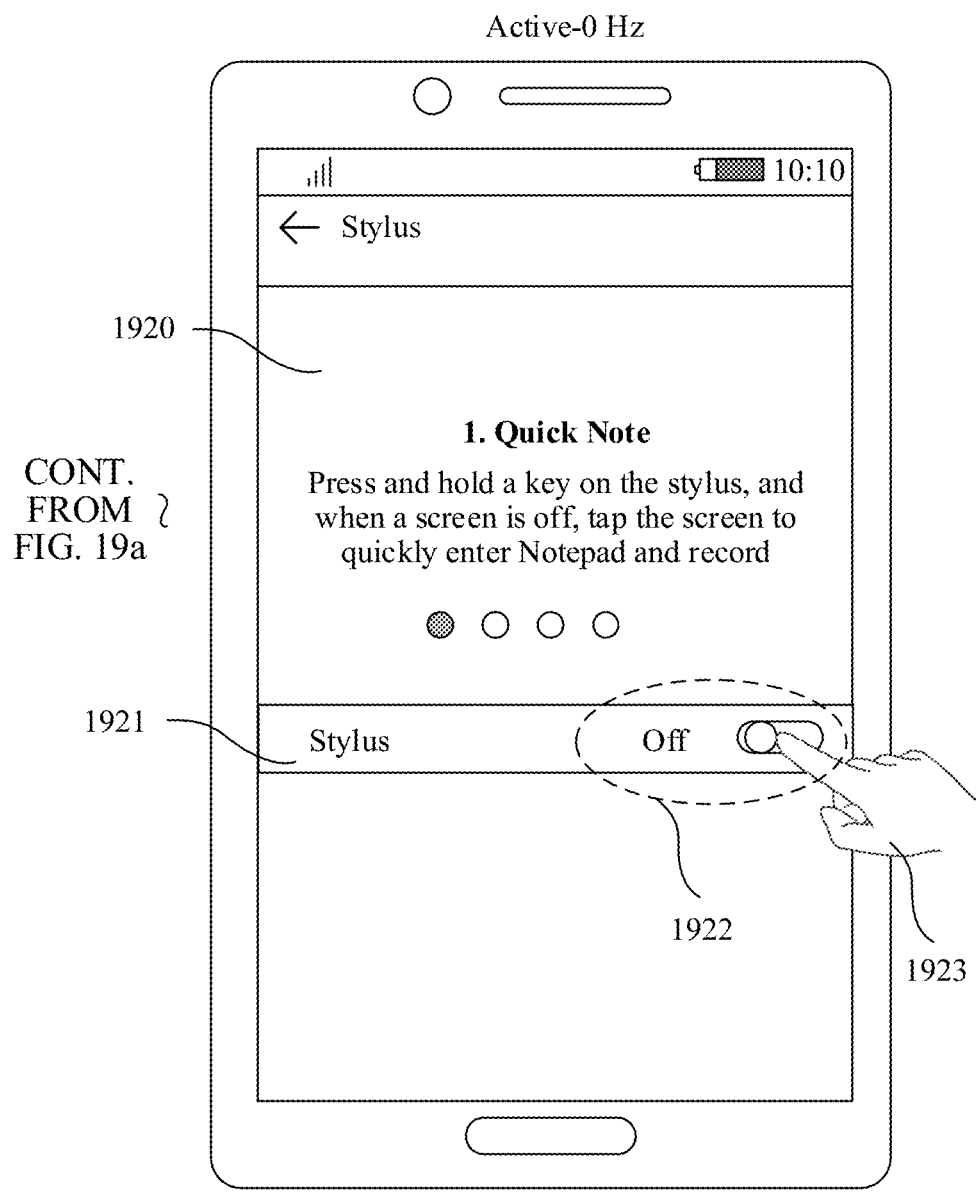
Figure 19B:
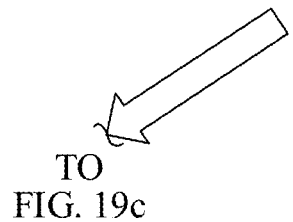
Figure 19C:
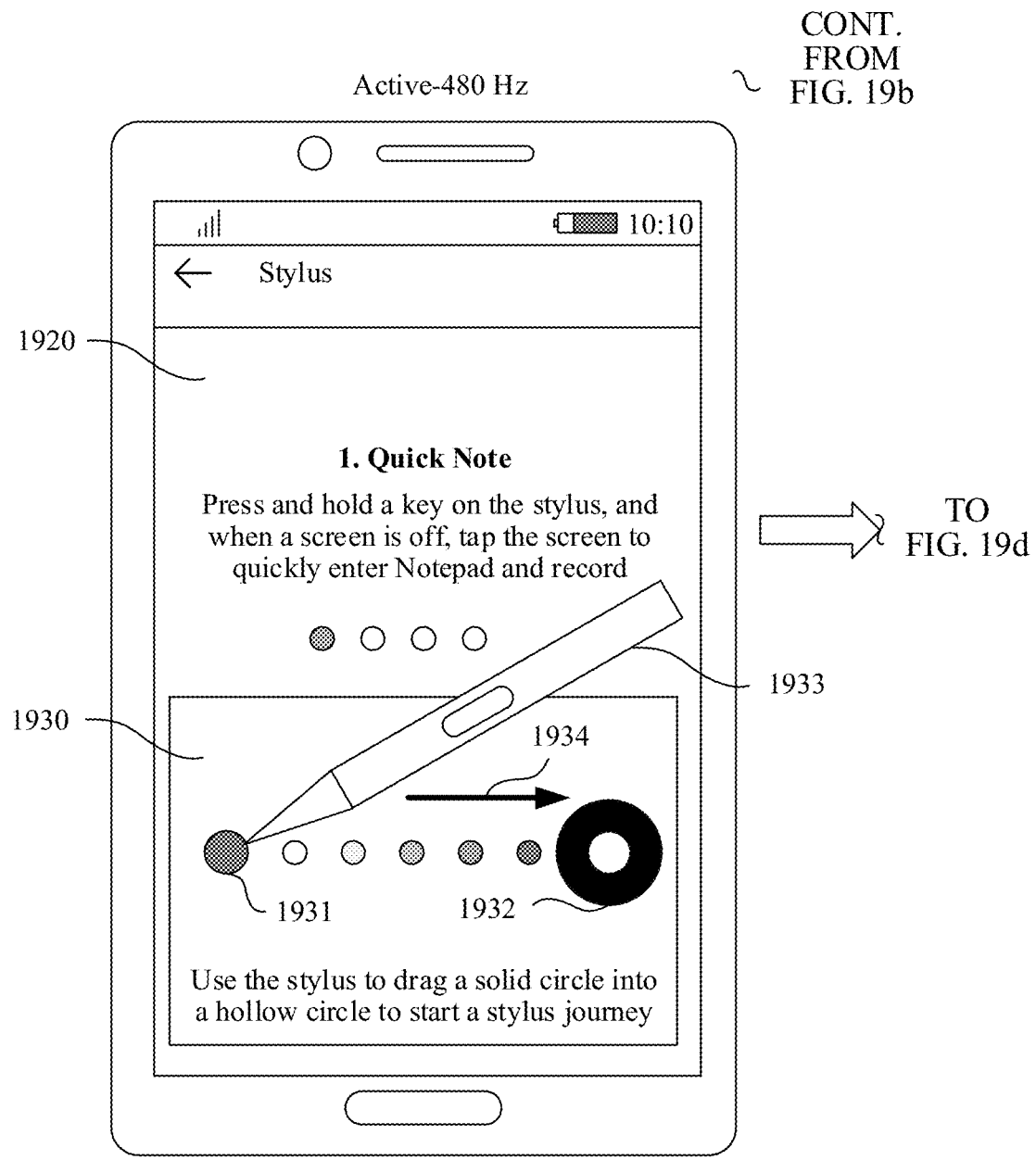
Figure 19D:
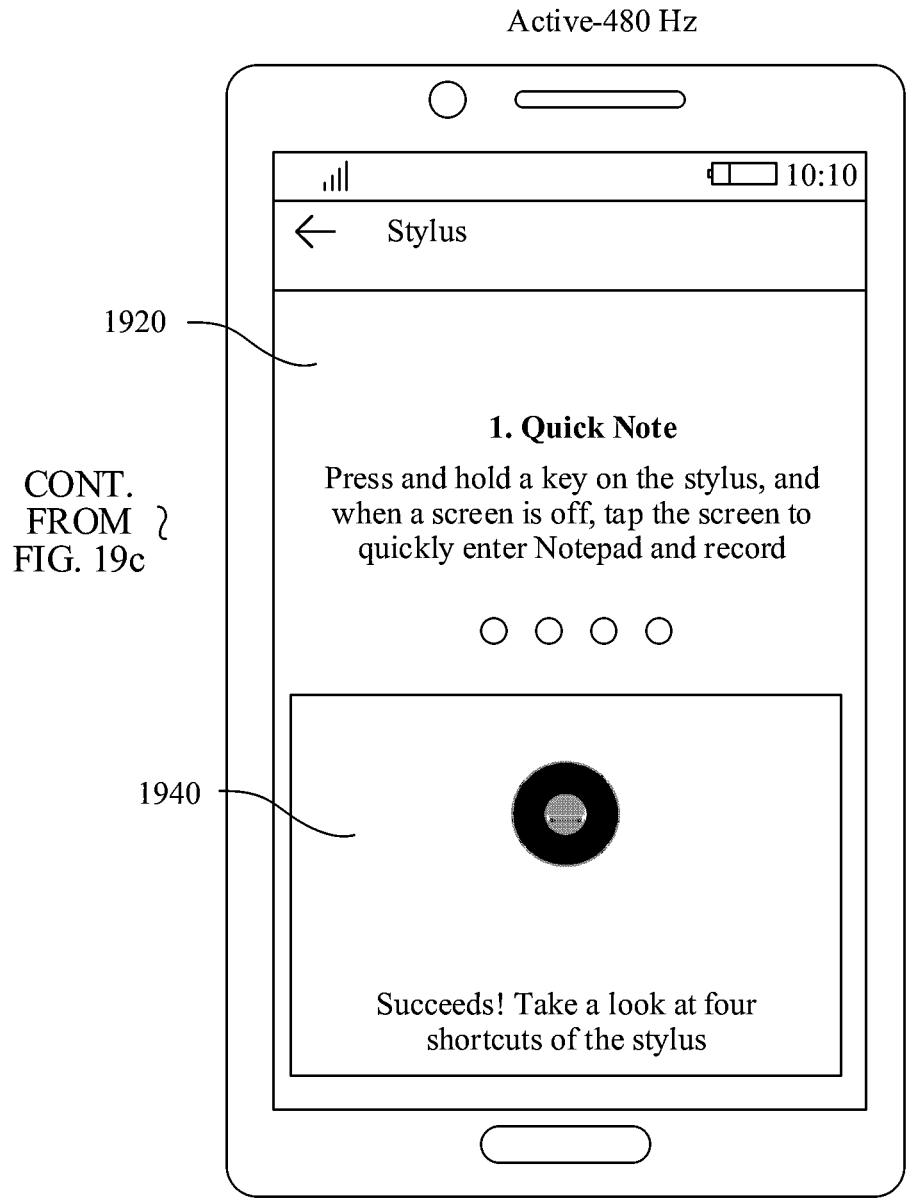

Refer to FIG. 19a to FIG. 19d. As shown in FIG. 19a, the stylus function on the terminal is disabled, and the terminal is in the Active-0 Hz state. A settings screen 1910 may include a smart assistance setting bar 1911 and another setting bar (for example, the sound setting bar, the notification center setting bar, the application management setting bar, the battery setting bar, the storage setting bar, the security and privacy setting bar, and the user and account setting bar). The terminal may receive a touch operation 1912 (for example, a tap) of the user on the smart assistance setting bar 1911. In response to the touch operation 1912, the terminal may display, on the touchscreen, a smart assistance settings screen 1920 shown in FIG. 19b. The smart assistance settings screen 1920 may include a stylus setting bar 1921 and another setting bar (for example, the intelligent screen reading setting bar, the one-hand operation setting bar, the motion control setting bar, the voice control setting bar, the smart cover mode setting bar, the gloves mode setting bar, and the scheduled power-on/off setting bar). The terminal may receive a touch operation 1922 (for example, a tap) of the user on the stylus setting bar 1921. In response to the touch operation 1912 (for example, the tap), the terminal detects the input signal of the stylus at the frequency of 480 Hz, and displays a stylus settings screen 1930 shown in FIG. 19c. The stylus settings screen 1930 displays an introduction to the stylus function (for example, quick note) and a verification pop-up window 1940. As shown in FIG. 19c, the verification pop-up window 1940 includes a solid circle 1941 and a hollow circle 1942, and the terminal may receive an input operation 1944 (for example, dragging the hollow circle 1941 by the nib to a location of the hollow circle 1942) of a stylus 1943 on the solid circle 1941. In response to the input operation 1944, the terminal successfully verifies the stylus, and a verification success pop-up window 1950 shown in FIG. 19d pops up. The verification success pop-up window 1950 may prompt the user that verification on the stylus is completed. After the verification succeeds, the terminal may perform the stylus functions shown in FIG. 14a to FIG. 14d, FIG. 15a and FIG. 15b, FIG. 16a and FIG. 16b, and FIG. 17a and FIG. 17b. In a possible case, if the terminal detects that a user finger drags the solid circle 1941, after the user finger drags the solid circle to a specified range (not to the location of the hollow circle 1942), the solid circle 1941 returns to a start point. When the input operation 1944 of the stylus 1943 on the solid circle 1941 exits midway, the verification fails. When the verification interface 1930 is re-entered, the verification pop-up window 1940 pops up until the stylus is successfully verified and enabled.

Functions such as the quick note can only be enabled on the terminal after the verification of the stylus succeeds. The key on the stylus is operated and moved close to the terminal, and the terminal automatically display a Notepad screen. When the verification fails, if the key on the stylus is operated and moved close to the terminal, the terminal does not automatically display the Notepad screen.

Figure 20:
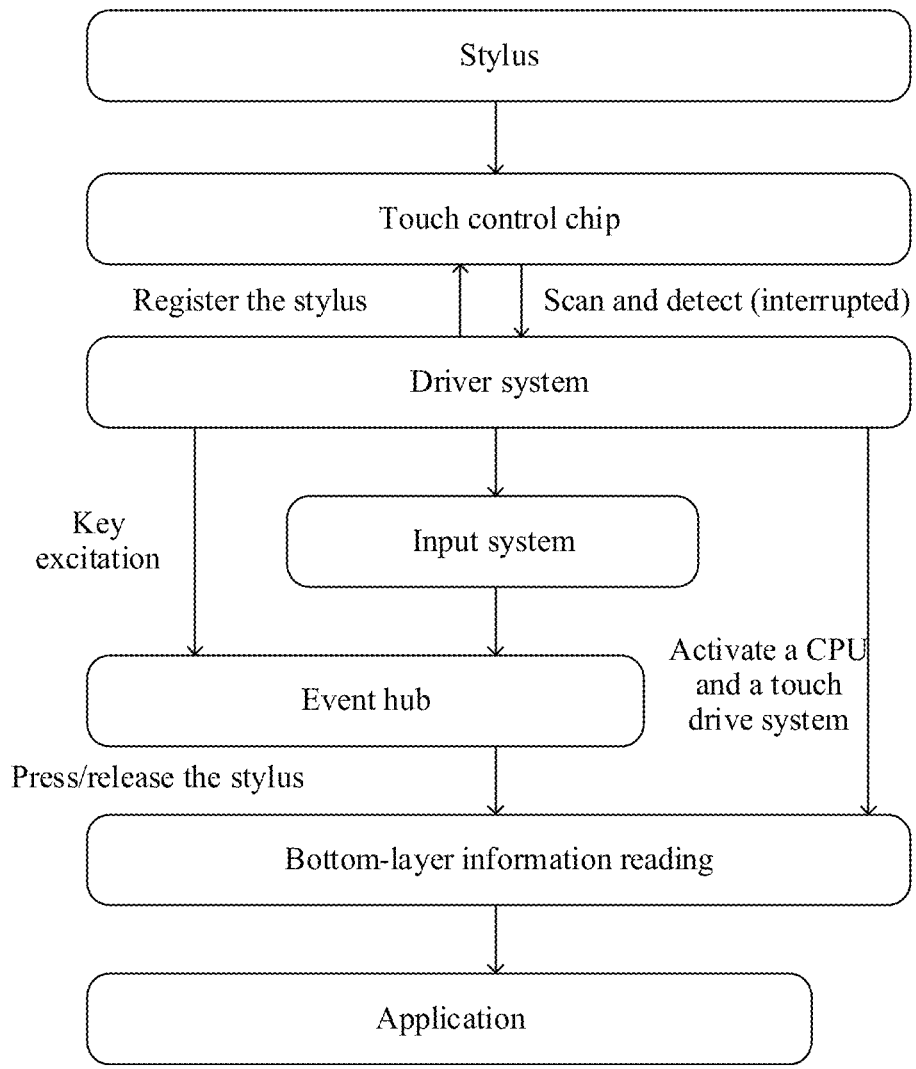
FIG. 20 is a schematic diagram of an architecture of another stylus system according to an embodiment of this application.

Refer to FIG. 20. FIG. 20 is an architectural diagram of a stylus system according to an embodiment of this application. As shown in FIG. 19, components or modules designed for the stylus system in this application include software and hardware architectures such as a stylus, a touch control chip, a driver system, an input system, an event hub, bottom-layer information reading, and an application. The stylus in this application is a proactive capacitive stylus. The touch control chip mainly includes chip modules such as a digital front-end and an analog back-end, and is responsible for processing and amplifying capacitance signals sent and obtained by a physical sending and receiving detection channel in the driver system.

A process of enabling the stylus may be as follows:

1. An enabling operation such as pressing a physical key, drawing a line, tapping, or double-tapping is performed on the stylus.

2. A terminal completes stylus registration and process running in the driver system.

3. The terminal delivers an event to the event hub (event hub). After the bottom-layer information reading reads pressing or releasing information of a key, based on different stylus (pen stylus) events and stroke information.

4. The terminal makes responses to different APP applications. For example, when the stylus double-taps the screen, or the stylus taps the screen when a key is pressed, the terminal may enable a Notes application. For another example, when the stylus double-taps the screen when the key is pressed, the terminal may enable a screenshot function. For another example, when the stylus draws a line on the screen when the key is pressed, the terminal may enable a screen splitting function. For another example, when a nib of the stylus presses and holds the screen when the key is pressed, the terminal may enable a screen reading function. The foregoing examples are merely used to explain this application, and shall not constitute a limitation.

Figure 21:
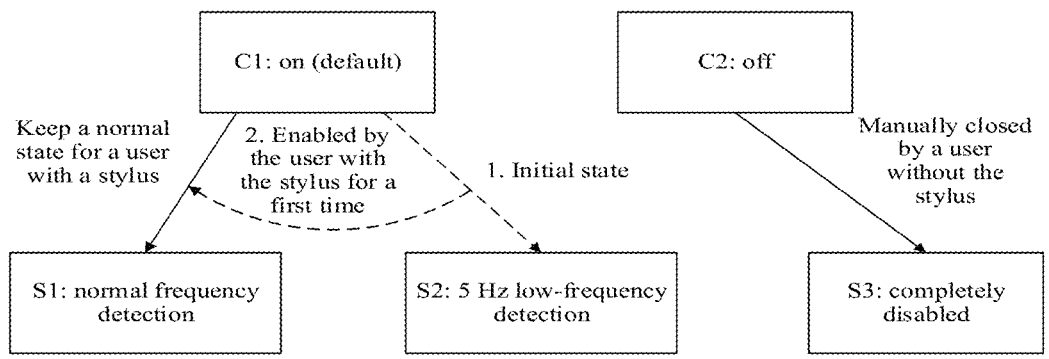
FIG. 21 is a schematic diagram of a status of a smart switch of a stylus according to an embodiment of this application.

Refer to FIG. 21. FIG. 21 is a status diagram of a smart switch of a stylus according to an embodiment of this application. As shown in FIG. 21, a three-state (state) switch related to the smart switch of the stylus in this application includes S1: normal frequency detection; S2: 5 Hz low-frequency detection; and S3: completely disabled. Two optional states (choice) include C1: on (a default state) and C2: off. One unperceivable state is corresponding to S2: 5 Hz low-frequency detection. When a user enables stylus detection for a first time, a terminal switches to the normal frequency detection and is a sub-stable state.

Figure 22:
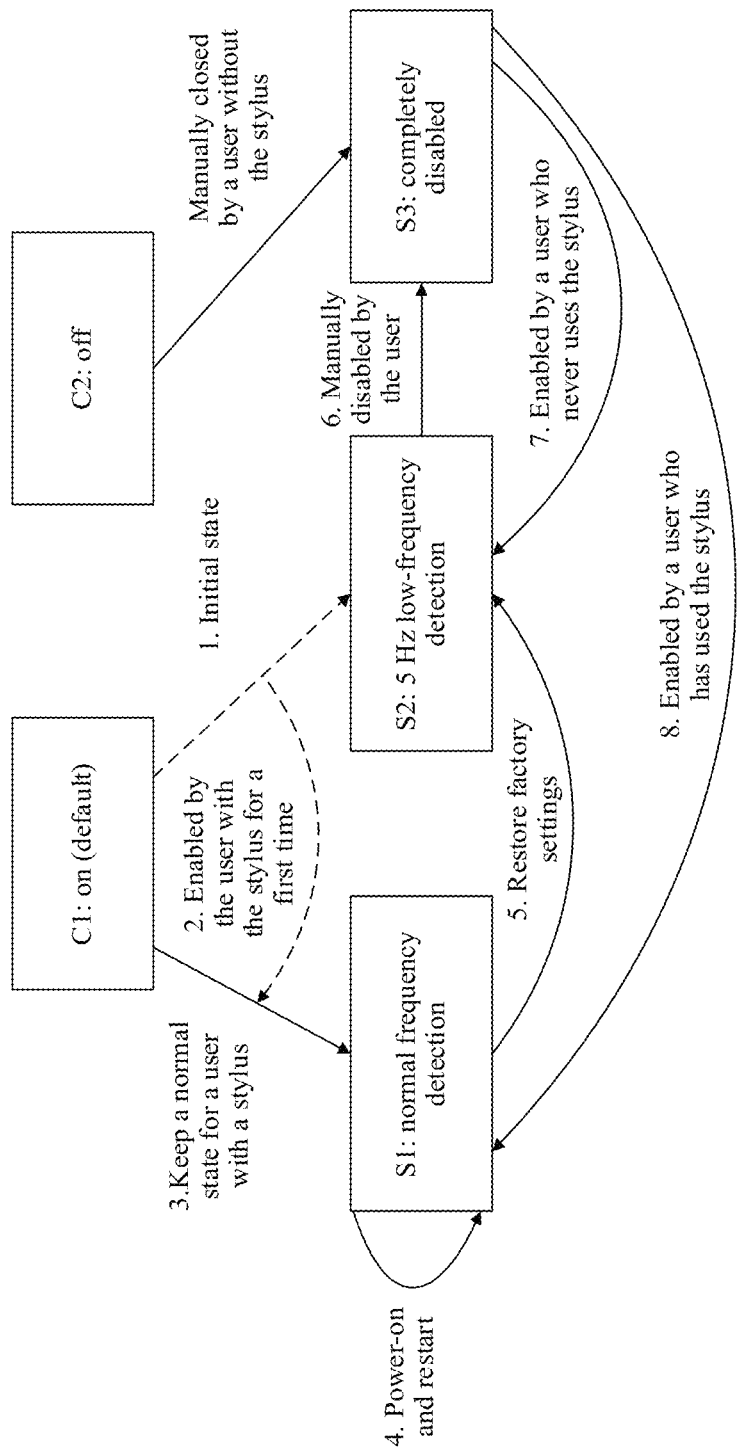
FIG. 22 is a schematic diagram of a status of a smart switch of another stylus according to an embodiment of this application.

Refer to FIG. 22. FIG. 22 is a status diagram of a smart switch of a stylus according to an embodiment of this application. As shown in FIG. 22, the smart switch of the stylus in this application mainly includes state switching of the following scenarios:

1. An initial state is low-frequency detection.

2. If stylus detection is enabled for a first time, a normal frequency is used for detection.

3. A normal state is that normal frequency detection is kept for a user with a stylus.

4. After a terminal is restarted, the normal frequency detection is still kept.

5. When the terminal restores factory settings, a low-frequency detection state is restored.

6. When the user who does not need to use the stylus worries about power consumption, the terminal may receive an input of the user, and turns off the switch.

7. When the terminal receives an input of the user to turns on the switch again, the terminal may distinguish whether the user has a history of using the stylus, and if the user has the history of using the stylus, the terminal switches to a high-frequency detection state.

8. If there is no use history of the stylus on the terminal, the terminal switches to the low-frequency detection state, namely, the initial state.

According to the embodiment shown in FIG. 22 in this application, when the user with the stylus uses the stylus for the first time, the terminal may enable a stylus function, record that the user has used the stylus, and keep detecting an input signal of the stylus at a high frequency. When there is no record of using the stylus by the user on the terminal, the input signal of the stylus may be detected at a low frequency. When the terminal is powered on or restarts, a detection state before the power-on or the restart may be kept. When the terminal restores the factory settings, the terminal may restore to the initial state. When the stylus function on the terminal is disabled, the input signal of the stylus may not be detected. If there is a record of using the stylus by the user on the terminal, when the stylus function on the terminal is enabled, the terminal may detect the input signal of the stylus at the high frequency. If there is no record of using the stylus by the user on the terminal, when the stylus function on the terminal is enabled, the terminal may detect the input signal of the stylus at the low frequency. The terminal may implement a balance between user experience and the power consumption by implementing detection states in the foregoing plurality of scenarios.

Figure 23:
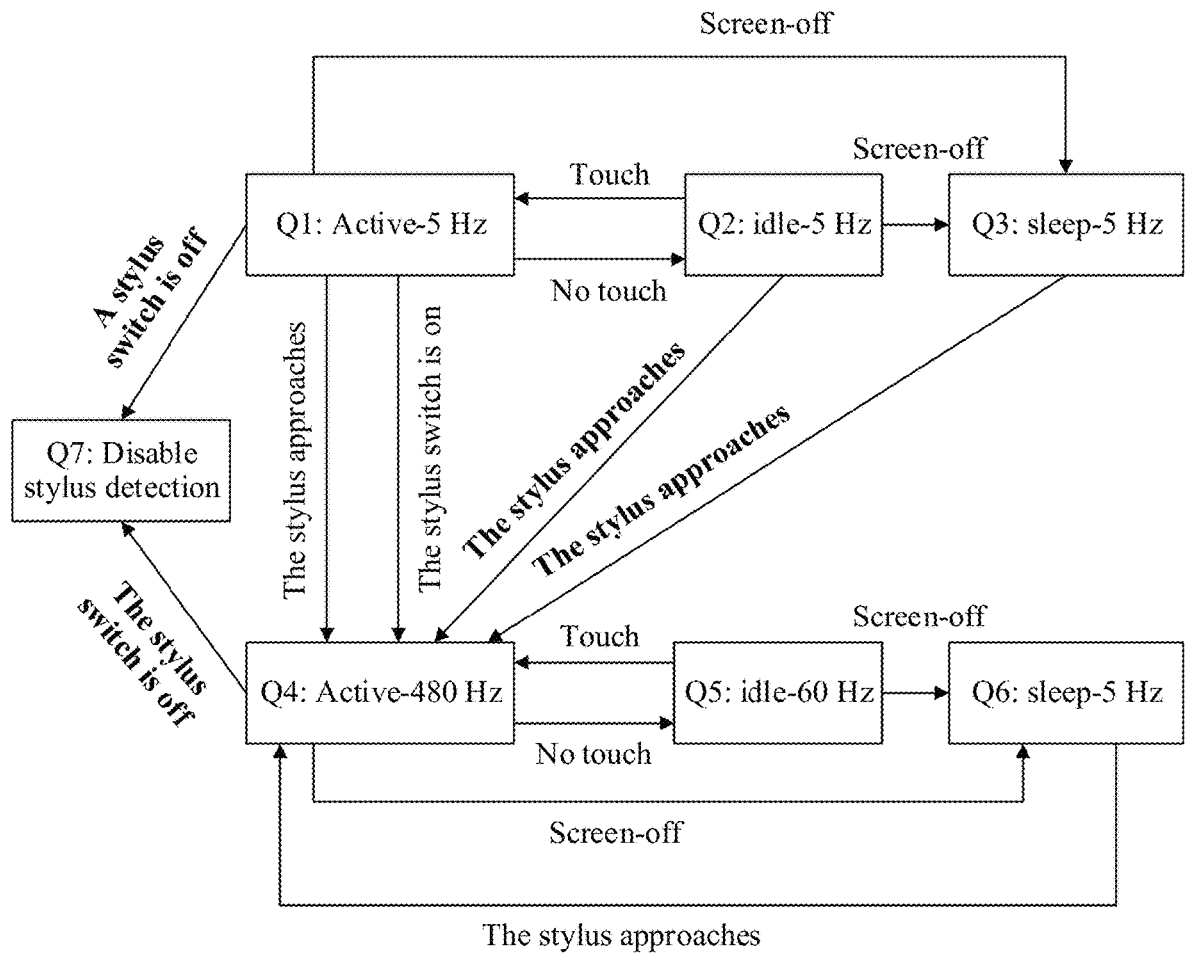
FIG. 23 is a schematic diagram of working status switching of a touch component according to an embodiment of this application.

Refer to FIG. 23. FIG. 23 is a diagram of working status switching of a touch component according to an embodiment of this application. As shown in FIG. 23, the diagram of working status switching of the touch component may be shown as follows:

1. An initial state is a Q1: Active-5 Hz state. Whether there is a stylus is checked at a frequency of 5 Hz.

2. When a stylus approaches, a stylus switch of a terminal is turned on, and the touch component enters a Q4: Active-480 Hz state.

3. If no touch (No Touch) event occurs, the touch component enters a Q2: Idle-5 Hz state, and detects the stylus at the frequency of 5 Hz. When there is a touch (Touch) event, the touch component returns to the Active-5 Hz state.

4. When a screen is off, the touch component enters a Q3: Sleep-5 Hz state.

5. When the stylus approaches, the touch component may switch from the Q2: Idle-5 Hz state or the Q3: Sleep-5 Hz state to the Active-480 Hz state.

6. After the touch component enters Q4: Active-480 Hz, when no touch (No Touch) event occurs, the touch component switches to a Q5: Idle-60 Hz state; when there is a touch event, the touch component returns to Q4: Active-480 Hz.

7. When the terminal is screen-off, the touch component enters the Sleep-5 Hz state from the Q5: Idle-60 Hz state.

8. When the stylus approaches, the touch component enters the Q4: Active-480 Hz state from the Q5: Idle-60 Hz state and a Q6: Sleep-5 Hz state.

9. When a switch of a stylus function of the terminal is turned off, the Q4: Active-480 Hz state is restored to the initial state, namely, Q1: Active-5 Hz.

For content that is not described in detail in the embodiment shown in FIG. 23, refer to the embodiments in FIG. 6a to FIG. 6c and FIG. 7a to FIG. 7c. Details are not described herein.

Based on a three-state switch, two optional states, an unperceivable state, and a switch design manner of intelligent switching based on a user behavior, which are provided in the embodiment shown in FIG. 23 of this application, the terminal may implement intelligent switching of a plurality of operation behaviors of a user finger and the stylus with low power consumption. This ensures user experience.

Figure 24:
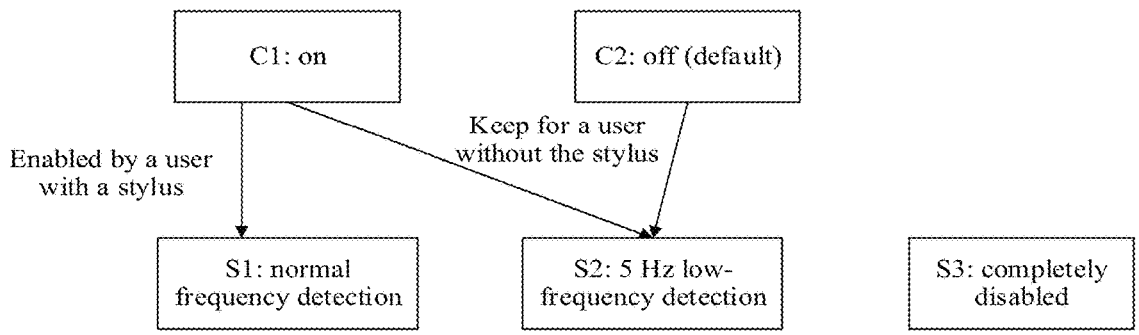
FIG. 24 is a schematic diagram of a status of a smart switch of a stylus according to an embodiment of this application.

Refer to FIG. 24. FIG. 24 is a status diagram of a smart switch of a stylus according to an embodiment of this application. As shown in FIG. 24, a stylus function on a terminal is disabled by default. When the stylus function on the terminal is disabled, the terminal may detect an input signal of the stylus at a low frequency (for example, 5 Hz). If there is no record of using the stylus by a user on the terminal, the terminal keeps detecting the input signal of the stylus at the low frequency (for example, 5 Hz). If there is a record of using the stylus by the user on the terminal, when the user with the stylus turns on a stylus switch, a touch component on the terminal may detect the input signal of the stylus at a normal frequency.

According to the status diagram of the smart switch of the stylus shown in FIG. 24 in this application, it can be ensured that when the user uses the stylus for a first time, the terminal may quickly make a response to a stylus input operation of the user. This improves user experience.

Figure 25:
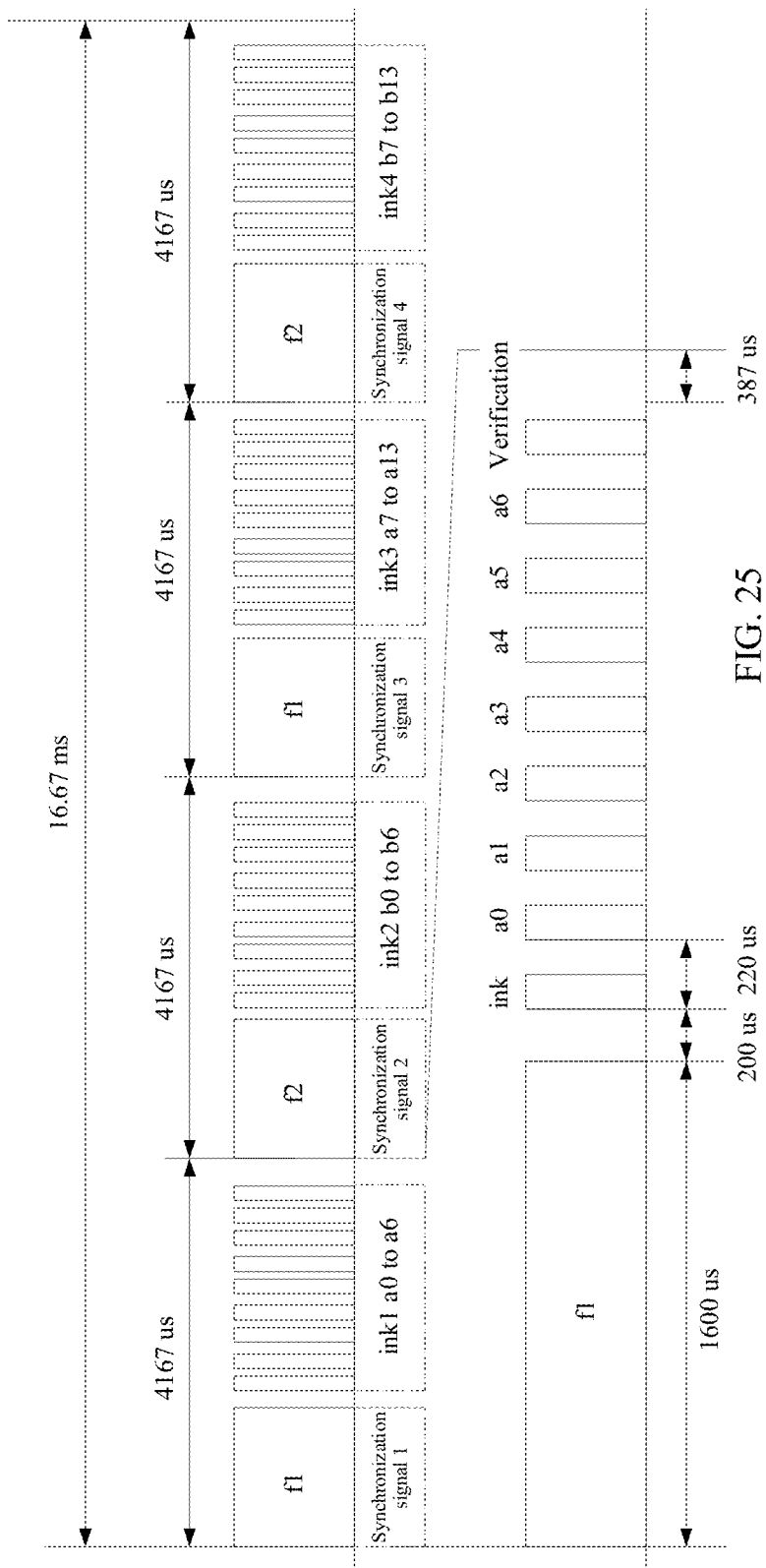
FIG. 25 is a schematic diagram of a signal output by a stylus according to an embodiment of this application.

Refer to FIG. 25. FIG. 25 is a schematic diagram of a signal output by a stylus according to an embodiment of this application. As shown in FIG. 25, a signal output by a nib of the stylus may be transmitted through a fixed dual-frequency point, and the nib may transmit a dual-frequency point signal in a time-division manner. Frequencies of synchronization signals may be separately: a frequency, which may be f1=176.37 KHz, of a synchronization signal 1 and a frequency of a synchronization signal 3, and a frequency, which may be 12=252.49 KHz, of a synchronization signal 2 and a frequency of a synchronization signal 4. If a value of a display pulse signal ink (for example, ink1, ink2, ink3, or ink4) of the nib is 1, it indicates that the terminal needs to display a writing trace of the nib. If a value of a pulse signal ink (for example, the ink1, the ink2, the ink3, or the ink4) is 0, it indicates that the nib is in a floating state on the touchscreen of the terminal. Pulse signals a0 to a11 may represent a touch feeling of a 4096-level stylus pressure. A pulse signal a12 may indicate whether a key 1 on the stylus is pressed (for example, if a value of the pulse signal a12 is 1, the key 1 is pressed; if the value of the pulse signal a12 is 0, the key 1 is not pressed). The pulse signal a12 may indicate whether the key 1 on the stylus is pressed (for example, if a value of the pulse signal a13 is 1, the key 2 is pressed; if the value of the pulse signal a13 is 0, the key 2 is not pressed). Pulse signals b0 to b11 may represent the touch feeling of the 4096-level stylus pressure. A pulse signal b12 may indicate whether the key 1 on the stylus is pressed (for example, if a value of the pulse signal b12 is 1, the key 1 is pressed; if the value of the pulse signal b12 is 0, the key 1 is not pressed). The pulse signal b12 may indicate whether the key 1 on the stylus is pressed (for example, if a value of the pulse signal b13 is 1, the key 2 is pressed; if the value of the pulse signal b13 is 0, the key 2 is not pressed). This dual-frequency working mode of the stylus can improve an anti-noise capability and prevent a fixed frequency from being interfered by another noise signal.

In a possible case, when the terminal detects an input signal of the stylus, because of noise interference (for example, noise interference during charging of the terminal), the terminal may mistakenly consider the noise interference as the input signal of the stylus, and switch a detection frequency for the stylus. The following solutions may be used by the terminal to filter out a misoperation caused by the noise interference.

1. Because a noise is burst, and duration of the noise is relatively short, when detecting the input signal of the stylus, the terminal may determine whether duration of a detected signal is less than a preset time period. If the duration of the detected signal is less than the preset time period, the terminal may determine that the detected signal is a noise signal. In this case, the terminal may ignore the noise signal, and does not perform an action of switching the detection frequency for the stylus. For example, when the terminal detects the input signal of the stylus at a frequency of 5 Hz, and a coupling time period of two frequencies of the signal output by the nib of the stylus is T (for example, T=2*4167 us), the terminal detects a signal 1 through the touchscreen, and the terminal may determine whether duration of the signal 1 is less than T. If yes, the terminal may ignore the signal 1, and does not switch the detection frequency for the stylus, and continues to detect the input signal of the stylus at the frequency of 5 Hz.

2. Because a noise is randomly generated, a coordinate range of a noise signal received by a touch sensor is small, and is less than a contact range of the nib of the stylus on the touch sensor. Therefore, when detecting the input signal of the stylus, the terminal may determine whether an area formed by a received coordinate location of the detected signal is less than a preset range. If the area is less than the preset range, the terminal may determine that the detected signal is a noise signal. In this case, the terminal may ignore the noise signal, and does not perform the action of switching the detection frequency for the stylus. For example, when the terminal detects the input signal of the stylus at the frequency of 5 Hz, a contact area of the nib on the sensor may be a range of three adjacent coordinate point areas on the touch sensor. The terminal detects a signal 2 through the touchscreen, and the terminal may determine whether an area formed by a received coordinate location of the signal 2 is smaller than the range of the three adjacent coordinate point areas on the touch sensor. If yes, the terminal may ignore the signal 2, and does not switch the detection frequency for the stylus, and continues to detect the input signal of the stylus at the frequency of 5 Hz.

The foregoing two noise filtering solutions provided in this embodiment may be separately executed by the terminal, or may be executed in combination. According to the noise filtering solutions, the terminal may prevent the misoperation caused by the noise, to reduce power consumption of the terminal.

Figure 26:
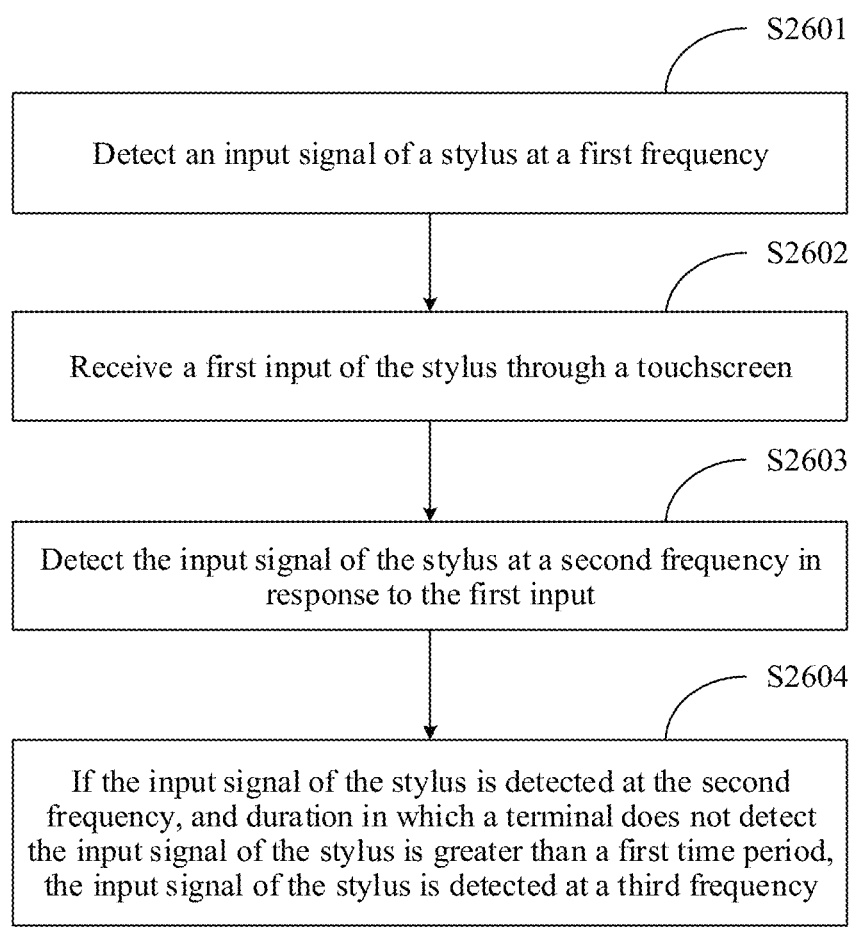
FIG. 26 is a schematic flowchart of a stylus detection method according to an embodiment of this application.

Refer to FIG. 26. FIG. 26 is a schematic flowchart of a stylus detection method according to an embodiment of this application. As shown in FIG. 26, the method may include the following steps.

S2601: A terminal detects an input signal of a stylus at a first frequency.

For example, a value range of the first frequency may be 2 Hz to 10 Hz. In a specific implementation, the first frequency may be a frequency at which the terminal detects the input signal of the stylus when the terminal is in the Active-5 Hz state, the Idle-5 Hz state, or the Sleep-5 Hz state in the foregoing embodiments. In other words, the first frequency may be 5 Hz. For a process of detecting the stylus by the terminal, refer to the embodiments shown in FIG. 3, FIG. 4, and FIG. 5. Details are not described herein again.

S2602: The terminal receives a first input of the stylus through a touchscreen.

S2603: The terminal detects the input signal of the stylus at a second frequency in response to the first input.

For example, a value range of the second frequency may be 300 Hz to 600 Hz. In a specific implementation, the first frequency may be a frequency at which the terminal detects the input signal of the stylus when the terminal is in the Active-480 Hz state, the Idle-480 Hz state, or the Sleep-480 Hz state in the foregoing embodiments. In other words, the second frequency may be 480 Hz.

For example, the first input of the stylus may be an input such as tapping the screen, sliding and holding, double-tapping, or dragging by the nib of the stylus. That the terminal receives the first input of the stylus is that the terminal detects the input signal of the stylus. In the Sleep-5 Hz state shown in FIG. 7c, after the nib of the stylus taps the screen, the terminal may detect the input signal of the stylus through the touchscreen, and the terminal may switch from the Sleep-5 Hz state shown in FIG. 7c to the Active-480 Hz state shown in FIG. 7a. Alternatively, the first input of the stylus may be the input operation 1414 shown in FIG. 14a, or the input operation 1434 shown in FIG. 14c. The examples are merely used to explain this application and shall not constitute a limitation. For specific content, refer to the foregoing embodiments. Details are not described herein again.

S2604: If the terminal detects the input signal of the stylus at the second frequency, and duration in which the terminal does not detect the input signal of the stylus is greater than a first time period, the terminal detects the input signal of the stylus at a third frequency. The second frequency is greater than the third frequency and the third frequency is greater than the first frequency.

For example, a value range of the second frequency may be 30 Hz to 100 Hz. In a specific implementation, the first frequency may be a frequency at which the terminal detects the input signal of the stylus when the terminal is in the Active-60 Hz state or the Sleep-60 Hz state in the foregoing embodiments. In other words, the third frequency may be 60 Hz.

For example, the first time period may be 30 seconds, 1 minute, 2 minutes, or longer. As shown in FIG. 7a to FIG. 7c, when the terminal is in the Active-480 Hz state shown in FIG. 7a, the terminal detects the input signal of the stylus at the second frequency (480 Hz). If the duration in which the terminal does not detect the input signal of the stylus is greater than the first time period (30 s), the terminal may be in the idle-60 Hz state shown in FIG. 7b, and detect the input signal of the stylus at the third frequency (60 Hz). As shown in FIG. 8a to FIG. 8d, when the terminal is in the Active-480 Hz state shown in FIG. 8a, the terminal detects the input signal of the stylus at the second frequency (480 Hz). If the duration in which the terminal does not detect the input signal of the stylus is greater than the first time period (30 s), the terminal may be in the Active-60 Hz state shown in FIG. 8b, and detect the input signal of the stylus at the third frequency (60 Hz). As shown in FIG. 8a to FIG. 8d, when the terminal is in the Idle-480 Hz state shown in FIG. 8c, the terminal detects the input signal of the stylus at the second frequency (480 Hz). If the duration in which the terminal does not detect the input signal of the stylus is greater than the first time period (30 s), the terminal may be in the Idle-60 Hz state shown in FIG. 8d, and detect the input signal of the stylus at the third frequency (60 Hz). The example is merely used to explain this application and shall not constitute a limitation.

According to this embodiment of this application, the terminal may detect the input signal of the stylus at a low frequency (the first frequency). When the input signal of the stylus is detected, the terminal may quickly switch to a high frequency (the second frequency) to detect the input signal of the stylus, to achieve user experience of quickly using the stylus. When the terminal detects the input signal of the stylus at the high frequency (the second frequency), if the terminal does not detect the input signal of the stylus within a period of time (for example, 30 s to 60 s), the terminal may reduce a detection frequency to a medium frequency (the third frequency), and wait for, in a power-saving manner, the input signal of the stylus to arrive again. In this way, when the input signal of the stylus arrives again, the terminal may quickly return to a high-frequency (second-frequency) state to make a response, and quickly perform an action corresponding to the input signal of the stylus that arrives again. This improves user experience.

In a possible case, when the terminal detects the input signal of the stylus at the third frequency, if the duration in which the terminal does not detect the input signal of the stylus is greater than a second time period, the terminal detects the input signal of the stylus at the first frequency. In other words, when no input signal of the stylus arrives for a long time, the terminal may reduce the detection frequency for the input signal of the stylus, to reduce power consumption.

For example, the second time period may be 30 seconds, 1 minute, 2 minutes, or longer. For example, the first frequency is 5 Hz, and the third frequency is 60 Hz. As shown in FIG. 7b and FIG. 7c, when the terminal is in the Idle-60 Hz state (in the Idle-60 Hz state, the terminal detects the input signal of the stylus at a frequency of 60 Hz) shown in FIG. 7b, if the terminal does not detect the input signal of the stylus through the touchscreen, and duration in which the terminal does not detect an input signal of a user touch operation through the touchscreen is greater than the second time period (for example, 30 seconds, 1 minute, 2 minutes, or longer), the terminal may switch from the Idle-60 Hz state shown in FIG. 7b to the Sleep-5 Hz state shown in FIG. 7c (in the Sleep-5 Hz state, the terminal detects the input signal of the stylus at a frequency of 5 Hz). The terminal switches the detection frequency for the input signal of the stylus from the third frequency to the first frequency. For details, refer to other embodiments. Details are not described herein again.

In a possible case, when the terminal detects the input signal of the stylus at the third frequency, if the terminal receives a second input of the stylus, the terminal detects the input signal of the stylus at the second frequency in response to the second input of the stylus. In other words, when the input signal of the stylus arrives again, the terminal may increase the detection frequency for the input signal of the stylus, so that the terminal can quickly execute a corresponding response action on the input signal of the stylus.

For example, the second input of the stylus may be an input such as tapping the screen, sliding and holding, double-tapping, or dragging by the nib of the stylus. That the terminal receives the second input of the stylus is that the terminal detects the input signal of the stylus. The second frequency may be 480 Hz, and the third frequency may be 60 Hz. In the Idle-60 Hz state (in the Idle-60 Hz state, the terminal detects the input signal of the stylus at the frequency of 60 Hz) shown in FIG. 7b, after the nib of the stylus taps the screen, the terminal detects the input signal of the stylus through the touchscreen. The terminal may switch from the Idle-60 Hz state shown in FIG. 7b to the Active-480 Hz state (in the Active-480 Hz state, the terminal detects the input signal of the stylus at a frequency of 480 Hz) shown in FIG. 7a. In the Active-60 Hz state (in the Active-60 Hz state, the terminal detects the input signal of the stylus at the frequency of 60 Hz) shown in FIG. 8b, after the nib of the stylus taps the screen, the terminal detects the input signal of the stylus through the touchscreen. The terminal may switch from the Active-60 Hz state shown in FIG. 8b to the Active-480 Hz state shown in FIG. 8a. In the Idle-60 Hz state (in the Idle-60 Hz state, the terminal detects the input signal of the stylus at the frequency of 60 Hz) shown in FIG. 8d, after the nib of the stylus taps the screen, the terminal detects the input signal of the stylus though the touchscreen. The terminal may switch from the Idle-60 Hz state shown in FIG. 8d to the Idle-480 Hz state (in the Idle-480 Hz state, the terminal detects the input signal of the stylus at the frequency of 480 Hz) shown in FIG. 8c. The examples are merely used to explain this application and shall not constitute a limitation. For specific content, refer to the foregoing embodiments. Details are not described herein again.

In a possible case, the terminal receives a third input of a user when the terminal detects the input signal of the stylus at the second frequency. In response to the third input, the terminal turns off the touchscreen and detects the input signal of the stylus at the first frequency. In other words, when the terminal detects the input signal of the stylus at the high frequency (the second frequency), if the terminal is screen-off, the terminal may detect the input signal of the stylus at the low frequency to reduce the power consumption, and can further execute a corresponding action in response to the input signal of the stylus when the user turns off the screen, to improve user experience of using the stylus.

For example, the third input may be a screen-off operation (for example, pressing a power key once) of the user. For example, when the terminal detects the input signal of the stylus at the frequency of 480 Hz, the terminal receives the screen-off operation of the user. In response to the screen-off operation, the terminal switches the detection frequency for the stylus from 480 Hz to 5 Hz. For specific content, refer to the embodiments shown in FIG. 7a to FIG. 7c and FIG. 8a to FIG. 8d. Details are not described herein again.

In a possible case, the terminal receives a fourth input of the user when the terminal detects the input signal of the stylus at the third frequency. In response to the fourth input, the terminal turns off the touchscreen and detects the input signal of the stylus at the first frequency. In other words, when the terminal detects the input signal of the stylus at the medium frequency (the third frequency), if the terminal is screen-off, the terminal may detect the input signal of the stylus at the low frequency to reduce the power consumption, and can further execute a corresponding action in response to the input signal of the stylus when the user turns off the screen, to improve user experience of using the stylus.

For example, the fourth input may be the screen-off operation (for example, pressing the power key once) of the user. For example, when the terminal detects the input signal of the stylus at the frequency of 60 Hz, the terminal receives the screen-off operation of the user. In response to the screen-off operation, the terminal switches the detection frequency for the stylus from 60 Hz to 5 Hz. For specific content, refer to the embodiments shown in FIG. 7a to FIG. 7c and FIG. 8a to FIG. 8d. Details are not described herein again.

In a possible case, when the terminal detects the input signal of the stylus at the second frequency, the terminal detects a touch input of the user in a first detection state through the touchscreen. In the first detection state, the terminal detects the touch input of the user in a mutual capacitance detection manner at a fourth frequency and a self-capacitance detection manner at a fifth frequency.

For example, the first detection state may be the Active state in the foregoing embodiments. The fourth frequency may be 120 Hz, and the fifth frequency may be 120 Hz. When the terminal is in the Active-480 Hz state, the terminal may detect an input signal of a touch operation through the touchscreen at a 120 Hz mutual capacitance detection frequency and a 120 Hz self-capacitance detection frequency, and the terminal may detect the input signal of the stylus through the touchscreen at a scanning detection frequency of 480 Hz. The fourth frequency and the fifth frequency may alternatively be other values. For specific content, refer to the foregoing embodiments. Details are not described herein again.

In a possible case, when the terminal detects the input signal of the stylus at the third frequency, the terminal detects the touch input of the user in a second detection state through the touchscreen. In the second detection state, the terminal detects the touch input of the user in a mutual capacitance detection manner at a sixth frequency and a self-capacitance detection manner at a seventh frequency.

For example, the second detection state may be the Idle state in the foregoing embodiments. The sixth frequency may be 1 Hz. The seventh frequency may be 120 Hz. In the Idle-60 Hz state, the terminal may detect the input signal of the touch operation through the touchscreen at a 1 Hz mutual capacitance detection frequency and the 120 Hz self-capacitance detection frequency, and the terminal may detect the input signal of the stylus through the touchscreen at a scanning detection frequency of 60 Hz. The sixth frequency and the seventh frequency may alternatively be other values. For specific content, refer to the foregoing embodiments. Details are not described herein again.

In a possible case, when the terminal turns off the touchscreen, the method further includes: The terminal stops detection of the touch input of the user.

For example, in the Sleep-5 Hz state, the terminal may not detect the input signal of the touch operation of the user on the touchscreen, and the terminal may detect the input signal of the stylus through the touchscreen at a scanning detection frequency of 5 Hz. For specific content, refer to the foregoing embodiments. Details are not described herein again.

In a possible case, the terminal receives a fifth input of the stylus when the terminal turns off the touchscreen and detects the input signal of the stylus at the first frequency. In response to the fifth input, the terminal detects the input signal of the stylus at the second frequency, and saves written content of the fifth input. The written content includes handwriting of the stylus or text information recognized by the terminal from the handwriting of the stylus.

For example, the fifth input of the stylus may be the input operation 1414 in the embodiment shown in FIG. 14a, or the input operation 1434 in the embodiment shown in FIG. 14c. For detailed content, refer to the embodiments shown in FIG. 14a to FIG. 14d. Details are not described herein again.

In a possible case, the terminal receives a sixth input of the user. In response to the sixth input, the terminal stops the detection of the input signal of the stylus, or the terminal detects the input signal of the stylus at the first frequency.

For example, the sixth input may be the touch operation 933 shown in FIG. 9c, or the stylus input operation 1033 shown in FIG. 10c. For detailed content, refer to the embodiment shown in FIG. 9a to FIG. 9d or FIG. 10a to FIG. 10d. Details are not described herein again.

In a possible case, the terminal receives a seventh input of the user when the terminal stops the detection of the input signal of the stylus. In response to the seventh input, the terminal determines whether the terminal receives the input signal of the stylus before receiving the seventh input. If yes, the terminal detects the input signal of the stylus at the second frequency. If no, the terminal detects the input signal of the stylus at the first frequency.

For example, the seventh input may be the touch operation 1113 shown in FIG. 11a, or the touch operation 1133 shown in FIG. 11c. For detailed content, refer to the embodiments shown in FIG. 11a to FIG. 11d. Details are not described herein again.

In a possible case, the terminal receives an eighth input of the user. In response to the eighth input, the terminal restores factory settings and detects the input signal of the stylus at the first frequency.

For example, the eighth input may be the touch operation 1312 shown in FIG. 13a, or the input operation 1332 of the stylus shown in FIG. 13c. For detailed content, refer to the embodiments shown in FIG. 13a to FIG. 13d. Details are not described herein again.

In a possible case, the terminal receives a ninth input of the user. In response to the ninth input, the terminal restarts. A frequency of detecting the input signal of the stylus by the terminal before a restart is the same as a frequency of detecting the input signal of the stylus after the restart.

For example, the ninth input may be the touch operation 1213 shown in FIG. 12a, or the input operation 1233 of the stylus shown in FIG. 12c. For detailed content, refer to the embodiments shown in FIG. 12a to FIG. 12d. Details are not described herein again.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A stylus detection method implemented by a terminal, wherein the method comprises:
    detecting for an input signal of a stylus at a first frequency;
    receiving a first input of the stylus through a touchscreen of the terminal;
    switching, in response to the first input, to detecting for the input signal at a second frequency;
    switching to detecting for the input signal at a third frequency when a first duration during which the terminal does not detect the input signal while detecting for the input signal at the second frequency is greater than a first time period, wherein the second frequency is greater than the third frequency, and wherein the third frequency is greater than the first frequency;
    receiving a second input of a user while detecting for the input signal at the second frequency;
    turning off, in response to the second input, the touchscreen; and
    switching, in response to the second input, to detecting for the input signal at the first frequency.

2. The method of claim 1, further comprising switching to detecting for the input signal at the first frequency when a second duration during which the terminal does not detect the input signal of the stylus while detecting for the input signal at the third frequency is greater than a second time period.

3. The method of claim 1, further comprising:
    receiving a third input of the stylus while detecting for the input signal at the third frequency; and
    switching, in response to the third input, to detecting for the input signal at the second frequency.

4. The method of claim 1, wherein after turning off the touchscreen, the method further comprises stopping detection of a touch input of the user.

5. The method of claim 1, further comprising:
    receiving a third input of the stylus after turning off the touchscreen and while detecting for the input signal at the first frequency;
    switching, in response to the third input, to detecting for the input signal at the second frequency; and
    saving, in response to the third input, written content of the third input, wherein the written content comprises handwriting of the stylus or text information recognized by the terminal from the handwriting.

6. The method of claim 1, further comprising:
    receiving a third input of a user while detecting for the input signal at the third frequency;
    turning off, in response to the third input, the touchscreen; and
    switching, in response to the third input, to detecting for the input signal at the first frequency.

7. The method of claim 1, wherein while detecting for the input signal at the second frequency, the method further comprises detecting, in a first detection state through the touchscreen, for a touch input of a user in a mutual capacitance detection manner at a fourth frequency and a self-capacitance detection manner at a fifth frequency.

8. The method of claim 1, wherein while detecting for the input signal at the third frequency, the method further comprises detecting, in a second detection state through the touchscreen, for a touch input of a user in a mutual capacitance detection manner at a fourth frequency and a self-capacitance detection manner at a fifth frequency.

9. The method of claim 1, further comprising:
    receiving a third input of a user; and
    in response to the third input either:
        stopping detection of the input signal; or
        switching to detecting for the input signal at the first frequency.

10. The method of claim 1, further comprising:
    stopping detecting for the input signal;
    receiving a third input of a user after stopping detecting for the input signal;
    obtaining, in response to the third input, timing information of receiving the input signal and the third input;
    detecting, based on the timing information, for the input signal at the second frequency when the terminal has received the input signal before receiving the third input; and
    detecting for the input signal at the first frequency when the terminal has not received the input signal before receiving the third input.

11. The method of claim 1, further comprising:
    receiving a third input of a user;
    restoring, in response to the third input, factory settings; and
    switching, in response to the third input, to detecting for the input signal at the first frequency.

12. The method of claim 1, further comprising:
    receiving, a third input of a user; and
    restarting, in response to the third input, the terminal, wherein a fourth frequency of detecting for the input signal before a restart is same as a fifth frequency of detecting for the input signal after the restart.

13. An electronic device comprising:
    a touchscreen; and
    a processor coupled to the touchscreen and configured to:
        detect for an input signal of a stylus at a first frequency;
        receive a first input of the stylus through the touchscreen;
        switch, in response to the first input, to detecting for the input signal at a second frequency;
        switch to detecting for the input signal at a third frequency when a first duration during which the electronic device does not detect the input signal while detecting for the input signal at the second frequency is greater than a first time period, wherein the second frequency is greater than the third frequency, and wherein the third frequency is greater than the first frequency;
        receive a second input of a user while detecting for the input signal at the second frequency;

turn off, in response to the second input, the touchscreen; and switch, in response to the second input, to detecting for the input signal at the first frequency.

14. The electronic device of claim 13, wherein the processor is further configured to switch to detecting for the input signal at the first frequency when a second duration during which the electronic device does not detect the input signal while detecting for the input signal at the third frequency is greater than a second time period.

15. The electronic device of claim 13, wherein the processor is further configured to:

receive a third input of the stylus while detecting for the input signal at the third frequency; and switch, in response to the third input, to detecting for the input signal at the second frequency.

16. The electronic device of claim 13, wherein the processor is further configured to:

receive a third input of a user while detecting for the input signal at the third frequency;

turn off, in response to the third input, the touchscreen; and switch, in response to the third input, to detecting for the input signal at the first frequency.

17. The electronic device of claim 13, wherein while detecting for the input signal at the second frequency, the processor is further configured to detect, in a first detection state through the touchscreen, for a touch input of a user in a mutual capacitance detection manner at a fourth frequency and a self-capacitance detection manner at a fifth frequency.

18. A computer program product comprising computer-executable instructions stored on a non-transitory computer readable storage medium that, when executed by a processor of an electronic device, cause the electronic device to:

detect for an input signal of a stylus at a first frequency;

receive a first input of the stylus through a touchscreen of the electronic device;

switch, in response to the first input, to detecting for the input signal at a second frequency;

switch to detecting for the input signal at a third frequency when a duration during which the electronic device does not detect the input signal while detecting for the input signal at the second frequency is greater than a first time period, wherein the second frequency is greater than the third frequency, and wherein the third frequency is greater than the first frequency;

receive a second input of a user while detecting for the input signal at the second frequency;

turn off, in response to the second input, the touchscreen; and switch, in response to the second input, to detecting for the input signal at the first frequency.

19. The electronic device of claim 13, wherein the processor is further configured to:

receive a third input of the stylus after turning off the touchscreen and while detecting for the input signal at the first frequency;

switch, in response to the third input, to detecting for the input signal at the second frequency; and save, in response to the third input, written content of the third input, wherein the written content comprises handwriting of the stylus or text information recognized by a terminal from the handwriting.

20. The electronic device of claim 13, wherein the processor is further configured to:

stop detecting for the input signal;

receive a third input of a user after stopping detecting for the input signal;

obtain, in response to the third input, timing information of receiving the input signal and the third input;

detect, based on the timing information, for the input signal at the second frequency when a terminal has received the input signal before receiving the third input; and detect for the input signal at the first frequency when the terminal has not received the input signal before receiving the third input.

* * * * *